(12) United States Patent
Ikeda et al.

(10) Patent No.: US 10,620,744 B2
(45) Date of Patent: Apr. 14, 2020

(54) DISPLAY DEVICE WITH TOUCH DETECTION FUNCTION

(71) Applicant: Japan Display Inc., Tokyo (JP)

(72) Inventors: Masanobu Ikeda, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 143 days.

(21) Appl. No.: 15/892,090

(22) Filed: Feb. 8, 2018

(65) Prior Publication Data
US 2018/0232095 A1 Aug. 16, 2018

(30) Foreign Application Priority Data

Feb. 13, 2017 (JP) ................... 2017-024291

(51) Int. Cl.
*G06F 3/041* (2006.01)
*G06F 3/044* (2006.01)
*G09G 3/36* (2006.01)

(52) U.S. Cl.
CPC ............ *G06F 3/0416* (2013.01); *G06F 3/044* (2013.01); *G06F 3/0412* (2013.01); *G09G 3/3611* (2013.01); *G06F 2203/04111* (2013.01); *G09G 2340/0435* (2013.01); *G09G 2354/00* (2013.01)

(58) Field of Classification Search
None
See application file for complete search history.

(56) References Cited

U.S. PATENT DOCUMENTS

| | | |
|---|---|---|
| 2010/0182273 A1 | 7/2010 | Noguchi et al. |
| 2012/0050217 A1 | 3/2012 | Noguchi et al. |
| 2013/0033442 A1 | 2/2013 | Chu et al. |
| 2014/0146013 A1 | 5/2014 | Noguchi et al. |
| 2014/0292718 A1 | 10/2014 | Noguchi et al. |
| 2014/0354590 A1* | 12/2014 | Wang ............... G06F 3/044 345/174 |
| 2016/0342255 A1 | 11/2016 | Noguchi et al. |

FOREIGN PATENT DOCUMENTS

| | | |
|---|---|---|
| JP | H10-133628 A | 5/1998 |
| JP | 2007-101676 A | 4/2007 |
| JP | 2009-244958 A | 10/2009 |
| JP | 2010-251988 A | 11/2010 |
| JP | 2012-048295 A | 3/2012 |
| JP | 2013-037680 A | 2/2013 |
| JP | 2015-135699 A | 7/2015 |

* cited by examiner

*Primary Examiner* — Brian M Butcher

(74) *Attorney, Agent, or Firm* — K&L Gates LLP

(57) ABSTRACT

According to an aspect, a display device with a touch detection function includes: a display unit that includes a plurality of pixel electrodes, and a plurality of counter electrodes facing the pixel electrodes, and that displays an image at a resolution in accordance with the number of the pixel electrodes; a plurality of touch detection electrodes overlapping the counter electrodes; and a controller that alternately executes, in one frame period, a display operation in a display period by driving the pixel electrodes and the counter electrodes, and a touch detection operation in a touch period by driving one or both of the counter electrodes and the touch detection electrodes. The controller includes a control switching unit that changes a ratio between the display period and the touch period in the one frame period in accordance with a resolution of an image to be displayed in the one frame period.

18 Claims, 40 Drawing Sheets

DISPLAY DEVICE WITH TOUCH DETECTION FUNCTION

CROSS-REFERENCE TO RELATED APPLICATIONS

This application claims priority from Japanese Application No. 2017-024291, filed on Feb. 13, 2017, the contents of which are incorporated by reference herein in its entirety.

BACKGROUND

1. Technical Field

The present disclosure relates to a display device with a touch detection function.

2. Description of the Related Art

In recent years, an attention has been drawn to a display device that allows input of information by displaying various button images thereon, instead of ordinary mechanical buttons. A touch detection device or a so-called touch panel is mounted on or integrated with such a display device, e.g., a liquid crystal display device. The display device having such a touch panel has been increasingly used in computers, as well as television sets, and personal digital assistants such as mobile phones, for example.

Several methods for touch detection are available such as an optical method and a resistive method. Among these methods, a capacitance touch detection device has been known as a method exhibiting high detection performance. For example, proposed is a display device that uses a common electrode for performing display also as a touch drive electrode of a touch sensor, and in which a touch detection electrode is arranged so as to intersect with this common electrode. A known configuration of a display device with such a capacitance touch detection function includes alternately setting a display period for displaying an image and a touch period for touch detection in a time-division manner.

In performing touch detection by using the above-described conventional technologies, the greater the number of times of touch detection in the touch detection period, the higher the accuracy of touch detection can be. Meanwhile, as a trend of a liquid crystal display device using a liquid crystal panel with a higher image quality, recent years have seen a proposal of a liquid crystal display device employing a high-definition liquid crystal panel capable of displaying a 4K2K image (e.g., 4096×2160 pixels) having a higher resolution than that of a full high-definition (full HD) image (e.g., approximately 1920×1080 pixels), which is called as a 2K1K image. A further higher resolution has been increasingly demanded, and a liquid crystal display device capable of displaying an 8K4K image having the number of pixels twice the number of a 4K2K image lengthwise and crosswise. In order to realize the above-described display device using this type of a high-definition liquid crystal display panel, a display period occupying one frame period becomes long. As a result, it may be difficult to ensure a sufficient touch period.

For the foregoing reasons, there is a need for a display device with a touch detection function capable of optimizing accuracy of display and touch detection as the situation demands.

SUMMARY

According to an aspect, a display device with a touch detection function includes: a display unit that includes a plurality of pixel electrodes, and a plurality of counter electrodes facing the pixel electrodes, and that displays an image at a resolution in accordance with the number of the pixel electrodes; a plurality of touch detection electrodes overlapping the counter electrodes; and a controller that alternately executes, in one frame period, a display operation in a display period by driving the pixel electrodes and the counter electrodes, and a touch detection operation in a touch period by driving one or both of the counter electrodes and the touch detection electrodes. The controller includes a control switching unit that changes a ratio between the display period and the touch period in the one frame period in accordance with a resolution of an image to be displayed in the one frame period.

According to another aspect, a display device with a touch detection function includes: a display unit that includes a plurality of pixel electrodes, and a plurality of counter electrodes facing the pixel electrodes, and that displays an image at a resolution in accordance with the number of the pixel electrodes; and a plurality of touch detection electrodes overlapping the counter electrodes. A display operation in a display period by driving the pixel electrodes and the counter electrodes, and a touch detection operation in a touch period by driving one or both of the counter electrodes and the touch detection electrodes are executed alternately in one frame period. A ratio between the display period and the touch period in the one frame period is changed in accordance with a resolution of an image to be displayed in the one frame period.

According to still another aspect, a control circuit is included in a display unit, the display unit including: a plurality of pixel electrodes; a plurality of counter electrodes facing the pixel electrodes; and a plurality of touch detection electrodes overlapping the counter electrodes, and configured to display an image at a resolution in accordance with the number of the pixel electrodes. The control circuit alternately executes, in one frame period, a display operation in a display period by driving the pixel electrodes and the counter electrodes, and a touch detection operation in a touch period by driving one or both of the counter electrodes and the touch detection electrodes. The control circuit changes a ratio between the display period and the touch period in the one frame period in accordance with a resolution of an image to be displayed in the one frame period.

DETAILED DESCRIPTION

Figure 1:
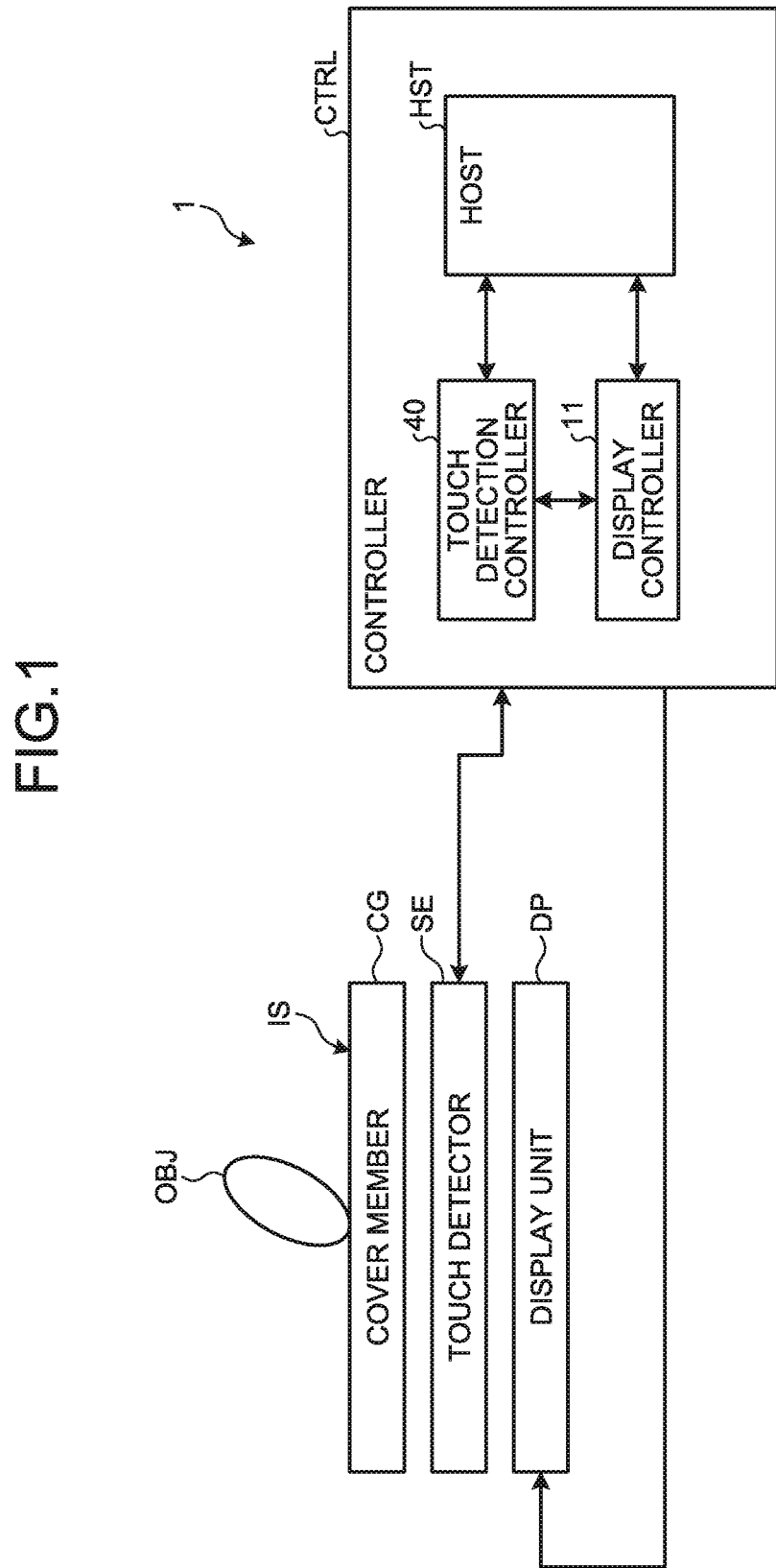
FIG. 1 is a block diagram illustrating a configuration of a display device with a touch detection function (hereinafter referred to as the display device) according to an embodiment.

Modes (embodiments) for carrying out the present disclosure will be described below in detail with reference to the drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art naturally fall within the scope of the present disclosure. The drawings may possibly illustrate the width, the thickness, the shape, and other elements of each unit more schematically than the actual aspect to simplify the explanation. These elements, however, are given by way of example only and are not intended to limit interpretation of the present disclosure. In the specification and the drawings, components similar to those previously described with reference to a preceding drawing are denoted by like reference numerals, and overlapping explanation thereof will be appropriately omitted. In this disclosure, when an element A is described as being "on" another element B, the element A can be directly on the other element B, or there can be one or more elements between the element A and the other element B.

Embodiment

FIG. 1 is a block diagram illustrating a configuration of a display device with a touch detection function according to an embodiment.

A display device 1 with a touch detection function (hereinafter referred to as the display device 1) according to the present embodiment includes a touch detector SE, a display unit DP, and a controller CTRL.

The touch detector SE detects contact or proximity of an object OBJ with or to an input surface IS of a cover member CG. Specifically, the touch detector SE outputs to the controller CTRL a signal value according to contact or proximity of the object OBJ with or to a region in which the object OBJ overlaps the input surface IS in the vertical direction.

The object OBJ may be a first type object that deforms by coming into contact with the input surface IS, or may be a second type object that does not deform by coming into contact with the input surface IS or that is relatively less deformable in comparison with the first type object. Examples of the first type object include, but not limited to, a finger. Examples of the second type object include, but not limited to, a stylus pen made of resin or metal.

The number of objects that can be detected by the touch detector SE is not limited to one. The touch detector SE may be configured to detect two or more objects.

Examples of the touch detector SE include, but not limited to, a capacitance sensor or a resistive sensor. A mutual-capacitance sensing method and a self-capacitance sensing method are exemplified as the capacitance sensing method.

The display unit DP displays an image toward the input surface IS. Examples of the display unit DP include, but not limited to, a liquid crystal display device or an organic electro-luminescence display device.

The touch detector SE and the display unit DP may be of an in-cell type or a hybrid type having a configuration in which they are integrated with each other. The touch detector SE and the display unit DP may be of an on-cell type in which the touch detector SE is mounted on the display unit DP.

The controller CTRL includes a display controller 11, a touch detection controller 40, and a host HST.

An IC chip mounted on a glass substrate of the display unit DP is exemplified as the display controller 11. An IC chip mounted on a printed circuit board (e.g., a flexible printed circuit board) coupled to the glass substrate of the display unit DP is exemplified as the touch detection controller 40. A central processing unit (CPU) provided to an apparatus on which the display device 1 is mounted is exemplified as the host HST. The display controller 11, the touch detection controller 40, and the host HST collaborate with each other in controlling the touch detector SE and the display unit DP.

The following describes a specific configuration example of the touch detector SE and the display unit DP. However, the configuration example is a mere example and the present disclosure is not limited thereto.

Configuration Example of Touch Detector and Display Unit

Figure 2:
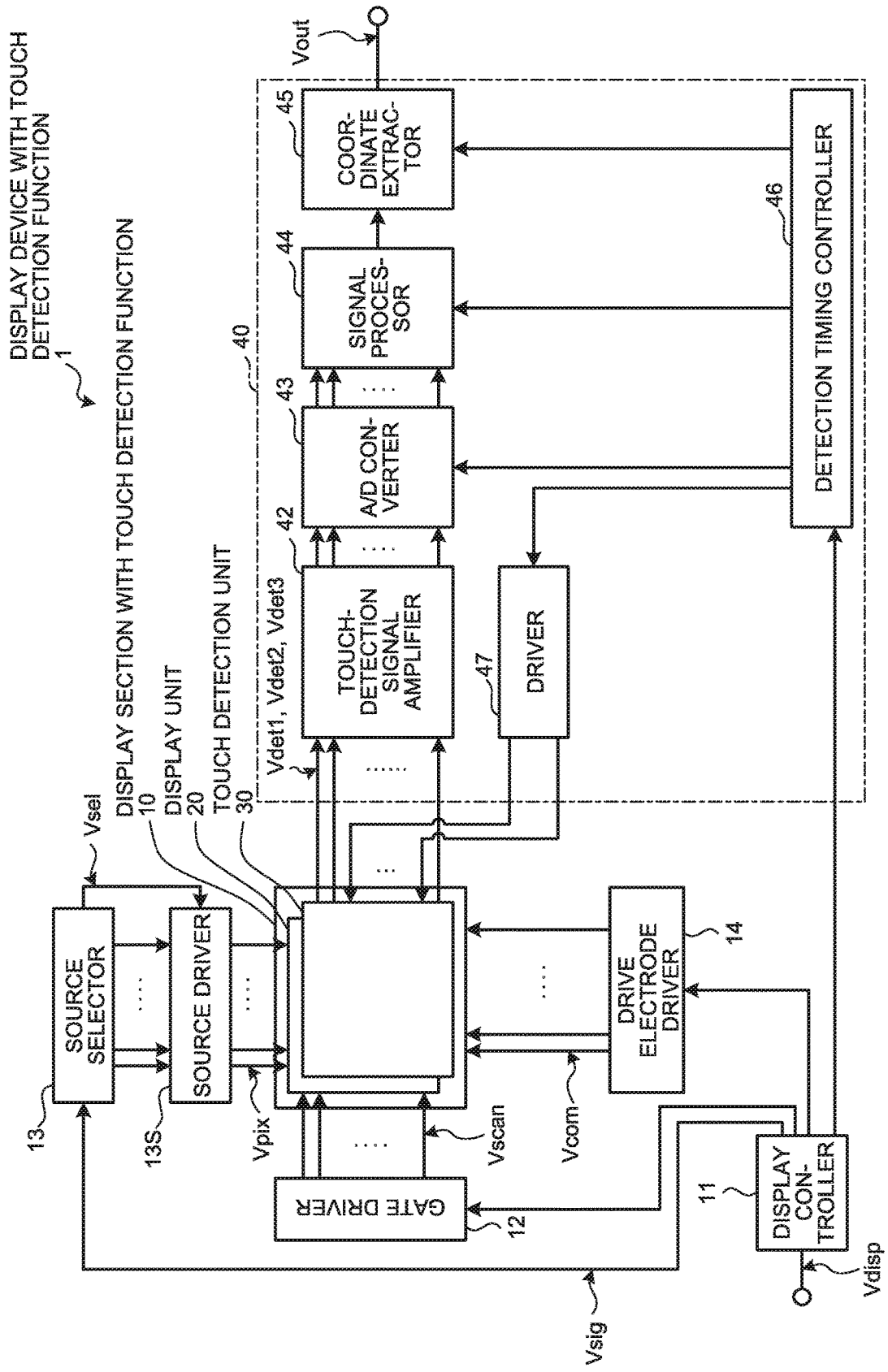
FIG. 2 is a block diagram illustrating a configuration example of a touch detector and a display unit in the display device according to the embodiment.

FIG. 2 is a block diagram illustrating a configuration example of the touch detector and the display unit in the display device according to the embodiment. The display device 1 illustrated in FIG. 2 is a device that detects coordinates and a contact area of the object OBJ by the mutual-capacitance sensing method and the self-capacitance sensing method.

The display device 1 includes a display section 10 with a touch detection function, the display controller 11, a gate driver 12, a source driver 13, a source selector 13S, a drive electrode driver 14, and the touch detection controller 40.

The display device 1 is configured to include the display section 10 with a touch detection function in which a display unit 20 having a liquid-crystal display element as a display element and a capacitance touch detection unit 30 are integrally built therein. The display section 10 with a touch detection function is a device of an in-cell type or a hybrid type. The configuration, in which the display unit 20 and the capacitance touch detection unit 30 are integrally built, includes a configuration in which a part of members such as a substrate and electrodes that are used as the display unit 20 and a part of members such as a substrate and electrodes that are used as the touch detection unit 30 are shared by the display unit 20 and the touch detection unit 30.

The present embodiment exemplifies a configuration in which the display unit 20 can perform display in a high definition (e.g., 4K2K resolution, 4096×2160 pixels). The present disclosure is not limited to the maximum resolution displayable with the display unit 20.

The display unit 20 corresponds to the display unit DP in FIG. 1. The touch detection unit 30 corresponds to the touch detector SE in FIG. 1.

The display section 10 with a touch detection function may be a device of an on-cell type having a configuration in which the capacitance touch detection unit 30 is mounted on the display unit 20 using a liquid-crystal display element as a display element. In the case of an on-cell type device, the touch detection unit 30 may be provided directly on the display unit 20, or the touch detection unit 30 may be provided not directly on the display unit 20, but above the display unit 20 with another layer interposed therebetween.

In the present configuration example, the display unit 20 having a liquid crystal element as a display element is employed as the display unit DP. However, the display unit DP may have a configuration employing an organic EL element. In this case, one of the anode and the cathode constituting the organic EL element may serve as a drive electrode COML used for touch detection. The drive electrode COML will be described in detail with reference to FIGS. 10 to 13.

The display unit 20 is a unit that performs display by selecting one line (one horizontal line) or a predetermined number of lines (horizontal lines) in accordance with scanning signals Vscan supplied from the gate driver 12, thereby sequentially scanning lines.

The display controller 11 is a circuit that supplies respective control signals to the gate driver 12, the source driver 13, the drive electrode driver 14, and the touch detection controller 40 in accordance with video signals Vdisp supplied from the host HST such as an external processor, and controls them so as to operate in synchronization with one another. The display controller 11 generates, from the video signals Vdisp for one horizontal line, image signals Vsig by time-divisionally multiplexing pixel signals Vpix for a plurality of sub pixels SPix belonging to the one horizontal line or a predetermined number of horizontal lines of the display unit 20, and supplies the image signals Vsig to the source driver 13. The present embodiment exemplifies a configuration in which the display controller 11 is an IC chip constituted by a semiconductor integrated circuit, for example, and is mounted on the display unit 20. The sub pixel SPix and a pixel Pix constituted by the sub pixels SPix will be described in detail with reference to FIG. 12. Constituent elements of the sub pixel SPix such as a TFT element Tr, a signal line (source line SGL) supplying the pixel signal Vpix to each sub pixel SPix, and a scanning line (gate line GCL) supplying the scanning signal Vscan will be also described in detail with reference to FIG. 12.

The controller CTRL in the present disclosure includes the display controller 11, the gate driver 12, the source driver 13, and the drive electrode driver 14.

The gate driver 12 sequentially selects horizontal line(s) in the display section 10 with a touch detection function in accordance with the control signals supplied from the display controller 11. Specifically, the gate driver 12 applies the scanning signals Vscan for the one horizontal line or the predetermined number of horizontal lines to the gates of the TFT elements Tr of the sub pixels SPix via the gate line(s) GCL, thereby sequentially selecting the one horizontal line or the predetermined number of horizontal lines as a target of display drive among the sub pixels SPix arranged in a matrix form in the display unit 20 of the display section 10 with a touch detection function.

The source driver 13 is a circuit that supplies the pixel signal Vpix to each of the sub pixels SPix of the display section 10 with a touch detection function in accordance with a control signal supplied from the display controller 11. Specifically, the source driver 13 supplies the pixel signal Vpix via the source line SGL to each of the sub pixels SPix constituting the one horizontal line or the predetermined number of horizontal lines sequentially selected by the gate driver 12. Then, in these sub pixels SPix, the display for the one horizontal line or the predetermined number of horizontal lines is performed in accordance with the supplied pixel signals Vpix. The six-bit image signals Vsig for red (R), green (G), and blue (B), for example, are supplied to the source driver 13.

The source driver 13 receives the image signal Vsig from the display controller 11, and supplies the image signal Vsig to the source selector 13S. Furthermore, the source driver 13 generates a switch control signal Vsel needed for separating the pixel signal Vpix multiplexed to the image signal Vsig, and supplies the switch control signal Vsel to the source selector 13S together with the pixel signal Vpix. The source selector 13S can reduce the number of wires between the source driver 13 and the display controller 11. The source selector 13S may be omitted. The display controller 11 may perform a part of control of the source driver 13, and only the source selector 13S may be arranged. The six-bit image signals Vsig for R, G, and B, for example, are supplied to the source selector 13S.

The drive electrode driver 14 is a circuit that supplies, to the drive electrodes COML of the display section 10 with a touch detection function, a mutual-capacitance touch drive signal Vcomtm, a self-capacitance touch drive signal Vcomts2, and a display drive voltage Vcomd for display, in accordance with control signals supplied from the display controller 11. Specifically, the drive electrode driver 14 applies the display drive voltage Vcomd to the drive electrodes COML in a display period Pd in which a display operation is performed, and supplies the mutual-capacitance touch drive signals Vcomtm and the self-capacitance touch drive signals Vcomts2 only to predetermined drive electrodes COML in a touch period Pt in which a touch detection operation is performed.

The touch detection controller 40 includes a driver 47 for supplying self-capacitance touch drive signals Vcomts1 to touch detection electrodes TDL during the touch detection operation according to the self-capacitance sensing method. The touch detection electrodes TDL will be described in detail together with the above-described drive electrodes COML with reference to FIGS. 10 to 13.

The touch detection unit 30 operates based on the basic principle of touch detection according to the mutual-capacitance sensing method so that the touch detection electrodes TDL output touch detection signals Vdet1. The touch detection unit 30 further operates based on the basic principle of touch detection according to the self-capacitance sensing method so that the touch detection electrodes TDL output touch detection signals Vdet2. Furthermore, the touch detection unit 30 operates based on the basic principle of touch detection according to the self-capacitance sensing method so that the drive electrodes COML output touch detection signals Vdet3.

The touch detection unit 30 can perform touch detection according only to the mutual-capacitance sensing method. However, in the present configuration example, the touch detection unit 30 performs both the mutual-capacitance touch detection and the self-capacitance touch detection. Note that the present disclosure is not limited to the configuration in which both the mutual-capacitance touch detection and the self-capacitance touch detection are performed.

Figure 3:
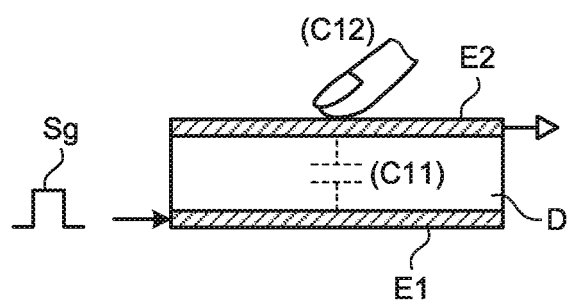
FIG. 3 is an explanatory diagram that illustrates a state in which an object is in contact with or in proximity to a detection electrode for explaining the basic principle of touch detection according to a mutual-capacitance sensing method.
Figure 4:
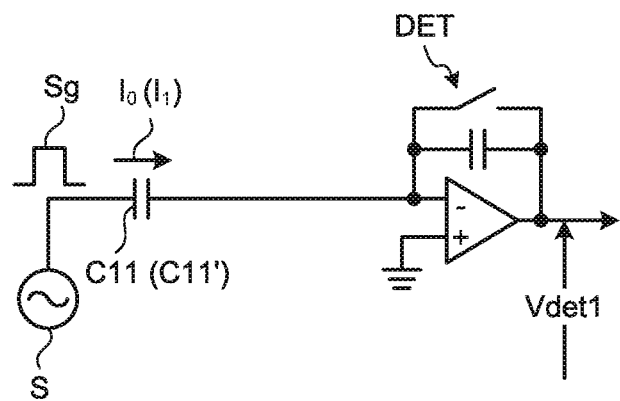
FIG. 4 is an explanatory diagram illustrating an example of an equivalent circuit of the touch detection according to the mutual-capacitance sensing method.
Figure 5:
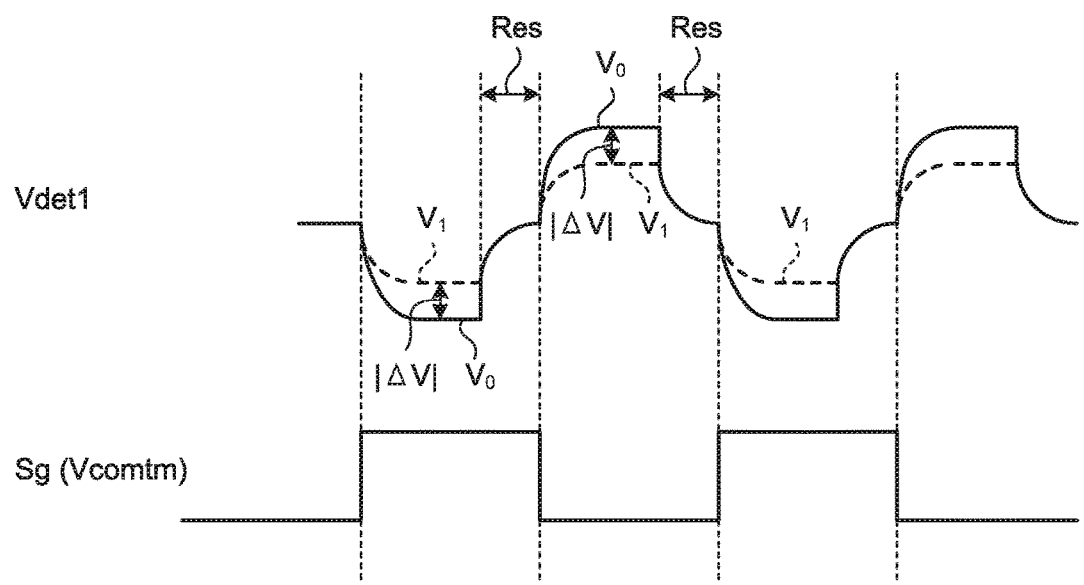
FIG. 5 is a diagram illustrating an example of waveforms of a touch drive signal and a touch detection signal according to the mutual-capacitance sensing method.

The following describes the basic principle of mutual-capacitance touch detection of the display device 1 according to the present configuration example, with reference to FIGS. 3 to 5.

FIG. 3 is an explanatory diagram that illustrates a state in which an object is in contact with or in proximity to a detection electrode for explaining the basic principle of touch detection according to the mutual-capacitance sensing method. FIG. 4 is an explanatory diagram illustrating an example of an equivalent circuit of the touch detection according to the mutual-capacitance sensing method. FIG. 5 is a diagram illustrating an example of waveforms of a touch drive signal and a touch detection signal according to the mutual-capacitance sensing method. FIG. 4 illustrates a detection circuit together.

For example, as illustrated in FIG. 3, a capacitive element C11 includes a pair of electrodes facing each other with a dielectric D interposed therebetween, i.e., a drive electrode E1 and a touch detection electrode E2. As illustrated in FIG. 4, one end of the capacitive element C11 is coupled to an AC signal source (drive signal source) S, and the other end thereof is coupled to a voltage detector (touch detector) DET. The voltage detector DET is an integrating circuit included in a touch-detection signal amplifier 42 illustrated in FIG. 2, for example.

When an AC square wave Sg at a predetermined frequency (e.g., about several kHz to several hundred kHz) is applied to the drive electrode E1 (one end of the capacitive element C11) from the AC signal source S, an output waveform (the touch detection signal Vdet1) appears via the voltage detector DET coupled to the touch detection electrode E2 (the other end of the capacitive element C11). The AC square wave Sg corresponds to the touch drive signal Vcomtm according to mutual-capacitance sensing method, which will be described later.

In a state in which an object is not in contact with (or not in proximity to) the detection electrode (a non-contact state), a current $I_0$ corresponding to a capacitance value of the capacitive element C11 flows according to charge or discharge of the capacitive element C11. As illustrated in FIG. 5, the voltage detector DET converts fluctuations in the current $I_0$ corresponding to the AC square wave Sg into fluctuations in voltage (waveform $V_0$ in solid line).

Meanwhile, in a state in which an object is in contact with (or in proximity to) the detection electrode (a contact state), as illustrated in FIG. 3, capacitance C12 generated by a finger is in contact with or in proximity to the touch detection electrode E2, thereby blocking capacitance for a fringe between the drive electrode E1 and the touch detection electrode E2, and acts as a capacitive element C11' having a smaller capacitance value than that of the capacitive element C11. In the equivalent circuit illustrated in FIG. 4, a current $I_1$ flows through the capacitive element C11'.

As illustrated in FIG. 5, the voltage detector DET converts fluctuations in the current $I_1$ corresponding to the AC square wave Sg into fluctuations in voltage (waveform $V_1$ in broken line). In this case, the waveform $V_1$ shows smaller amplitude than that of the above-described waveform $V_0$. Accordingly, an absolute value $|\Delta V|$ of a voltage difference between the waveform $V_0$ and the waveform $V_1$ changes according to the influence of the object. In order to accurately detect the absolute value $|\Delta V|$ of the voltage difference between the waveform $V_0$ and the waveform $V_1$, it is more preferable that the voltage detector DET perform an operation by setting a period Res for resetting charge and discharge of a capacitor in accordance with a frequency of the AC square wave Sg by switching in the circuit.

Referring back to FIG. 2, the touch detection unit 30 sequentially scans each drive electrode COML to output the touch detection signal Vdet1, in accordance with the mutual-capacitance touch drive signal Vcomtm supplied from the drive electrode driver 14.

The following describes the basic principle of self-capacitance touch detection of the display device 1 according to the present configuration example with reference to FIGS. 6 to 9.

Figure 6:
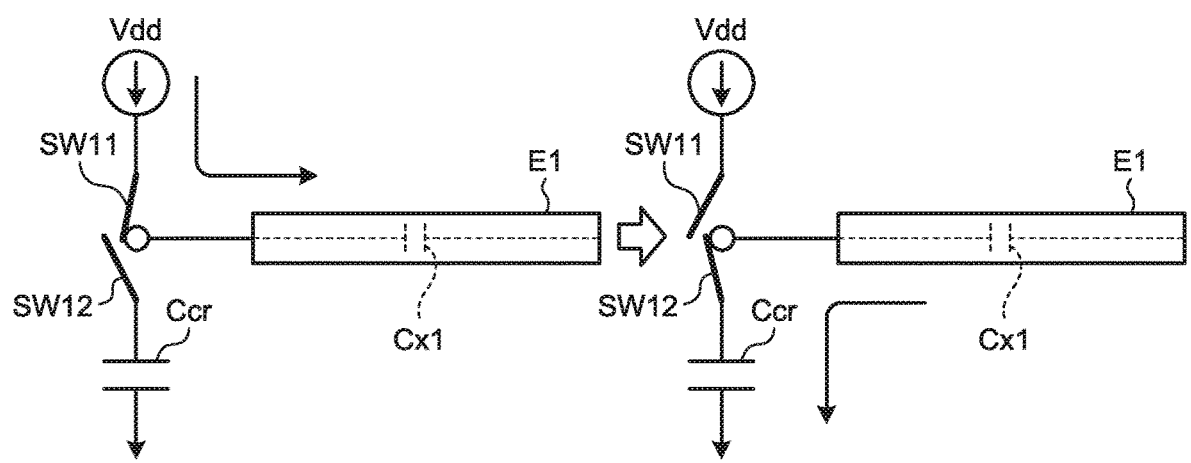
FIG. 6 is an explanatory diagram that illustrates a state in which an object is not in contact with or in proximity to the detection electrode for explaining the basic principle of touch detection according to a self-capacitance sensing method.
Figure 7:
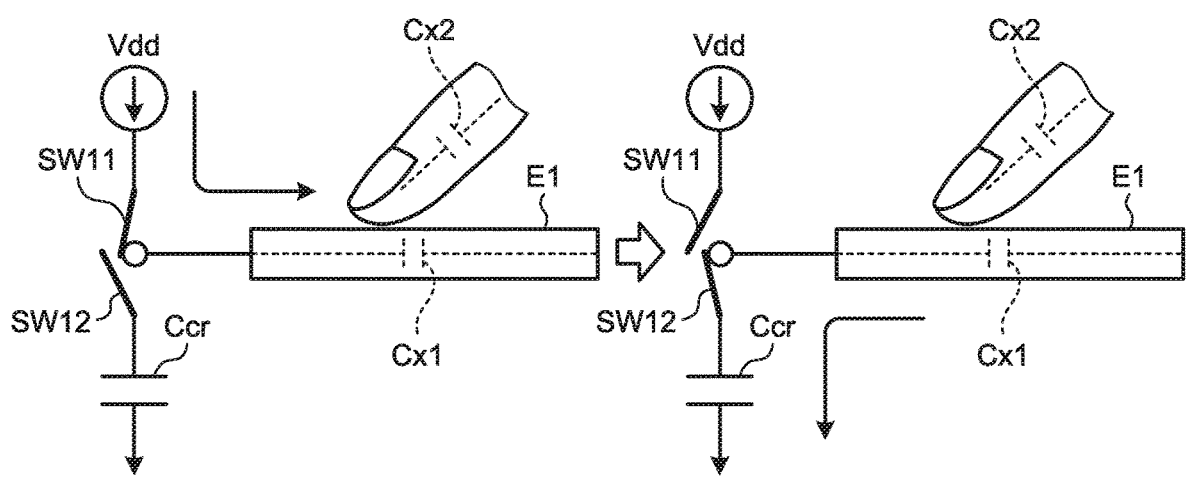
FIG. 7 is an explanatory diagram that illustrates a state in which an object is in contact with or in proximity to the detection electrode for explaining the basic principle of touch detection according to the self-capacitance sensing method.
Figure 8:
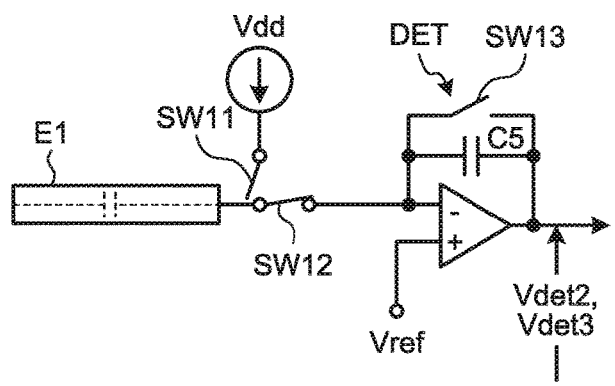
FIG. 8 is an explanatory diagram illustrating an example of an equivalent circuit of touch detection according to the self-capacitance sensing method.
Figure 9:
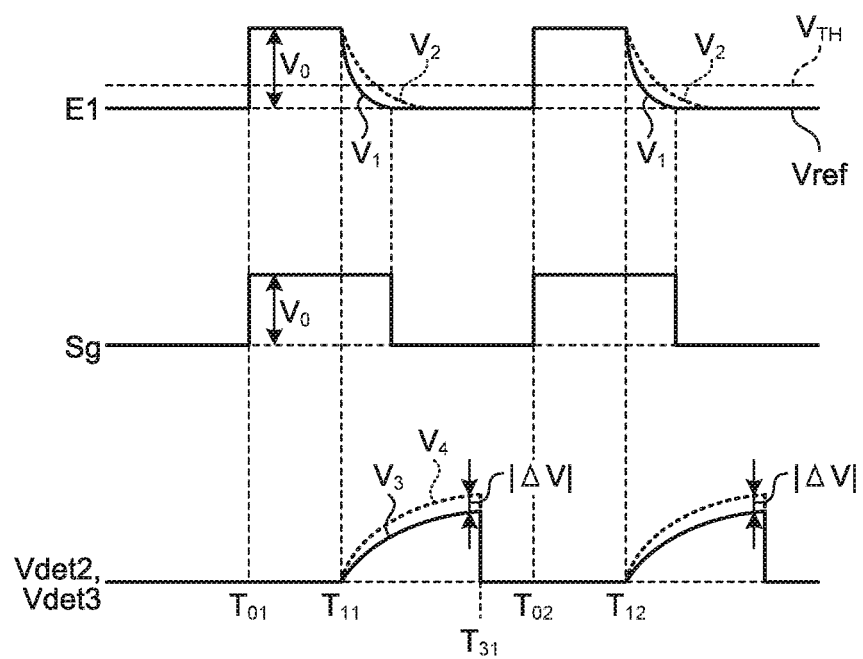
FIG. 9 is a diagram illustrating an example of waveforms of a touch drive signal and a touch detection signal according to the self-capacitance sensing method.

FIG. 6 is an explanatory diagram that illustrates a state in which an object is not in contact with or in proximity to the detection electrode for explaining the basic principle of touch detection according to the self-capacitance sensing method. FIG. 7 is an explanatory diagram that illustrates a state in which an object is in contact with or in proximity to the detection electrode for explaining the basic principle of touch detection according to the self-capacitance sensing method. FIG. 8 is an explanatory diagram illustrating an example of an equivalent circuit of touch detection according to the self-capacitance sensing method. FIG. 9 is a diagram illustrating an example of waveforms of a touch drive signal and a touch detection signal according to the self-capacitance sensing method.

A left diagram included in FIG. 6 illustrates, when an object is not in contact with or in proximity to the detection electrode, a state in which a power source Vdd and the detection electrode E1 are coupled to each other by a switch SW11 and the detection electrode E1 is not coupled to a capacitor Ccr by a switch SW12. In this state, capacitance Cx1 of the detection electrode E1 is charged. A right diagram included in FIG. 6 illustrates a state in which the power source Vdd and the detection electrode E1 are uncoupled by the switch SW11, and the detection electrode E1 and the capacitor Ccr are coupled to each other by the switch SW12. In this state, the capacitance Cx1 is discharged via the capacitor Ccr.

A left diagram included in FIG. 7 illustrates, when an object is in contact with or in proximity to the detection electrode, a state in which the power source Vdd and the detection electrode E1 are coupled to each other by the switch SW11, and the detection electrode E1 is not coupled to the capacitor Ccr by the switch SW12. In this state, capacitance Cx2 generated by the object in proximity to the detection electrode E1 is charged, in addition to the capacitance Cx1 of the detection electrode E1. A right diagram included in FIG. 7 illustrates a state in which the power source Vdd and the detection electrode E1 are uncoupled by the switch SW11, and the detection electrode E1 and the capacitor Ccr are coupled by the switch SW12. In this state, each of the capacitance Cx1 and the capacitance Cx2 is discharged via the capacitor Ccr.

The voltage change characteristics of the capacitor Ccr at the time of discharge illustrated in the right diagram in FIG. 6 (a state in which the object is not in contact with or in proximity to the detection electrode) are obviously different from the voltage change characteristics of the capacitor Ccr at the time of discharge illustrated in the right diagram in FIG. 7 (a state in which the object is in contact with or in proximity to the detection electrode) due to the presence of the capacitance Cx2. Thus, the self-capacitance sensing method uses the voltage change characteristics of the capacitor Ccr which are made different by the presence of the capacitance Cx2 to determine whether the object is in contact with or in proximity to the detection electrode.

Specifically, a voltage having the AC square wave Sg (see FIG. 9) at a predetermined frequency (e.g., about several kHz to several hundred kHz) is applied to the detection electrode E1. The voltage detector DET illustrated in FIG. 8 converts fluctuations in current corresponding to the AC square wave Sg into fluctuations in voltage (waveforms $V_3$ and $V_4$). The voltage detector DET is an integrating circuit included in the touch-detection signal amplifier 42 illustrated in FIG. 2, for example.

As described above, the detection electrode E1 is configured to be separable from the power source Vd and the capacitor Ccr by the switch SW11 and the switch SW12, respectively. In FIG. 9, at a time $T_{01}$, a voltage in the AC square wave Sg rises to a voltage level that is equivalent to a voltage $V_0$. At this time, the switch SW11 is on, and the switch SW12 is off. Accordingly, the voltage of the detection electrode E1 also rises to the voltage $V_0$.

Then, the switch SW11 is turned off before a time $T_{11}$. At this time, although the detection electrode E1 is in a floating state, the potential of the detection electrode E1 is maintained at $V_0$ due to the capacitance Cx1 of the detection electrode E1 (see FIG. 6) or the capacitance obtained by adding the capacitance Cx2 generated by the contact or proximity of the object to the capacitance Cx1 of the detection electrode E1 (Cx1+Cx2, see FIG. 7). Furthermore, a switch SW13 is turned on before the time $T_{11}$, and is turned off after the elapse of a predetermined period of time, thereby resetting the voltage detector DET. By this reset operation, an output voltage (a touch detection signal) Vdet of the voltage detector DET becomes a voltage substantially equivalent to a reference voltage Vref.

Subsequently, when the switch SW12 is turned on at the time $T_{11}$, a voltage of an inverting input unit of the voltage detector DET becomes the voltage $V_0$ of the detection electrode E1. Thereafter, in accordance with a time constant of the capacitance Cx1 (or Cx1+Cx2) of the detection electrode E1 and that of capacitance C5 in the voltage detector DET, the voltage of the inverting input portion of the voltage detector DET falls to the reference voltage Vref. At this time, because the electrical charges accumulated in the capacitance Cx1 (or Cx1+Cx2) of the detection electrode E1 move to the capacitance C5 in the voltage detector DET, the output voltages (the touch detection signals) Vdet2 and Vdet3 of the voltage detector DET rise.

The output voltage Vdet2 of the voltage detector DET becomes to have a waveform $V_3$ indicated by the solid line when the object is not in proximity to the detection electrode E1, which is expressed by Vdet2=Cx1×$V_0$/C5. Similarly, the output voltage Vdet3 of the voltage detector DET becomes to have the waveform $V_3$ indicated by the solid line when the object is not in proximity to the detection electrode E1, which is expressed by Vdet3=Cx1×$V_0$/C5.

The output voltage Vdet2 of the voltage detector DET becomes to have a waveform $V_4$ indicated by the dotted line when the capacitance generated by the influence of the object is added, which is expressed by Vdet2=(Cx1+Cx2)×$V_0$/C5. Similarly, the output voltage Vdet3 of the voltage detector DET becomes to have the waveform $V_4$ indicated by the dotted line when the capacitance generated by the influence of the object is added, which is expressed by Vdet3=(Cx1+Cx2)×$V_0$/C5.

Subsequently, at a time $T_{31}$ after the electrical charges of the capacitance Cx1 (or Cx1+Cx2) of the detection electrode E1 are transferred sufficiently to the capacitance C5, the switch SW12 is turned off, and the switch SW11 and the switch SW13 are turned on. This makes the potential of the detection electrode E1 at a low level, which is the same potential as the AC square wave Sg, and resets the voltage detector DET. At this time, the timing to turn on the switch SW11 may be any timing before a time $T_{02}$ and after turning off the switch SW12. The timing to reset the voltage detector DET may be any timing before a time $T_{12}$ and after turning off the switch SW12.

The above-described operation is repeated at a predetermined frequency (e.g., about several kHz to several hundred kHz). Whether there is the object (whether there is a touch) can be determined based on the absolute value |ΔV| of the difference between the waveform $V_3$ and the waveform $V_4$. As illustrated in FIG. 9, the potential of the detection electrode E1 becomes to have the waveform of $V_1$ when the object is not in proximity to the detection electrode, and becomes to have the waveform of $V_2$ when the capacitance Cx2 generated by the influence of the object is added. Whether there is an external proximity object (whether there is a touch) can be determined by measuring the respective times for which the waveform $V_1$ and the waveform $V_2$ fall to a threshold voltage $V_{TH}$.

In the touch detection unit 30 according to the present configuration example, electrical charges are supplied to the respective touch detection electrodes TDL in accordance with the drive signals Vcomts1 for the self-capacitance touch detection supplied from the driver 47 illustrated in FIG. 2. The touch detection unit 30 performs the self-capacitance touch detection by the touch detection electrodes TDL, which output the touch detection signals Vdet2. In the touch detection unit 30, electrical charges are supplied to the respective drive electrodes COML in accordance with the drive signals Vcomts2 for the self-capacitance touch detection supplied from the drive electrode driver 14 illustrated in FIG. 2. The touch detection unit 30 performs the self-capacitance touch detection by the drive electrodes COML, which output the touch detection signals Vdet3.

Referring back to FIG. 2, the touch detection controller 40 is a circuit that determines whether there is a touch (the above-described contact state) on the touch detection unit 30 in accordance with the control signals supplied from the display controller 11 and the touch detection signals Vdet1, Vdet2, and Vdet3 supplied from the touch detection unit 30 of the display section 10 with a touch detection function, and that obtains coordinates and a contact area of a touch detection region when there is a touch.

The touch detection controller 40 includes the touch-detection signal amplifier 42, an A/D converter 43, a signal processor 44, a coordinate extractor 45, and a detection timing controller 46.

At the time of the mutual-capacitance touch detection, the touch detection unit 30 outputs the touch detection signals Vdet1 from the touch detection electrodes TDL, which will be described later, via the voltage detectors DET illustrated in FIG. 4, and supplies the touch detection signals Vdet1 to the touch-detection signal amplifier 42 of the touch detection controller 40.

At the time of the self-capacitance touch detection, the touch detection unit 30 outputs the touch detection signals Vdet2 from the touch detection electrodes TDL, which will be described later, via the voltage detectors DET illustrated in FIG. 8, and supplies the touch detection signals Vdet2 to the touch-detection signal amplifier 42 of the touch detection controller 40. Furthermore, at the time of the self-capacitance touch detection, the touch detection unit 30 outputs the touch detection signals Vdet3 from the drive electrodes COML, which will be described later, via the voltage detectors DET illustrated in FIG. 8, and supplies the touch detection signals Vdet3 to the touch-detection signal amplifier 42 of the touch detection controller 40.

The touch-detection signal amplifier 42 amplifies the touch detection signals Vdet1, Vdet2, and Vdet3 supplied from the touch detection unit 30. The touch detection signals amplified by the touch-detection signal amplifier 42 are supplied to the A/D converter 43. The touch-detection signal amplifier 42 may include an analog low-pass filter that removes high frequency components (noise components) included in the touch detection signals Vdet1, Vdet2, and Vdet3, and extracts and outputs the respective touch components. The touch detection controller 40 does not necessarily include the touch-detection signal amplifier 42. That is, the touch detection signals Vdet1, Vdet2, and Vdet3 output from the touch detection unit 30 may be supplied to the A/D converter 43.

The A/D converter 43 is a circuit that samples the analog signals output from the touch-detection signal amplifier 42 to convert them into respective digital signals at timing synchronized with the touch drive signals Vcomtm, Vcomts1, and Vcomts2.

The signal processor 44 includes a digital filter that reduces a frequency component (noise component) included in the output signal of the A/D converter 43, the frequency component having a frequency other than those at which the touch drive signals Vcomtm, Vcomts1, and Vcomts2 are sampled.

The signal processor 44 is a logic circuit that determines whether there is a touch on the touch detection unit 30 in accordance with the output signal of the A/D converter 43. The signal processor 44 performs the processing for extracting only a differential signal caused by a finger. This differential signal caused by a finger corresponds to the above-described absolute value |ΔV| of the difference between the waveform $V_0$ and the waveform $V_1$.

The signal processor 44 may perform calculation to average the absolute values |ΔV| per one detection block to obtain an average value of the absolute values |ΔV|. Accordingly, the signal processor 44 can reduce the influence of noise.

The signal processor 44 compares the detected differential signal caused by a finger with the predetermined threshold voltage $V_{TH}$, and determines that, if the detected difference signal has a voltage that is equal to or greater than the threshold voltage $V_{TH}$, the touch detection unit 30 is in the non-contact state by an external proximity object.

Meanwhile, the signal processor 44 compares the detected differential signal with the predetermined threshold voltage $V_{TH}$, and determines that, if the detected differential signal is below the threshold voltage $V_{TH}$, the touch detection unit 30 is in the contact state by an external proximity object. In this manner, the touch detection controller 40 can perform the touch detection.

The coordinate extractor 45 is a logic circuit that, when a touch is detected by the signal processor 44, obtains the touch panel coordinates of the touch. The detection timing controller 46 performs control such that the A/D converter 43, the signal processor 44, and the coordinate extractor 45 operate in synchronization with one another. The coordinate extractor 45 outputs the touch panel coordinates as a signal Vout.

Figure 10:
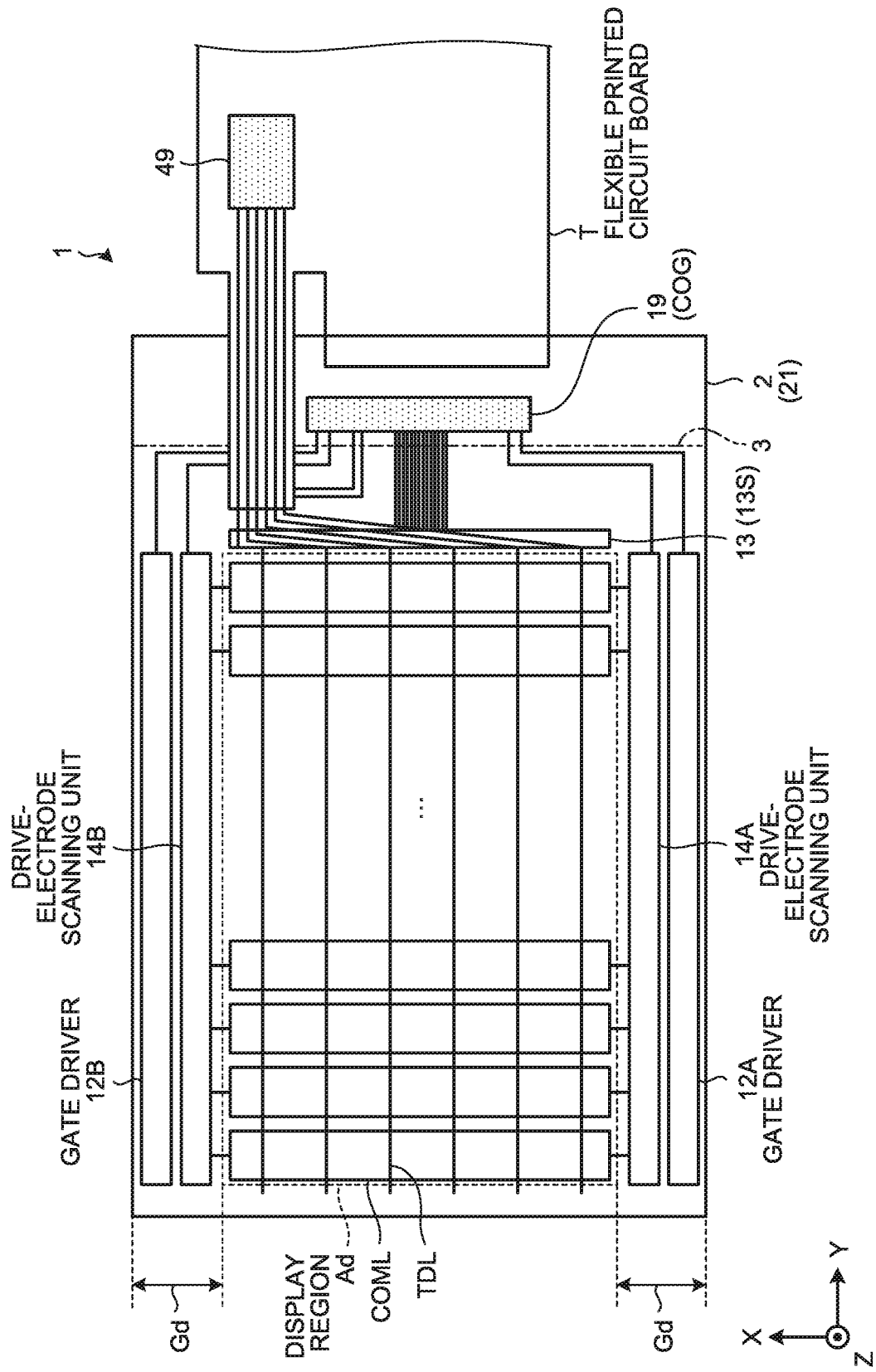
FIG. 10 is a diagram illustrating an example of a module in which the display device according to the embodiment is implemented.

FIG. 10 is a diagram illustrating an example of a module in which the display device according to the embodiment is implemented. The display device 1 includes a first substrate (e.g., an array substrate 2) and a printed circuit board (e.g., a flexible printed circuit board) T.

The array substrate 2 includes a first insulation substrate (e.g., a TFT substrate 21). The TFT substrate 21 is a glass substrate or a film substrate, for example. A drive IC chip (e.g., a chip-on-glass (COG) 19) is mounted on the TFT substrate 21. A display region Ad of the display unit 20 and frames Gd are formed on the array substrate 2 (the TFT substrate 21).

The COG 19 is an IC chip that is a driver mounted on the TFT substrate 21, and is also a control device in which various circuits needed for a display operation, such as the display controller 11 illustrated in FIG. 2, are built.

In the present configuration example, the source driver 13 and the source selector 13S are formed on the TFT substrate 21. The source driver 13 and the source selector 13S may be built into the COG 19.

Drive-electrode scanning units 14A and 14B, which are a part of the drive electrode driver 14, are formed on the TFT substrate 21.

The gate driver 12 is formed on the TFT substrate 21 as gate drivers 12A and 12B.

In the display device 1, the circuits of the drive-electrode scanning units 14A and 14B, the gate driver 12, and others may be built into the COG 19. The COG 19 is merely one form of implementation, and the present disclosure is not limited thereto. For example, a configuration having the same functions as those of the COG 19 may be implemented in the flexible printed circuit board T as a chip-on-film (COF) or a chip-on-flexible (COF) printed circuit.

As illustrated in FIG. 10, the drive electrodes COML and the touch detection electrodes TDL are formed so as to three-dimensionally intersect with each other in the vertical direction with respect to the surface of the TFT substrate 21. In the present embodiment, the drive electrodes COML are arranged corresponding to respective pixel rows.

The drive electrode COML is divided into a plurality of stripe-shaped electrode patterns extending in one direction. At the time of the touch detection, either of the drive signal Vcomtm or Vcomts2 for touch detection is supplied in sequence to each electrode pattern by the drive electrode driver 14.

The drive electrodes COML are formed in a direction that is parallel to the short sides of the display section 10 with a touch detection function. The touch detection electrodes TDL, which will be described later, are formed in a direction intersecting with the extending direction of the drive electrodes COML, and are formed in a direction that is parallel to the long sides of the display section 10 with a touch detection function, for example.

The touch detection electrodes TDL overlap the drive electrodes COML. The touch detection electrodes TDL are coupled to a touch IC 49. The touch IC 49 is mounted on the flexible printed circuit board T that is coupled to a short side portion of the display section 10 with a touch detection function. The touch IC 49 is an IC chip and is also a control device in which various circuits needed for a touch operation, such as the touch detection controller 40 illustrated in FIG. 2, are built. The touch IC 49 is coupled to each of the touch detection electrodes TDL that are arranged in juxtaposition. The flexible printed circuit board T only needs to serve as a terminal, and is not limited to a substrate. In this case, the touch IC 49 is provided outside the module. The touch IC 49 may be arranged on the TFT substrate 21 or a second insulation substrate 31.

In the present configuration example, the touch IC 49 is a control device that functions as the touch detection controller 40. However, another micro processing unit (MPU) may have some of the functions of the touch detection controller 40.

Specifically, some of the functions (e.g., noise removal) among the various functions such as the A/D conversion, and the noise removal that can be provided as functions of an IC chip serving as a touch driver may be implemented by a circuit such as the MPU which is separately provided from the IC chip serving as a touch driver. When only one IC chip serving as a driver is provided (a single chip configuration), the touch detection signals may be transmitted to the IC chip serving as a touch driver on the array substrate 2 via the wiring on the flexible printed circuit board T, for example.

The source selector 13S is formed near the display region Ad on the TFT substrate 21 by using TFT elements. A large number of pixels Pix are arranged in a matrix form (a row-column configuration) in the display region Ad. The frames Gd are regions where no pixel Pix is arranged when the surface of the TFT substrate 21 is viewed from the vertical direction. The gate driver 12 and the drive-electrode scanning units 14A and 14B of the drive electrode driver 14 are arranged in the frames Gd.

The gate driver 12 includes the gate drivers 12A and 12B, and is formed on the TFT substrate 21 by using TFT elements, for example. The gate drivers 12A and 12B are provided on both sides of the TFT substrate 21 with the display region Ad interposed therebetween. The scanning lines are arranged between the gate driver 12A and the gate driver 12B. Thus, the scanning lines extend in a direction parallel to the extending direction of the drive electrodes COML when viewed from a direction perpendicular to the surface of the TFT substrate 21.

In the present configuration example, two circuits, i.e., the gate drivers 12A and 12B, are provided as the gate driver 12. However, the present disclosure is not limited thereto. For example, the gate driver 12 may be a single circuit provided on only one end of the scanning lines.

The drive electrode driver 14 includes the drive-electrode scanning units 14A and 14B, and is formed on the TFT substrate 21 by using TFT elements, for example. The COG 19 applies the display drive voltage Vcomd to the drive-electrode scanning units 14A and 14B, and also applies the touch-detection drive signals Vcomtm and Vcomts2 to the drive-electrode scanning units 14A and 14B. The drive-electrode scanning units 14A and 14B drive each of the juxtaposed drive electrodes COML from both sides thereof.

In the present configuration example, two circuits, i.e., the drive-electrode scanning units 14A and 14B, are provided as the drive electrode driver 14. However, the present disclosure is not limited thereto. For example, the drive electrode driver 14 may be a single circuit provided on only one end of a drive electrode block B.

Figure 11:
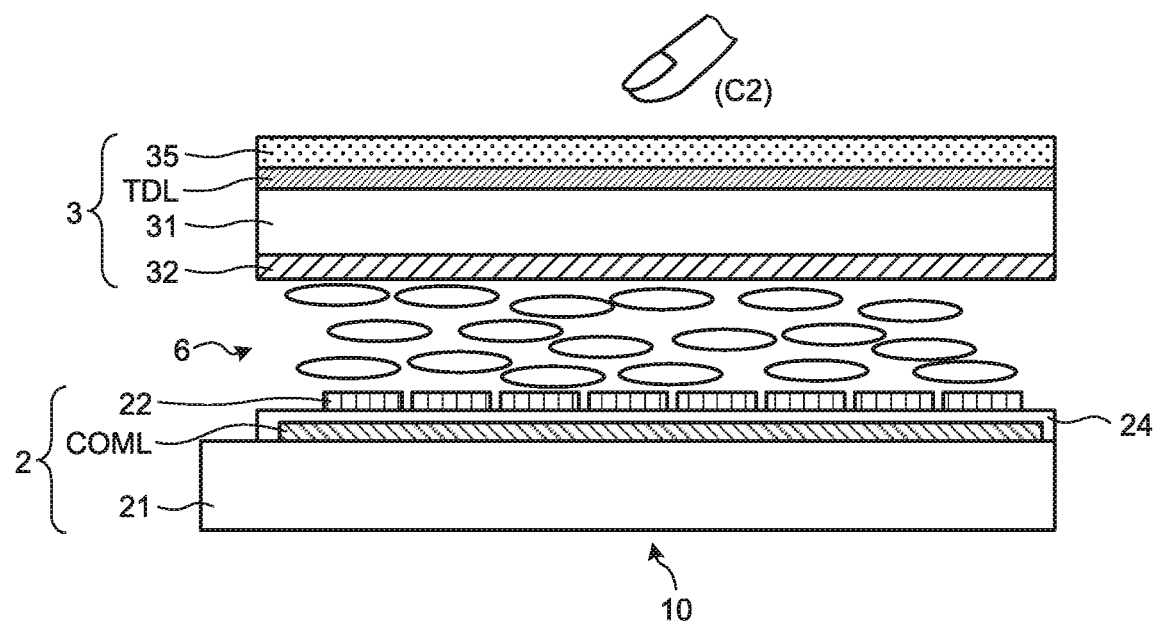
FIG. 11 is a sectional view illustrating a schematic cross section structure of the display unit with a touch detection function.
Figure 12:
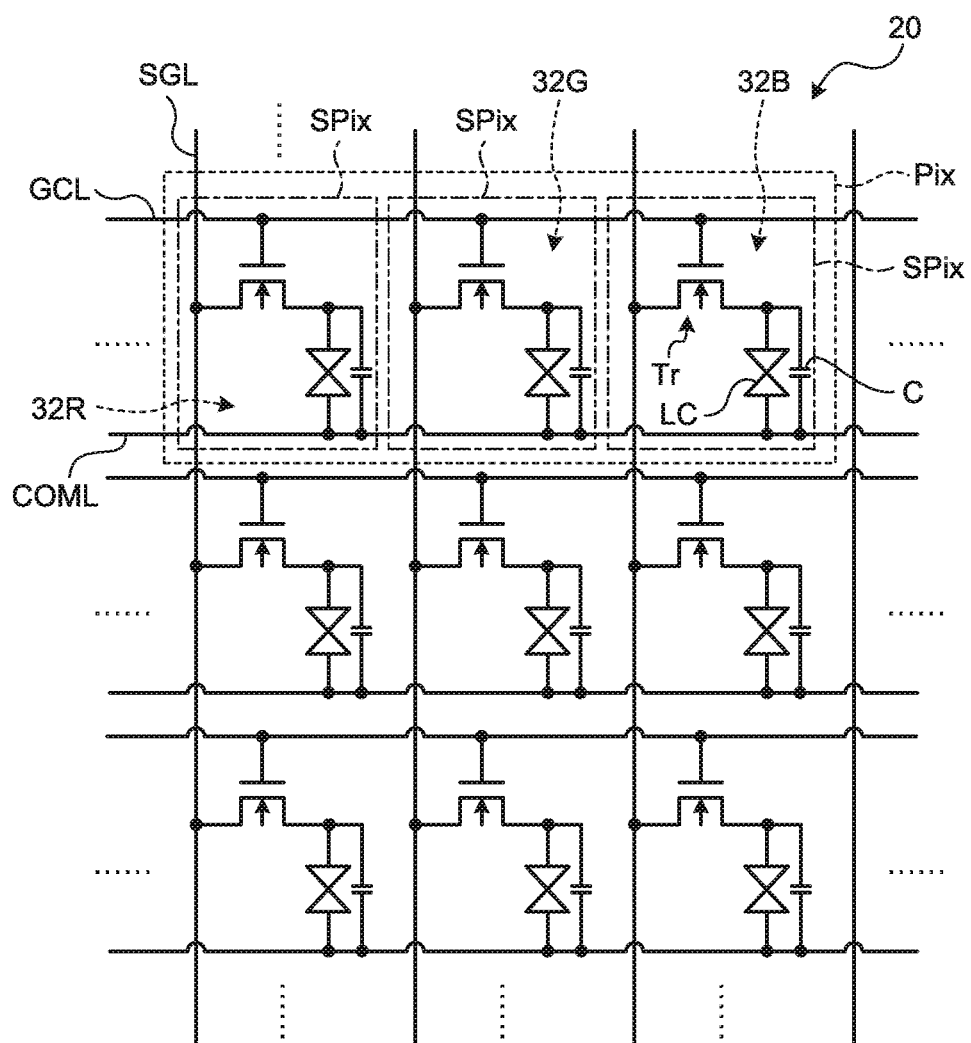
FIG. 12 is a schematic circuit diagram illustrating arrangement of pixels in the display unit with a touch detection function.

FIG. 11 is a sectional view illustrating a schematic cross section structure of the display unit with a touch detection function. FIG. 12 is a schematic circuit diagram illustrating arrangement of pixels in the display unit with a touch detection function. The display section 10 with a touch detection function includes the array substrate 2, a second substrate (e.g., a counter substrate 3) facing the surface of the array substrate 2 in the direction perpendicular to the surface of the array substrate 2, and a display function layer (e.g., a liquid crystal layer 6) that is interposed between the array substrate 2 and the counter substrate 3.

The array substrate 2 includes the TFT substrate 21 as a circuit board, a plurality of pixel electrodes 22 arranged in a row-column configuration on the TFT substrate 21, a plurality of drive electrodes COML formed between the TFT substrate 21 and the pixel electrodes 22, and an insulating layer 24 that insulates the pixel electrodes 22 and the drive electrodes COML from each other. The pixel electrodes 22 and the drive electrodes COML face each other.

The TFT substrate 21 is provided with thin film transistor (TFT) elements Tr as switching elements each constituting the sub pixel SPix illustrated in FIG. 12, and wiring such as the source lines SGL that supply the pixel signals Vpix to each of the pixel electrodes 22 illustrated in FIG. 12 and the gate lines GCL that drive the respective TFT elements Tr illustrated in FIG. 12. The source lines SGL extend on a plane in parallel to the surface of the TFT substrate 21, and supply the pixel signals Vpix for displaying an image to the sub pixels SPix. The sub pixel SPix refers to a constituent unit controlled by the pixel signal Vpix. The sub pixel SPix is a region surrounded by the source lines SGL and the gate lines GCL and indicates a constituent unit controlled by the TFT element Tr.

As illustrated in FIG. 12, the display unit 20 has a plurality of sub pixels SPix arranged in a row-column configuration. The sub pixel SPix includes the TFT element Tr, a liquid crystal element LC, and holding capacitance C. The TFT element Tr is a switching element constituted by a thin-film transistor. In this example, the TFT element Tr is constituted by an n-channel metal oxide semiconductor (MOS) TFT.

One of the source and the drain of the TFT element Tr is coupled to the source line SGL. The gate is coupled to the gate line GCL. The other of the source and the drain is coupled to one end of the liquid crystal element LC and the holding capacitance C. One end of the liquid crystal element LC and one end of the holding capacitance C are each coupled to the drain of the TFT element Tr, and the other end of the liquid crystal element LC and the holding capacitance C are each coupled to the drive electrode COML, for example. The one end of the liquid crystal element LC coupled to the TFT element Tr constitutes the pixel electrode 22. In other words, the pixel electrode 22 in the display unit 20 is arranged for each region sectioned by the scanning lines (the gate lines GCL) and the signal lines (the source lines SGL) intersecting with the scanning lines (the gate lines GCL), so that the pixel electrodes 22 are arranged in a row-column configuration. In FIG. 11, the drive electrodes COML, the insulating layer 24, the pixel electrodes 22 are sequentially stacked on the TFT substrate 21. However, the present disclosure is not limited thereto. The pixel electrodes 22, the insulating layer 24, and the drive electrodes COML may be sequentially stacked on the TFT substrate 21, or the drive electrodes COML and the pixel electrodes 22 may be formed in the same layer with the insulating layer 24 interposed therebetween.

The sub pixel SPix is coupled to other sub pixels SPix belonging to the same row of the display unit 20 by the gate line GCL. The gate lines GCL are coupled to the gate driver 12, and are supplied with the scanning signals Vscan from the gate driver 12.

The sub pixel SPix is coupled to other sub pixels SPix belonging to the same column of the display unit 20 by the source line SGL. The source lines SGL are coupled to the source driver 13, and are supplied with the pixel signals Vpix from the source driver 13.

Moreover, the sub pixel SPix is coupled to other sub pixels SPix belonging to the same row of the display unit 20 by the drive electrode COML. The drive electrodes COML are coupled to the drive electrode driver 14, and the display drive voltage Vcomd is applied to the drive electrodes COML by the drive electrode driver 14. That is, in this example, the sub pixels SPix belonging to a plurality of rows share a single drive electrode COML.

The extending direction of the drive electrodes COML in the present configuration example is parallel to the extending direction of the gate lines GCL. The extending direction of the drive electrodes COML is not limited thereto. For example, the extending direction of the drive electrodes COML may be parallel to the extending direction of the source lines SGL. The extending direction of the touch detection electrodes TDL is not limited to the extending direction of the source lines SGL. The extending direction of the touch detection electrodes TDL may be parallel to the extending direction of the gate lines GCL.

The gate driver 12 illustrated in FIG. 2 applies the scanning signals Vscan to the gates of the TFT elements Tr of the sub pixels SPix via the gate line GCL illustrated in FIG. 12. Accordingly, the sub pixels SPix of one row (one horizontal line) are selected in sequence as a target of display drive.

The source driver 13 illustrated in FIG. 2 supplies the pixel signals Vpix to the sub pixels SPix constituting one horizontal line selected by the gate driver 12 via the source lines SGL illustrated in FIG. 12. Then, display is performed in these sub pixels SPix in accordance with the supplied pixel signals Vpix.

The drive electrode driver 14 illustrated in FIG. 2 applies the display drive voltage Vcomd to a predetermined number of drive electrodes COML to drive them when performing the display operation.

As described above, in the display unit 20, the gate driver 12 time-divisionally scans and drives each gate line GCL corresponding to one horizontal line to sequentially select each one horizontal line. In the display unit 20, the source driver 13 supplies the pixel signals Vpix to the sub pixels SPix belonging to one horizontal line, thereby performing display for each one horizontal line. When performing this display operation, the drive electrode driver 14 simultaneously applies the display drive voltage Vcomd to the drive electrode COML corresponding to the one horizontal line. A configuration in which the display drive voltage Vcomd is applied to all the drive electrodes COML can also be employed.

The liquid crystal layer 6 modulates light that passes therethrough according to the state of an electric field. When the electric field according to the pixel signal Vpix supplied to the pixel electrode 22 is generated in the liquid crystal layer 6, the liquid crystal molecules are oriented in accordance with the electric field. Accordingly, the light that passes through the liquid crystal layer 6 is modulated for each sub pixel.

In this manner, the pixel electrode 22 and the drive electrode COML function as a pair of electrodes that generates an electric field in the liquid crystal layer 6. That is, the display unit 20 functions as the display unit DP in which the content of display output changes according to the electrical charges given to the pair of electrodes.

In the present configuration example, the display unit 20 may employ a display unit that uses liquid crystal of a transverse electric field mode such as an in-plane switching (IPS) mode including a fringe field switching (FFS) mode, for example. An orientation film may be disposed between the liquid crystal layer 6 illustrated in FIG. 11 and the array substrate 2, and an orientation film may be disposed between the liquid crystal layer 6 and the counter substrate 3.

While the display unit 20 has the configuration supporting the transverse electric field, it may have a configuration supporting other display modes. For example, the display unit 20 may have a configuration supporting a mode using a longitudinal electric field generated mainly between principal surfaces of substrates, such as a twisted nematic (TN) mode, an optically compensated bend (OCB) mode, and a vertical aligned (VA) mode. The display mode using the longitudinal electric field mode may employ a configuration in which the pixel electrodes 22 are provided on the array substrate 2, and the drive electrodes COML are provided on the counter substrate 3.

The counter substrate 3 includes the second insulation substrate 31, and a color filter 32 formed on one surface of the second insulation substrate 31. The touch detection electrodes TDL serving as the detection electrodes of the touch detection unit 30 are formed on the other surface of the second insulation substrate 31. Further, a polarizing plate 35 is disposed on the touch detection electrodes TDL.

A method for implementing the color filter 32 may be a color-filter on array (COA) method, according to which the color filter 32 is formed on the array substrate 2.

In the color filter 32 illustrated in FIG. 11, color regions colored in three colors, for example, red (R), green (G), and blue (B), are periodically arranged so that the color regions 32R, 32G, and 32B having respective three colors of R, G, and B are associated with the respective sub pixels SPix. The color regions 32R, 32G, and 32B as one set constitute the pixel Pix.

The pixels Pix are arranged in a row-column configuration along the direction in parallel with the gate lines GCL and along the direction in parallel with the source lines SGL to form the display region Ad. The color filter 32 faces the liquid crystal layer 6 in the direction perpendicular to the TFT substrate 21.

The color filter 32 may have a combination of other colors as long as it is colored in different colors. The color filter 32 may be not provided. Accordingly, there may be a region where no color filter 32 is present, that is, there may be a sub pixel SPix that is not colored. The number of sub pixels SPix constituting the pixel Pix may be four or more.

Figure 13:
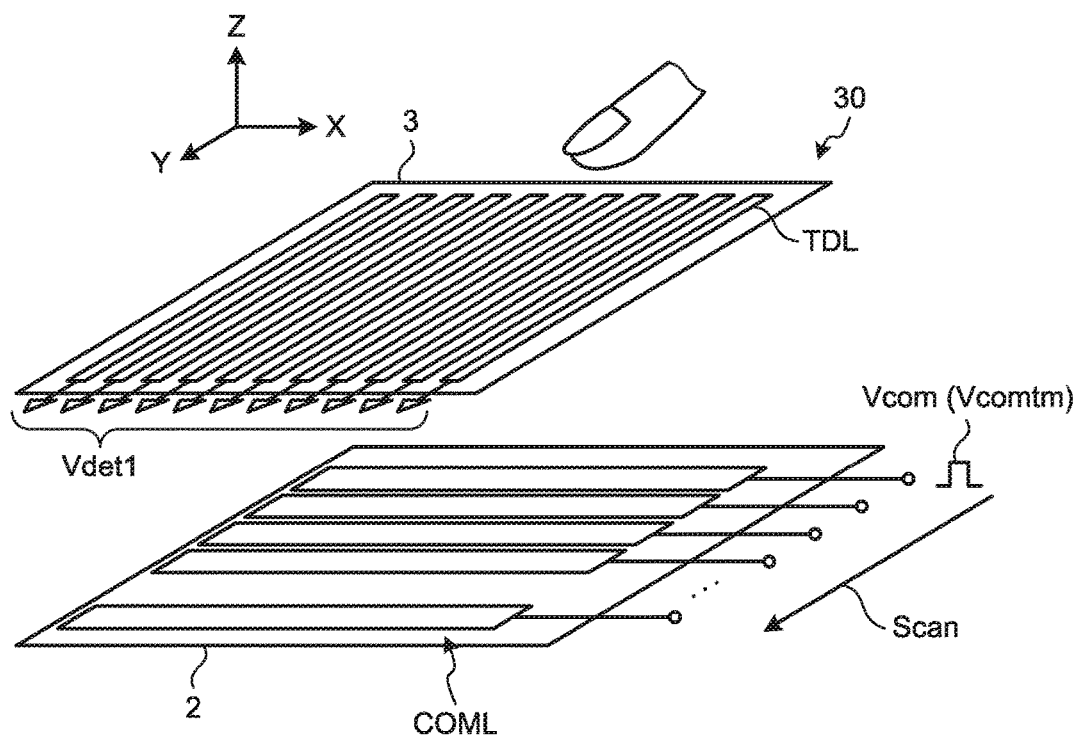
FIG. 13 is a perspective view illustrating a configuration example of drive electrodes and touch detection electrodes of the display unit with a touch detection function.

FIG. 13 is a perspective view illustrating a configuration example of drive electrodes and touch detection electrodes of the display unit with a touch detection function. The drive electrodes COML in the present configuration example function as the drive electrodes of the display unit 20 and also function as the drive electrodes of the touch detection unit 30.

The drive electrodes COML face the pixel electrodes 22 in the direction perpendicular to the surface of the TFT substrate 21. The drive electrodes COML provided on the array substrate 2 and the touch detection electrodes TDL provided on the counter substrate 3 constitute the touch detection unit 30.

Stripe-shaped electrode patterns extending in the direction intersecting with the extending direction of the electrode patterns of the drive electrodes COML constitute the touch detection electrodes TDL. The touch detection electrodes TDL face the drive electrodes COML in the direction perpendicular to the surface of the TFT substrate 21. Each electrode pattern of the touch detection electrodes TDL is coupled to an input terminal of the touch-detection signal amplifier 42 of the touch detection controller 40.

The electrode patterns formed by the drive electrodes COML and the touch detection electrodes TDL intersecting with each other generate capacitance at the intersections. The touch detection unit 30 performs the touch detection by the drive electrode driver 14 applying the drive signals Vcomtm for touch detection to the drive electrodes COML, and the touch detection TDL outputting the touch detection signals Vdet1.

That is, the drive electrode COML corresponds to the drive electrode E1, and the touch detection electrode TDL corresponds to the touch detection electrode E2 according to the basic principle of touch detection in the mutual-capacitance sensing method illustrated in FIGS. 3 to 5. The touch detection unit 30 thus detects a touch according to this basic principle.

In this manner, the touch detection unit 30 includes the touch detection electrodes TDL that generates mutual capacitance with either one of the pixel electrodes 22 and the drive electrodes COML (e.g., the drive electrodes COML), and performs the touch detection in accordance with a change in the mutual capacitance.

The electrode patterns formed by the drive electrodes COML and the touch detection electrodes TDL intersecting with each other constitute mutual-capacitance touch sensors in a matrix form. Thus, the touch detection controller 40 can detect the position of contact or proximity of the object OBJ and the contact area thereof by scanning the entire input surface IS of the touch detection unit 30.

That is, in the touch detection unit 30, when performing the touch detection operation, the drive electrode driver 14 line-sequentially scans the drive electrodes COML illustrated in FIG. 10 in a time-division manner to drive them. Accordingly, the drive electrodes COML are sequentially selected in a scan direction Scan. The touch detection unit 30 then outputs the touch detection signals Vdet1 from the touch detection electrodes TDL. In this manner, the touch detection unit 30 performs the touch detection for each drive electrode COML.

While the relation between the number of the drive electrodes COML and the number of lines for the display output is discretionary, the drive electrode COML is provided in a touch detection region corresponding to a plurality of lines of the display region Ad in the present embodiment. In other words, while the relation between the number of the drive electrodes COML and any of the number of the opposing pixel electrodes, the number of the opposing gate lines, and the number of the opposing source lines is discretionary, the gate lines GCL face a single drive electrode COML in the present embodiment.

The shape of the touch detection electrode TDL or that of the drive electrode COML is not limited to a stripe shape divided into a plurality of pieces. For example, the touch detection electrode TDL or the drive electrode COML may have a comb-teeth shape. The touch detection electrode TDL or the drive electrode COML only needs to be divided into a plurality of pieces, and the shape of a slit that divides the drive electrode COML may be a straight line or may be a curved line.

The following describes an example in which the display device 1 performs the touch detection operation (in a touch period) and the display operation (in a display period) in a time-division manner as an example of the operation method for the display device 1 according to the present embodiment.

The drive electrode COML corresponds to one specific example of a "counter electrode".

Time-Division Drive Example of Display Operation and Touch Detection Operation

Figure 14:
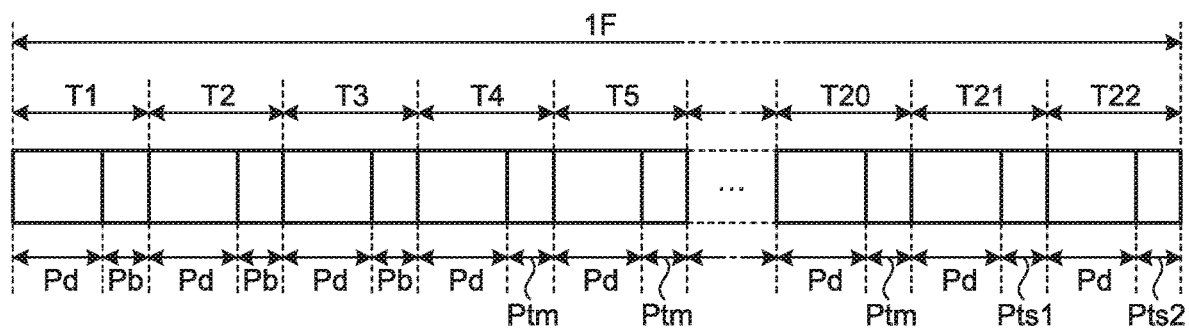
FIG. 14 is an example of a timing chart illustrating one frame period for the display device.

FIG. 14 is an example of a timing chart illustrating one frame period for the display device.

In the example illustrated in FIG. 14, in the display device 1, one frame period (one vertical period) for the video signals Vdisp is divided into twenty two periods from period T1 to period T22.

In the example illustrated in FIG. 14, in the first three periods from the period T1 to the period T3, a period after a display period Pd is a blank period Pb. The subsequent seventeen periods from the period T4 to the period T20 are time-divided into the display period Pd and a mutual-capacitance touch period Ptm. The subsequent period T21 is time-divided into the display period Pd, and a touch period Pts1 in which the self-capacitance touch detection is performed by the touch detection electrodes TDL. The period T22 is time-divided into the display period Pd, and a touch period Pts2 in which the self-capacitance touch detection by the drive electrodes COML is performed. In this manner, the display operation and the touch detection operation for one frame are performed by time-dividing one frame period into the display period Pd and the touch periods Ptm, Pts1, and Pts2. The number of division in one frame period is not limited to twenty two periods illustrated in FIG. 14.

In the example illustrated in FIG. 14, the scanning signal Vscan is sequentially supplied to each of eighty eight gate lines GCL in the period from the period T1 to the period T22. In general, the higher the display resolution, i.e., the higher the density of the pixels Pix in the display region Ad of the display device 1, the larger the number of source lines SGL and that of the gate lines GCL become. This increases a ratio of the display period Pd to one frame period, and relatively decreases a ratio of the touch periods Ptm, Pts1, and Pts2 to one frame period. For example, the number of pixels in each pixel column in displaying an image with the high-definition video signals Vdisp at a 4K2K resolution is greater (about twice greater) than the number of pixels in each pixel column in displaying an image with the video signals Vdisp at a full HD resolution (2K1K resolution, e.g., 1920×1080 pixels). Thus, the display period Pd occupying one frame period becomes longer. Accordingly, a blanking period of the display operation in one frame period is required to be shortened, and the touch period Pt that is provided in the blanking period becomes shorter. Consequently, the number of times the touch detection is performed in one frame period decreases, which may deteriorate the accuracy of the touch detection.

Meanwhile, depending on an actual display image, there may be a case where the image does not necessarily have to be displayed at the maximum resolution displayable on a display device (the maximum resolution displayable on the display unit 20, e.g., the 4K2K resolution). For example, it is conceivable that a display device capable of high-definition display of the 4K2K resolution is employed as a display device for a game machine, a mobile terminal such as a smartphone, or a game-pad. Such a display device can display moving images as well as still images. In this case, it is conceivable that a comfort level an observer feels becomes different depending on a resolution of the display image. Thus, the inventors of the present application have conducted the following verification.

Figure 15:
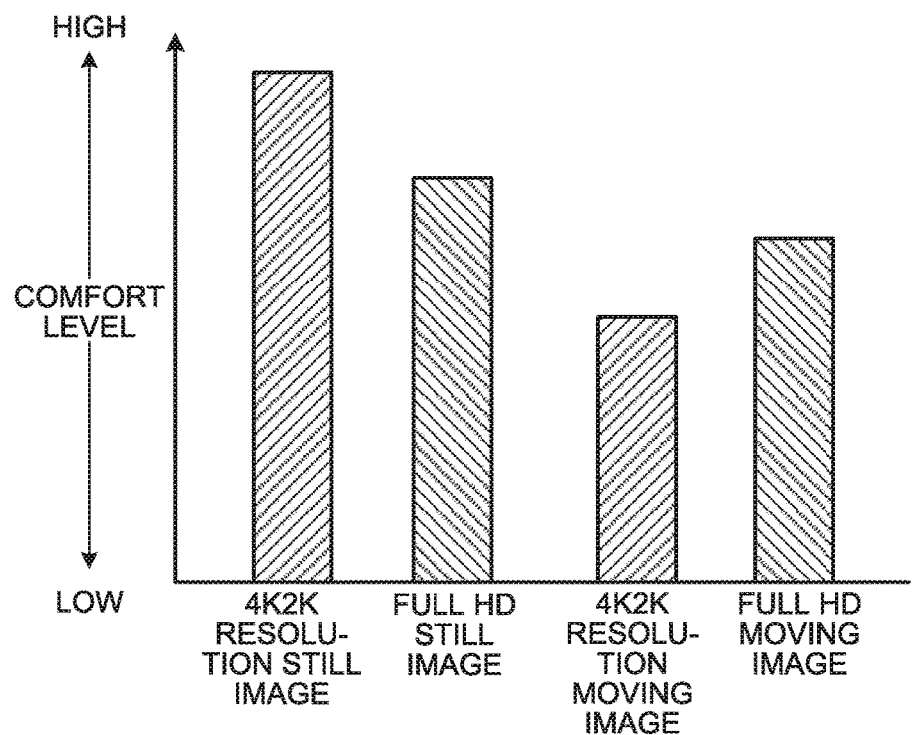
FIG. 15 is a diagram illustrating an example of sensory evaluations on a 4K2K moving image, a 4K2K still image, a full HD moving image, and a full HD still image.

FIG. 15 is a diagram illustrating an example of sensory evaluations on a 4K2K moving image, a 4K2K still image, a full HD moving image, and a full HD still image. In the example illustrated in FIG. 15, the ordinate axis represents highs and lows of the sensory evaluation using the comfort level of the observer as an index.

The example illustrated in FIG. 15 indicates a result in which the observer is less tired and more comfortable when still images are displayed at a high resolution (4K2K resolution in this case) than when still images are displayed at a low resolution (full HD resolution (1920×1080)). In this regard, it is conceivable that when the observer sees the still images at a low resolution having a relatively lower quality compared to that of still images at a high resolution, the observer recognizes the still images at a low resolution by complementing.

Meanwhile, the example illustrated in FIG. 15 indicates a result in which the observer is more comfortable when moving images are displayed at a low resolution than when the moving images are displayed at a high resolution. In this regard, it is conceivable that when the moving images are displayed at a high resolution, a motion blur is noticeable in a region where there is a motion in comparison to a region of displaying a still image among the same images.

Here, the touch detection accuracy will be considered. For example, in a type of usage such as a game in which player's operations and moving images are intricately mixed, it is necessary to detect the touch operation of the player with a higher degree of accuracy while displaying the moving images at a predetermined resolution. That is, the detection accuracy of a touch has to be prioritized over the image resolution. More specifically, when a player plays a game or the like, it is conceivable that display at a high resolution is more suitable than display at a low resolution in order to simultaneously achieve comfortableness with respect to display of moving images and detection accuracy in a touch operation by the player.

Meanwhile, in a type of usage in which a still image such as a photograph is displayed and viewed, it is conceivable that no problem occurs even if the touch detection accuracy is lowered than that in playing a game while the resolution of the image is at a maximum. More specifically, display at a high resolution is more suitable than display at a low resolution in order to simultaneously satisfy the comfortableness with respect to display of a still image and the detection accuracy of a touch operation.

Thus, the present embodiment has a configuration in which a resolution (hereinafter also referred to as a "display resolution") in performing display on the display unit 20 can be switched and a ratio between the display period Pd and the touch periods Ptm, Pts1, and Pts2 in one frame period can be changed in accordance with the video signals Vdisp. Accordingly, the present embodiment can optimize a display quality and touch detection accuracy. The following describes a configuration and an operation that allow the above-described switching operation.

First Embodiment

Figure 16:
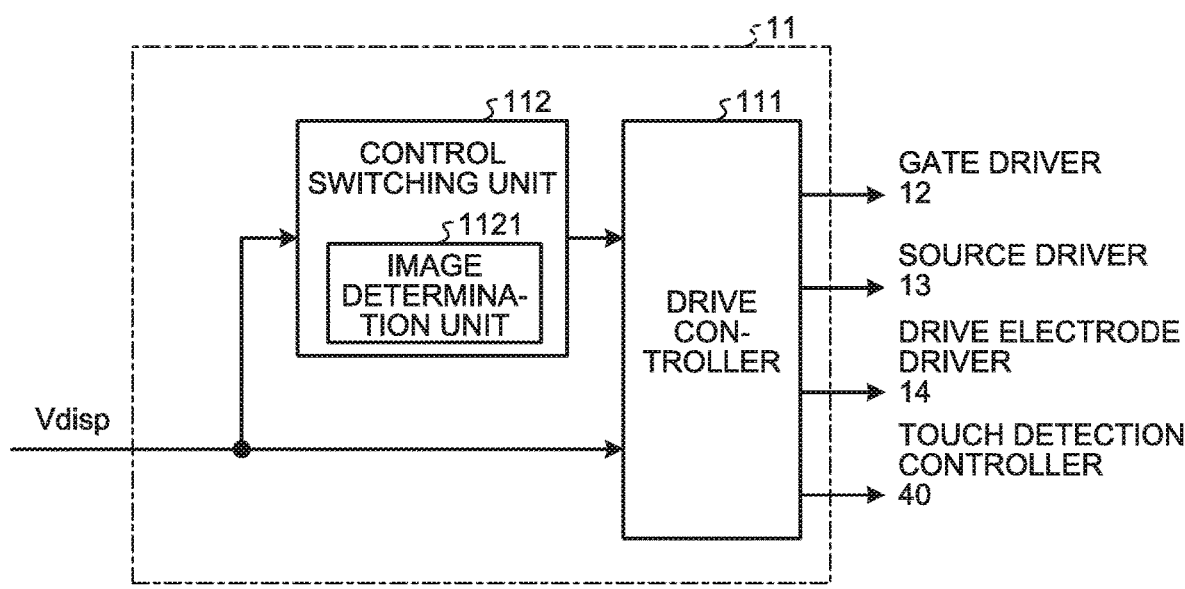
FIG. 16 is a diagram illustrating a configuration example of a display controller of a display device according to a first embodiment.

FIG. 16 is a diagram illustrating a configuration example of a display controller of a display device according to a first embodiment. As illustrated in FIG. 16, the display controller 11 of the display device 1 in the first embodiment includes a drive controller 111 and a control switching unit 112. The basic operation of the display controller 11 is as discussed above. The following describes the operations of the drive controller 111 and the control switching unit 112 in switching a display resolution and changing a ratio between the display period Pd and the touch periods Ptm, Pts1, and Pts2 in one frame period, in accordance with the video signals Vdisp. The following describes the switching operation between the display period Pd in which a display operation is performed and the touch period Ptm in which a mutual-capacitance touch detection operation is performed in the seventeen periods from the period T4 to the period T20 illustrated in FIG. 14.

The drive controller 111 controls the drive electrode driver 14 so as to apply the display drive voltage Vcomd to the drive electrodes COML in the display period Pd, and controls the drive electrode driver 14 so as to supply the touch drive signals Vcomtm to the drive electrodes COML at a predetermined touch detection frame rate in the mutual-capacitance touch period Ptm. In the first embodiment, the touch detection frame rate is exemplified as twice the frame rate of the video signals Vdisp (when the frame rate of the video signals Vdisp is 60 Hz, the touch detection frame rate is 120 Hz).

The control switching unit 112 includes an image determination unit 1121 that determines whether the image to be displayed on the display unit 20 is a still image or a moving image, in accordance with the video signals Vdisp.

The image determination unit 1121 makes the determination by checking the video signals Vdisp input to the display controller 11 for each frame and comparing the input video signals Vdisp with the video signals Vdisp of one previous frame period to determine if there is a region where any change is made, for example. Alternatively, the image determination unit 1121 may make the determination depending on whether a ratio of the changed region to the entire region exceeds a predetermined ratio. In order to perform such an operation, it is preferable that the display controller 11 be provided with a frame memory, for example. The determination on the image by the image determination unit 1121 is not limited to the above-described determination.

The control switching unit 112 switches a control state of the drive controller 111 based on the determination result by the image determination unit 1121. More specifically, when the image determination unit 1121 determines that the video signals Vdisp correspond to a still image, the control switching unit 112 outputs a first signal to the drive controller 111. The first signal indicates that the resolution of the image to be displayed (display resolution) on the display unit 20 coincides with the maximum resolution of the display unit 20, that is, the resolution (4K2K resolution, in this case) coincides with a resolution in accordance with the total number of pixels (maximum resolution) of the display unit 20. When the image determination unit 1121 determines that the video signals Vdisp correspond to a moving image, the control switching unit 112 outputs a second signal to the drive controller 111. The second signal indicates that the resolution of the image to be displayed on the display unit 20 is lower than the maximum resolution of the display unit 20, that is, the resolution (full HD resolution, in this case) is lower than the resolution in accordance with the total number of pixels (hereinafter referred to as the maximum resolution) of the display unit 20.

When the video signals Vdisp correspond to a moving image, the display device 1 according to the first embodiment having such a configuration displays the image at a low resolution by down-converting the video signals Vdisp in order to address the difference in resolution of the image and the difference in touch detection accuracy depending on a type of usage.

When receiving the first signal, the drive controller 111 performs control to perform the image display at the maximum resolution. The display period Pd in which the image display is performed at the maximum resolution corresponds to one specific example of a "first display period" in the present disclosure. In this case, the touch period Ptm time-divisionally provided with the first display period corresponds to one specific example of a "first touch period" in the present disclosure. Furthermore, the control state in which there are the first display period and the first touch period in one frame period for the video signals Vdisp corresponds to one specific example of a "first display state" in the present disclosure.

Meanwhile, when receiving the second signal, the drive controller 111 performs control so as to perform the image display at a low resolution. The display period Pd in which the image display is performed at a low resolution corresponds to one specific example of a "second display period" in the present disclosure. In this case, the touch period Ptm time-divisionally provided with the second display period corresponds to one specific example of a "second touch period" in the present disclosure. Furthermore, a control state in which there are the second display period and the second touch period in one frame period for the video signals Vdisp corresponds to one specific example of a "second display state" in the present disclosure.

Accordingly, when the image display is performed at a low resolution, the display period Pd occupying one frame period can be made shorter than that when the image display is performed at the maximum resolution. This can lengthen the blanking period of the display operation in one frame period. As a result, the touch period Ptm provided in the blanking period can be made longer than a case when the image display is performed at the maximum resolution. That is, the second display period in the second display state can be made shorter than the first display period in the first display state, and the second touch period in the second display state can be made relatively longer than the first touch period in the first display state.

In this manner, when the video signals Vdisp correspond to a moving image, the display device 1 in the first embodiment performs the image display at a low resolution by down-converting the video signals Vdisp, thereby making the ratio of the touch period Ptm to one frame period greater than that when the video signals Vdisp correspond to a still image. This can achieve a high-definition display quality in performing the display of a still image at the maximum resolution, and optimize the display quality and the touch detection accuracy during the display of a moving image at a low resolution.

Figure 17:
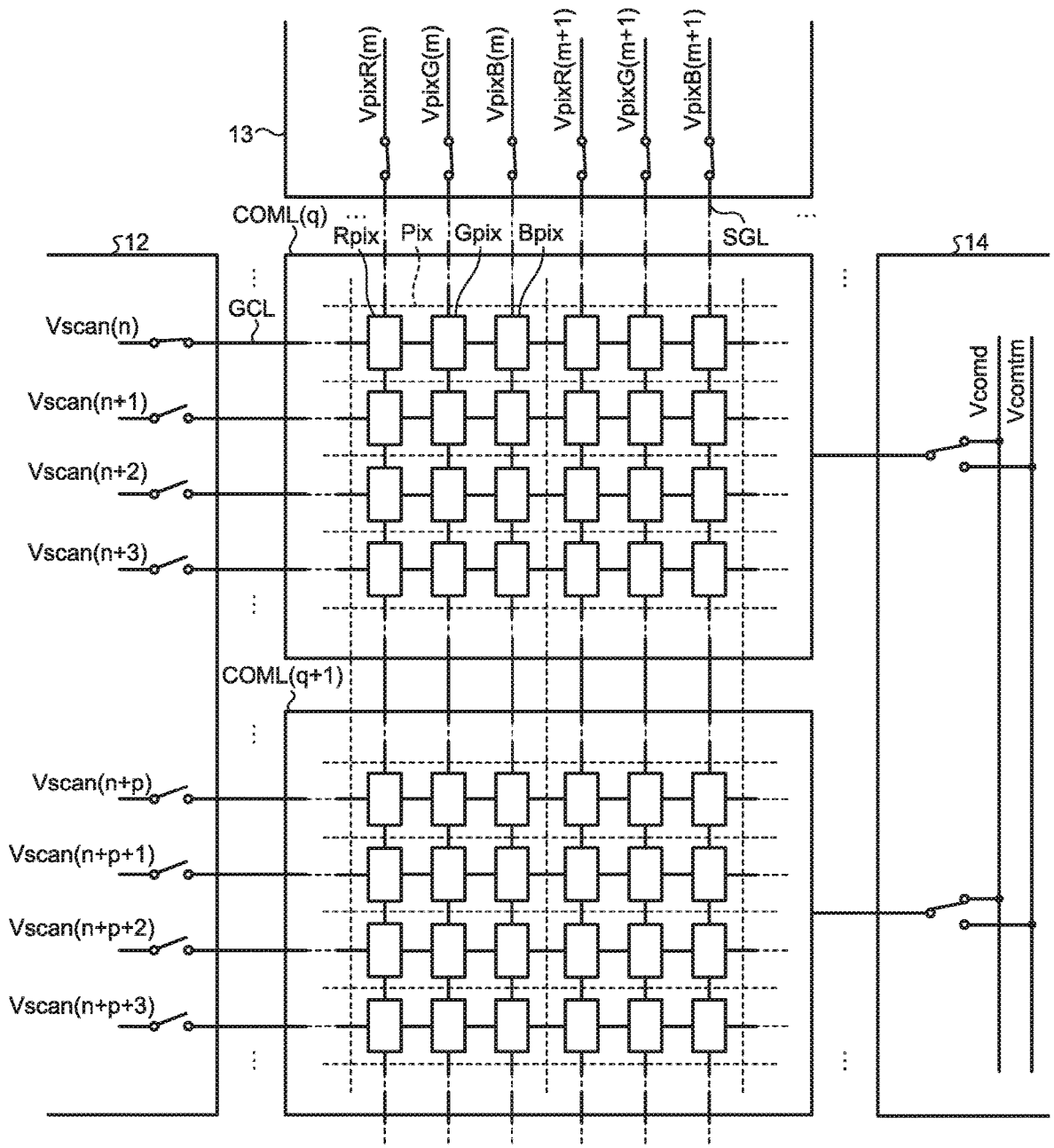
FIG. 17 is a diagram illustrating an operation example in a display period when the display device according to the first embodiment performs image display at the maximum resolution.
Figure 18:
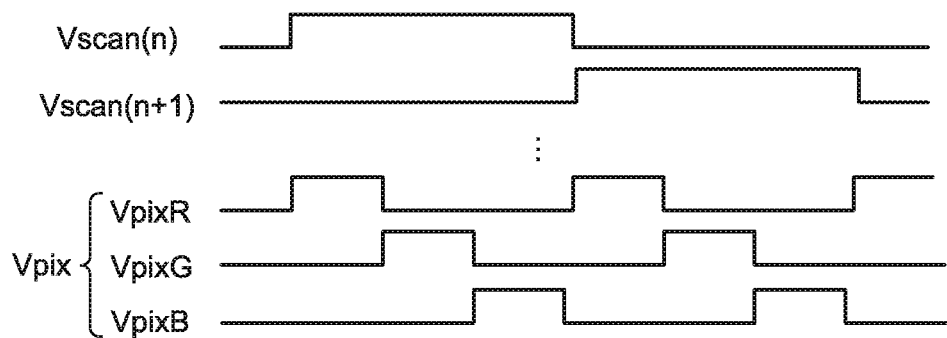
FIG. 18 is a timing chart of scanning signals and pixel signals in the example illustrated in FIG. 17.

FIG. 17 is a diagram illustrating an operation example in the display period when the display device according to the first embodiment performs the image display at the maximum resolution. FIG. 18 is a timing chart of scanning signals and pixel signals in the example illustrated in FIG. 17. The following describes an example in which the pixel Pix includes a sub pixel Rpix (red), a sub pixel Gpix (green), and a sub pixel Bpix (blue). The control state of the drive controller 111 is switched by the control switching unit 112 of the display controller 11 illustrated in FIG. 16, and the respective switches in the gate driver 12, the source driver 13, and the drive electrode driver 14 are controlled by the control signals output from the display controller 11.

In the display period Pd, as illustrated in FIG. 17, all the switches in the source driver 13 are controlled to be on, and are controlled to be in a state in which all sub pixel signals VpixR, VpixG, and VpixB can be output.

The drive electrode driver 14 is controlled so as to output the display drive voltage Vcomd, and apply the display drive voltage Vcomd to each drive electrode COML (in the example illustrated in FIG. 17, . . . , COML(q), COML(q+1), . . . ).

In performing the image display at the maximum resolution, the gate driver 12 is controlled so as to sequentially apply the scanning signals Vscan to each one horizontal line in the display period Pd. More specifically, the scanning signals Vscan are selected in the order of . . . , Vscan(n) (n is a natural number), Vscan(n+1), . . . , and the sub pixel signals VpixR, VpixG, and VpixB are supplied to the respective sub pixels Rpix, Gpix, and Bpix in this order (see FIG. 18).

That is, in performing the image display at the maximum resolution, the scanning signals Vscan are sequentially supplied to the eighty eight gate lines GCL, and the gate lines GCL are sequentially scanned in each of the display periods Pd from the period T1 to the period T22 illustrated in FIG. 14. In this manner, the display operation with the video signals Vdisp in one frame period is performed when the image display is performed at the maximum resolution.

Figure 19:
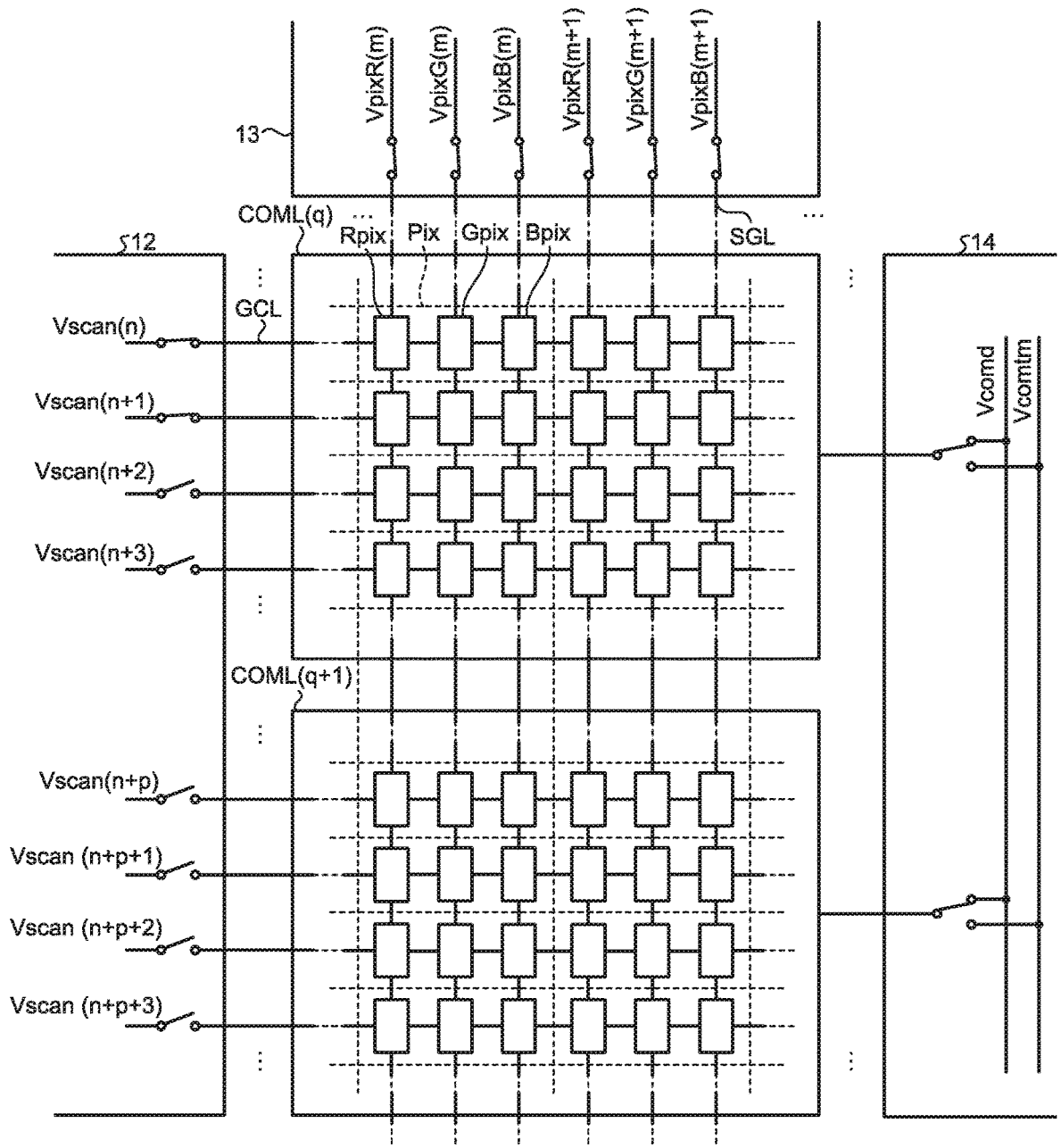
FIG. 19 is a diagram illustrating an operation example in a display period when the display device according to the first embodiment performs image display at a low resolution.
Figure 20:
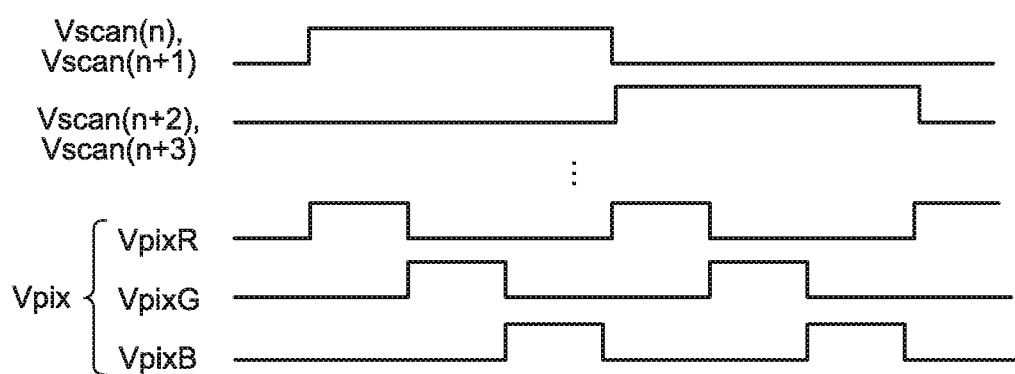
FIG. 20 is a timing chart of the scanning signals and the pixel signals in the example illustrated in FIG. 19.

FIG. 19 is a diagram illustrating an operation example in the display period when the display device according to the first embodiment performs the image display at a low resolution. FIG. 20 is a timing chart of scanning signals and pixel signals in the example illustrated in FIG. 19.

In performing the image display at a low resolution, the gate driver 12 is controlled so as to simultaneously supply the scanning signals Vscan to two adjacent gate lines GCL in the display period Pd. More specifically, after the scanning signals Vscan(n) and Vscan(n+1) are selected, the scanning signals Vscan(n+2) and Vscan(n+3) are subsequently selected (see FIG. 20).

Furthermore, when the scanning signals Vscan(n) and Vscan(n+1) are selected, identical pixel signals Vpix are supplied to two adjacent pixel columns. Specifically, the sub pixel signals VpixR(m) (m is a natural number) and VpixR(m+1) are identical signals. The sub pixel signals VpixG(m) and VpixG(m+1) are identical signals. The sub pixel signals VpixB(m) and VpixB(m+1) are identical signals. That is, the identical pixel signals Vpix (sub pixel signals VpixR, VpixG, VpixB) are simultaneously supplied to four pixels Pix that belong to two adjacent pixel rows to which the scanning signals Vscan are simultaneously supplied by the gate driver 12, and that belong to two pixel-columns to which the identical pixel signals Vpix are supplied by the source driver 13. In other words, the scanning signals Vscan are simultaneously supplied to the two adjacent scanning lines. With respect to the signal lines coupled to the sub pixels SPix of the same color, the identical pixel signals Vpix are simultaneously supplied to the two adjacent signal lines.

That is, in performing the image display at a low resolution, the scanning signals Vscan are simultaneously supplied to two adjacent gate lines GCL out of the eighty eight gate lines GCL in each of the display periods Pd from the period T1 to the period T22 illustrated in FIG. 14. In this manner, the display operation with the video signals Vdisp in one frame period is performed when the image display is performed at a low resolution.

The method of down-converting the video signals Vdisp when the image display is performed at a low resolution may employ a method of using a pixel signal supplied to any of pixels Pix out of the four pixels Pix to which identical pixel signals are simultaneously supplied when the image display is performed at the maximum resolution, or a method of using an average value of pixel signals supplied to the respective pixels Pix when the image display is performed at the maximum resolution. The down-converting method of the video signals Vdisp when the image display is performed at a low resolution is not intended to limit the present disclosure.

Figure 21:
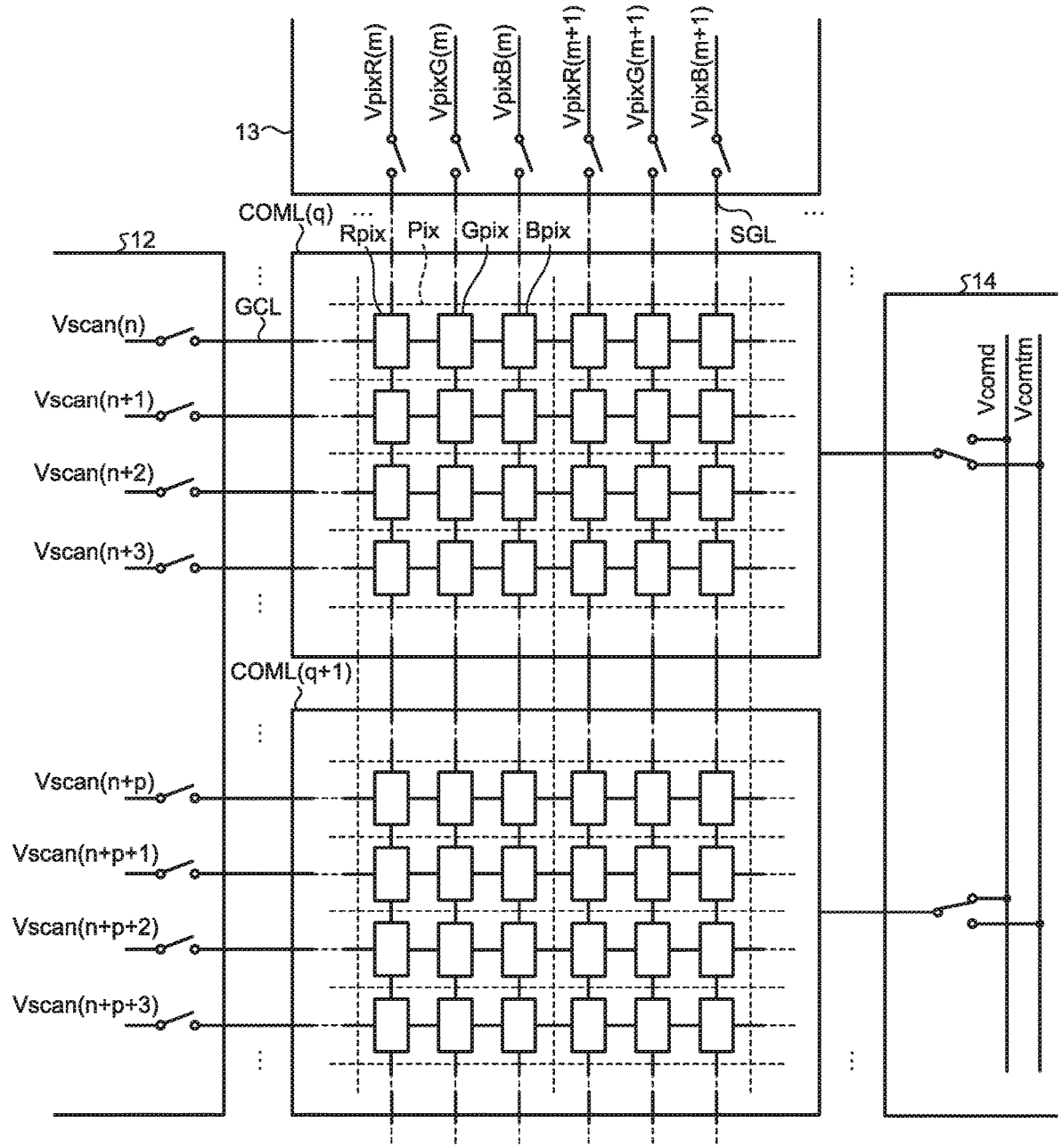
FIG. 21 is a diagram illustrating an operation example in a touch period of the display device according to the first embodiment.

FIG. 21 is a diagram illustrating an operation example in the touch period of the display device according to the first embodiment.

In the touch period Ptm, as illustrated in FIG. 21, all the switches in the source driver 13 are controlled to be off. Further, all the switches in the gate driver 12 are controlled to be off. Then, the drive electrode driver 14 is controlled so as to sequentially supply the touch drive signal Vcomtm to each drive electrode COML. More specifically, the drive electrodes are selected in the order of . . . , COML(q), COML(q+1), . . . , and the touch drive signals Vcomtm are sequentially supplied to the drive electrodes . . . , COML(q), COML(q+1), . . . .

In the first embodiment, in one frame period of the video signals Vdisp, the touch drive signal Vcomtm is supplied twice to each of the drive electrodes . . . , COML(q), COML(q+1), . . . .

Figure 22:
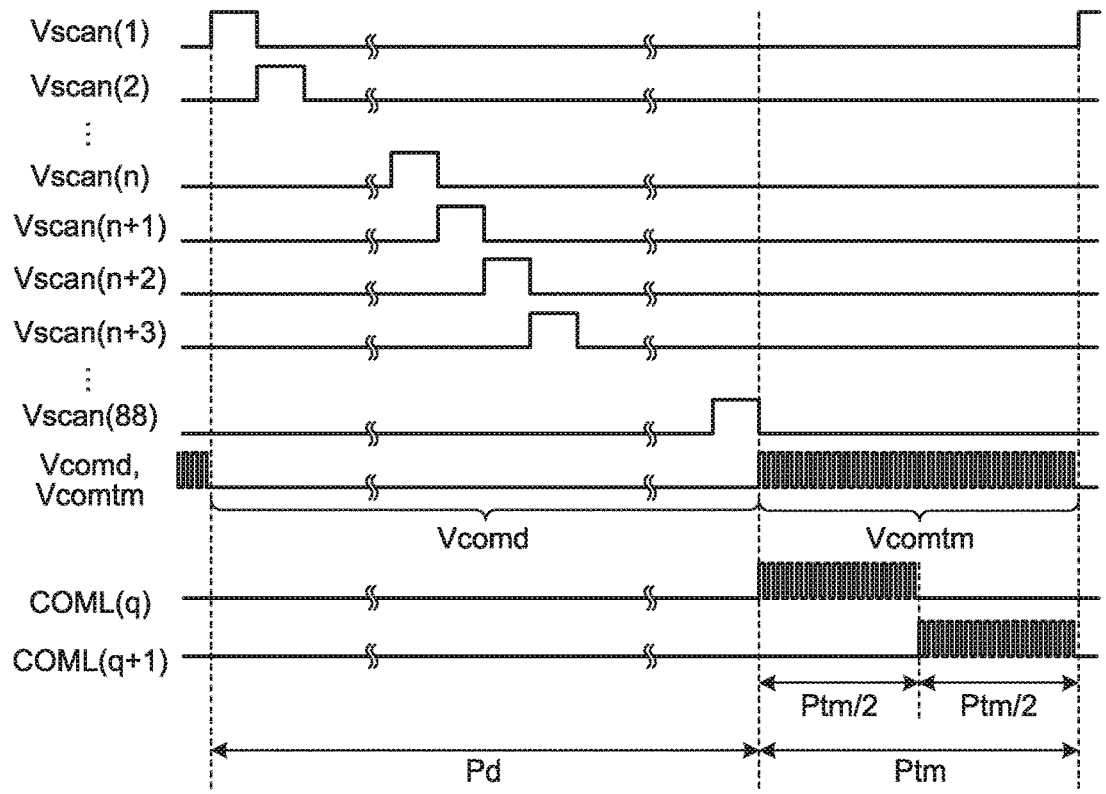
FIG. 22 is an example of a timing chart when the display device according to the first embodiment performs image display at the maximum resolution.
Figure 23:
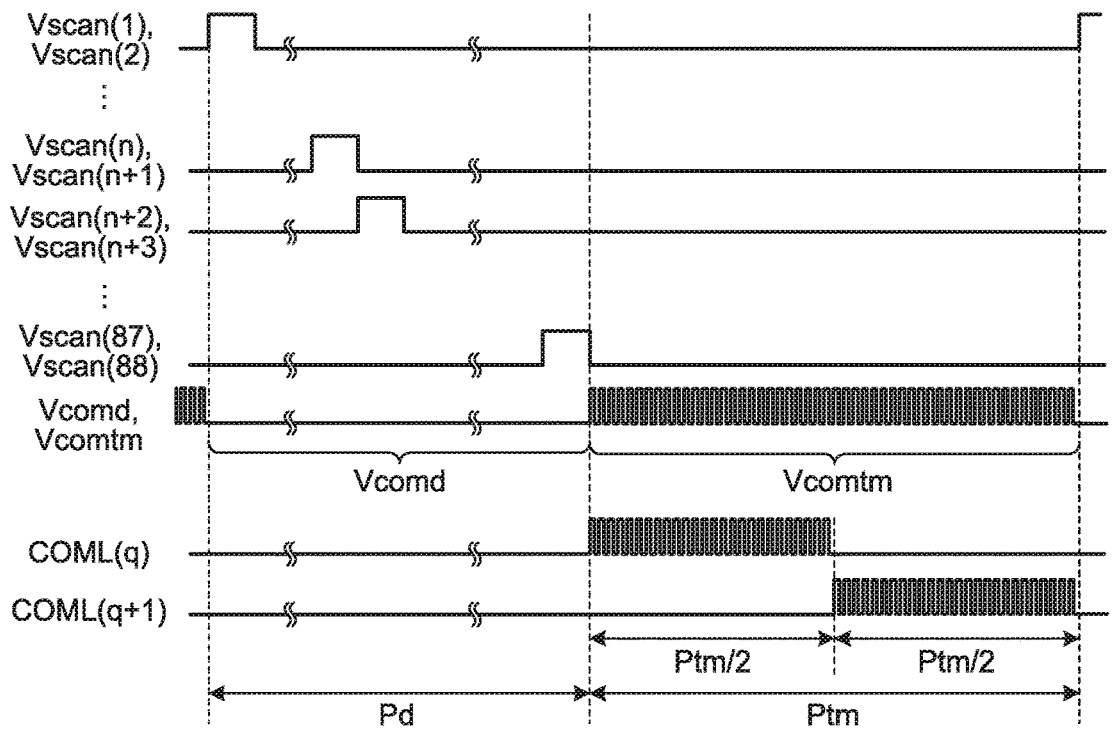
FIG. 23 is an example of a timing chart when the display device according to the first embodiment performs image display at a low resolution.

FIG. 22 is an example of a timing chart when the display device according to the first embodiment performs the image display at the maximum resolution. FIG. 23 is an example of a timing chart when the image display is performed at a low resolution in the display device according to the first embodiment.

The examples illustrated in FIGS. 22 and 23 indicate the scanning signals Vscan(1), Vscan(2), ..., Vscan(88) output to the respective eighty eight gate lines GCL, the display drive voltage Vcomd supplied to the drive electrodes COML, and the touch drive signal Vcomtm in each of the periods from the period T4 to the period T20 illustrated in FIG. 14. In the examples illustrated in FIGS. 22 and 23, the display drive voltage Vcomd and the touch drive signal Vcomtm are indicated on a single time axis for a simple explanation.

In the first embodiment, the touch drive signal Vcomtm is supplied to any one of the drive electrodes ..., COML(q), COML(q+1), ... illustrated in FIGS. 17, 19, and 21, in only a period corresponding to one half of the mutual-capacitance touch period Ptm. In the examples illustrated in FIGS. 22 and 23, the touch drive signal Vcomtm is supplied to the drive electrode COML(q) in the first one-half period of the mutual-capacitive touch period Ptm (Ptm/2), and the touch drive signal Vcomtm is supplied to the drive electrode COML(q+1) in the latter one-half period of the mutual-capacitance touch period Ptm (Ptm/2).

As illustrated in FIG. 22, in performing the image display at the maximum resolution, the scanning signals Vscan are sequentially supplied to the eighty eight gate lines GCL for each one horizontal line in the display period Pd.

As illustrated in FIG. 22, assuming the blanking period in the display operation to be the mutual-capacitive touch period Ptm, the touch drive signal Vcomtm is supplied to any one of the drive electrodes ..., COML(q), COML(q+1), ... illustrated in FIGS. 17, 19, and 21.

Meanwhile, as illustrated in FIG. 23, the scanning signals Vscan are simultaneously supplied to two adjacent gate lines GCL out of the eighty eight gate lines GCL in the display periods Pd. More specifically, in the example illustrated in FIG. 23, after the scanning signals Vscan(n) and Vscan(n+1) are supplied, the scanning signals Vscan(n+2) and Vscan(n+3) are supplied.

That is, in performing the image display at a low resolution, the scanning signals Vscan are simultaneously supplied to the two adjacent gate lines GCL in the display period Pd, as illustrated in FIG. 23. This can shorten the display period Pd (in the example illustrated in FIG. 23, reduced to half) than that when the image display is performed at the maximum resolution illustrated in FIG. 22.

As a result, in performing the image display at a low resolution (FIG. 23), the mutual-capacitance touch period Ptm provided in the blanking period for the display operation can be made longer than that when the image display is performed at the maximum resolution (FIG. 22). This can increase the number of pulses of the touch drive signal Vcomtm supplied to each of the drive electrodes COML (the respective drive electrodes ..., COML(q), COML(q+1), ... illustrated in FIGS. 17, 19, and 21) in the mutual-capacitance touch period Ptm. In other words, the configuration can increase the number of times of the touch detection performed for each drive electrode COML, thereby improving tolerance to noise and accuracy of touch detection.

The present embodiment may employ a configuration in which the scanning signals Vscan are simultaneously supplied to three or more adjacent gate lines GCL in performing the image display at a low resolution.

First Modification

Figure 24:
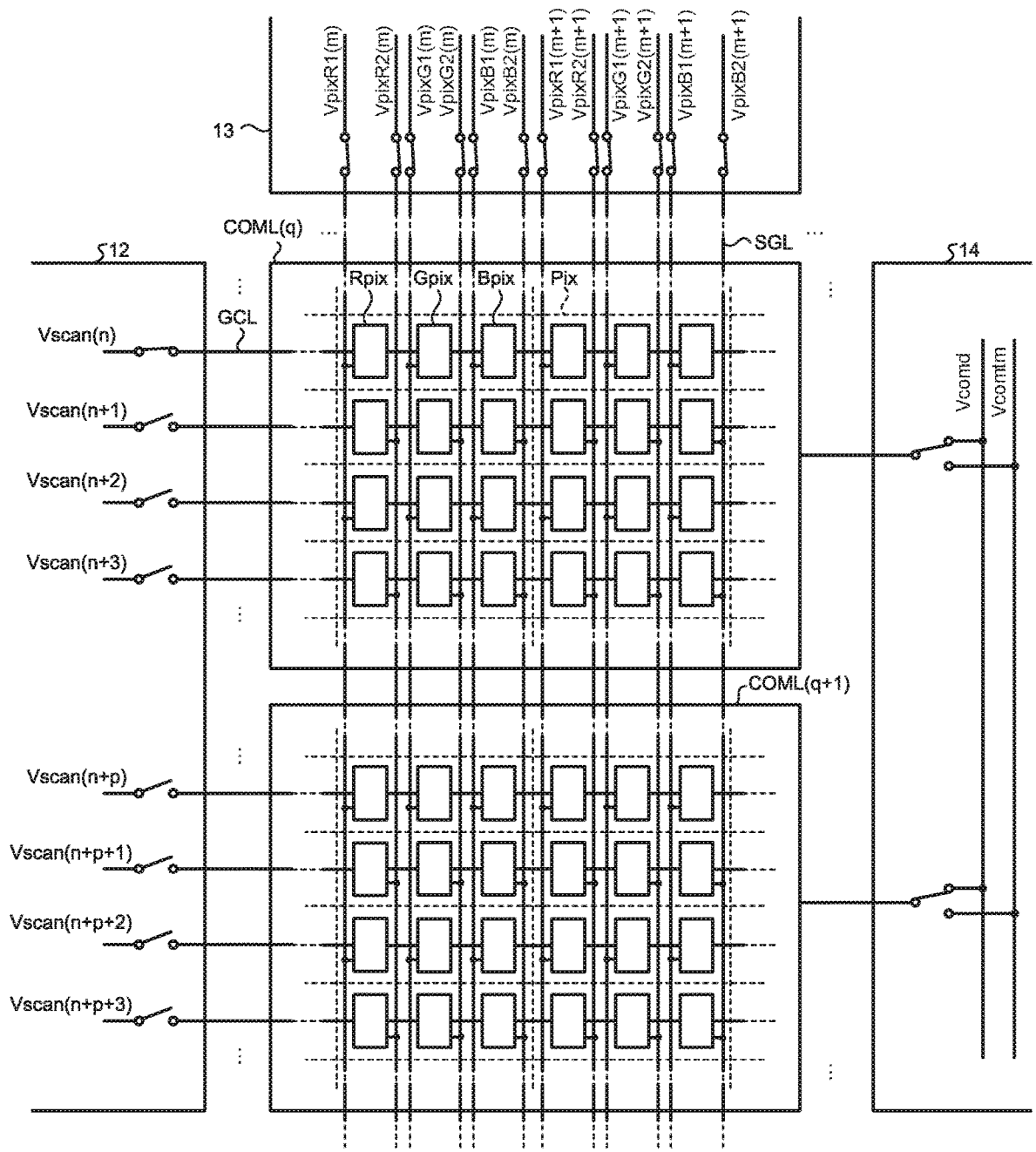
FIG. 24 is a diagram illustrating an operation example in a display period when the display device according to a first modification of the first embodiment performs image display at the maximum resolution.
Figure 25:
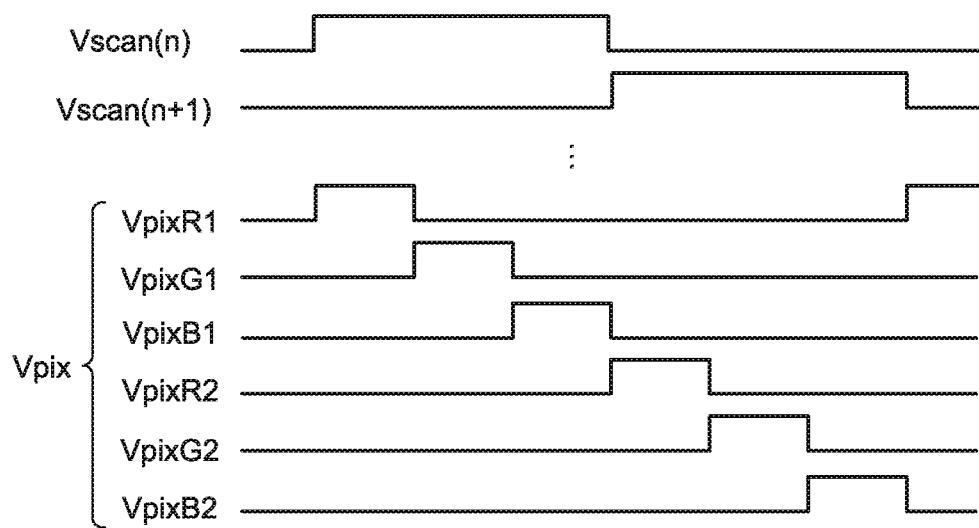
FIG. 25 is a timing chart of the scanning signals and the pixel signals in the example illustrated in FIG. 24.

FIG. 24 is a diagram illustrating an operation example in the display period when the display device according to a first modification of the first embodiment performs the image display at the maximum resolution. FIG. 25 is a timing chart of scanning signals and pixel signals in the example illustrated in FIG. 24.

In the example illustrated in FIG. 24, the display unit 20 has two source lines SGL for a single pixel column. In the display period Pd, when the scanning signals ..., Vscan(n), Vscan(n+2), ... are selected, the sub pixel signals VpiR1, VpixG1, and VpiXB1 are supplied to the respective sub pixels Rpix, Gpix, and Bpix in this order. When the scanning signals ..., Vscan(n+1), Vscan(n+3), ... are selected, the sub pixel signals VpiR2, VpixG2, and VpixB2 are supplied to the respective sub pixels Rpix, Gpix, and Bpix in this order (see FIG. 25).

Also in the first modification of the first embodiment, in performing the image display at the maximum resolution, the scanning signals Vscan are sequentially supplied to the eighty eight gate lines GCL and the gate lines GCL are sequentially scanned to perform the display operation with the video signals Vdisp for one frame period in each of the display periods Pd from the period T1 to the period T22 illustrated in FIG. 14.

Figure 26:
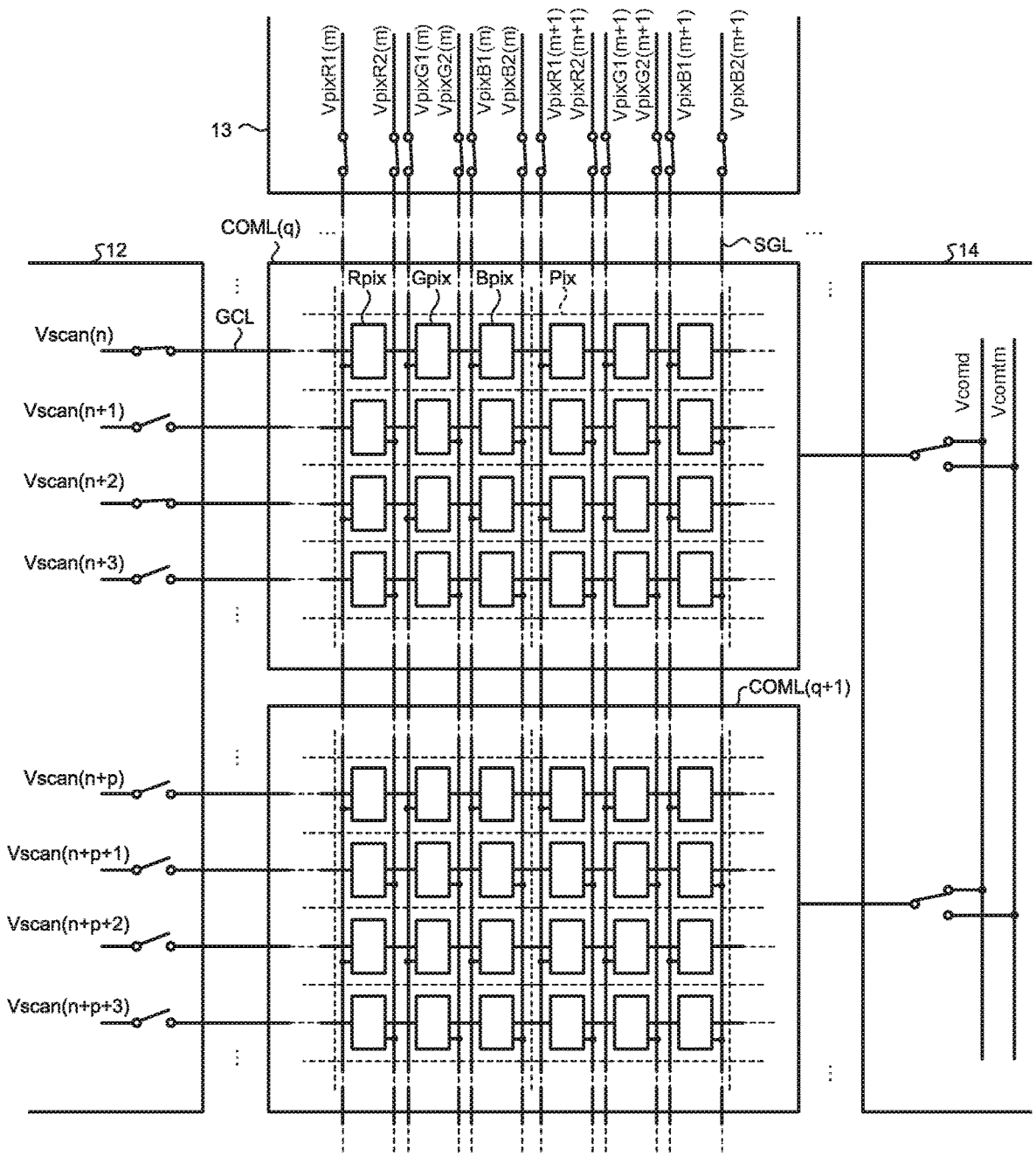
FIG. 26 is a diagram illustrating an operation example in a display period when the display device according to the first modification of the first embodiment performs image display at a low resolution.
Figure 27:
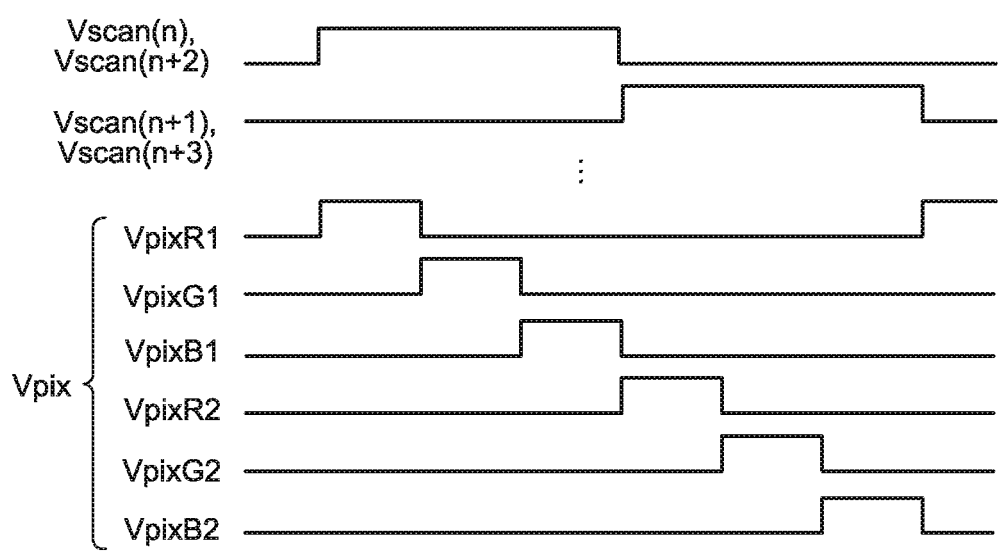
FIG. 27 is a timing chart of the scanning signals and the pixel signals in the example illustrated in FIG. 26.

FIG. 26 is a diagram illustrating an operation example in the display period when the display device according to the first modification of the first embodiment performs the image display at a low resolution. FIG. 27 is a timing chart of scanning signals and pixel signals in the example illustrated in FIG. 26.

In performing the image display at a low resolution, the gate driver 12 is controlled so as to simultaneously supply the scanning signals Vscan to two adjacent gate lines GCL corresponding to odd-numbered rows in the display period Pd. Similarly, the control is performed so as to simultaneously supply the scanning signals Vscan to two adjacent gate lines GCL corresponding to even-numbered rows. More specifically, after the scanning signals Vscan(n) and Vscan(n+2) are supplied, the scanning signals Vscan(n+1) and Vscan(n+3) are supplied (see FIG. 27).

When the scanning signals Vscan(n) and Vscan(n+2) are selected, identical pixel signals Vpix are supplied to two adjacent pixel columns. Specifically, the sub pixel signals VpixR1($m$) and VpixR1($m$+1) are identical signals. The sub pixel signals VpixG1($m$) and VpixG1($m$+1) are identical signals. The sub pixel signals VpixB1($m$) and VpixB1($m$+1) are identical signals. The sub pixel signals VpixR2($m$) and VpixR2($m$+1) are identical signals. The sub pixel signals VpixG2($m$) and VpixG2($m$+1) are identical signals. The sub pixel signals VpixB2($m$) and VpixB2($m$+1) are identical signals. That is, the identical pixel signals Vpix (the sub pixel signals VpixR1, VpixG1, VpixB1 or the sub pixel signals VpixR2, VpixG2, VpixB2) are simultaneously supplied to four pixels Pix that belong to two adjacent pixel rows corresponding to odd-numbered or even-numbered rows to which the scanning signals Vscan are simultaneously supplied by the gate driver 12 and that belong to two pixel-columns to which the identical pixel signals Vpix are supplied by the source driver 13. In other words, the scanning signals Vscan are simultaneously supplied to the adjacent scanning lines corresponding to odd-numbered rows. The scanning signals Vscan are simultaneously supplied to the adjacent scanning lines corresponding to even-numbered rows. With respect to the signal lines coupled to the sub pixels SPix of the same color, the identical pixel signals Vpix are simultaneously supplied to the two adjacent signal lines.

That is, when the display device according to the first modification of the first embodiment performs the image display at a low resolution, the scanning signals Vscan are simultaneously supplied to two adjacent gate lines GCL corresponding to odd-numbered rows or two adjacent gate lines GCL corresponding to even-numbered rows out of the eighty eight gate lines GCL in each of the display periods Pd from the period T1 to the period T22 illustrated in FIG. 14. In this manner, the display operation with the video signals Vdisp in one frame period is performed when the image display is performed at a low resolution.

Figure 28:
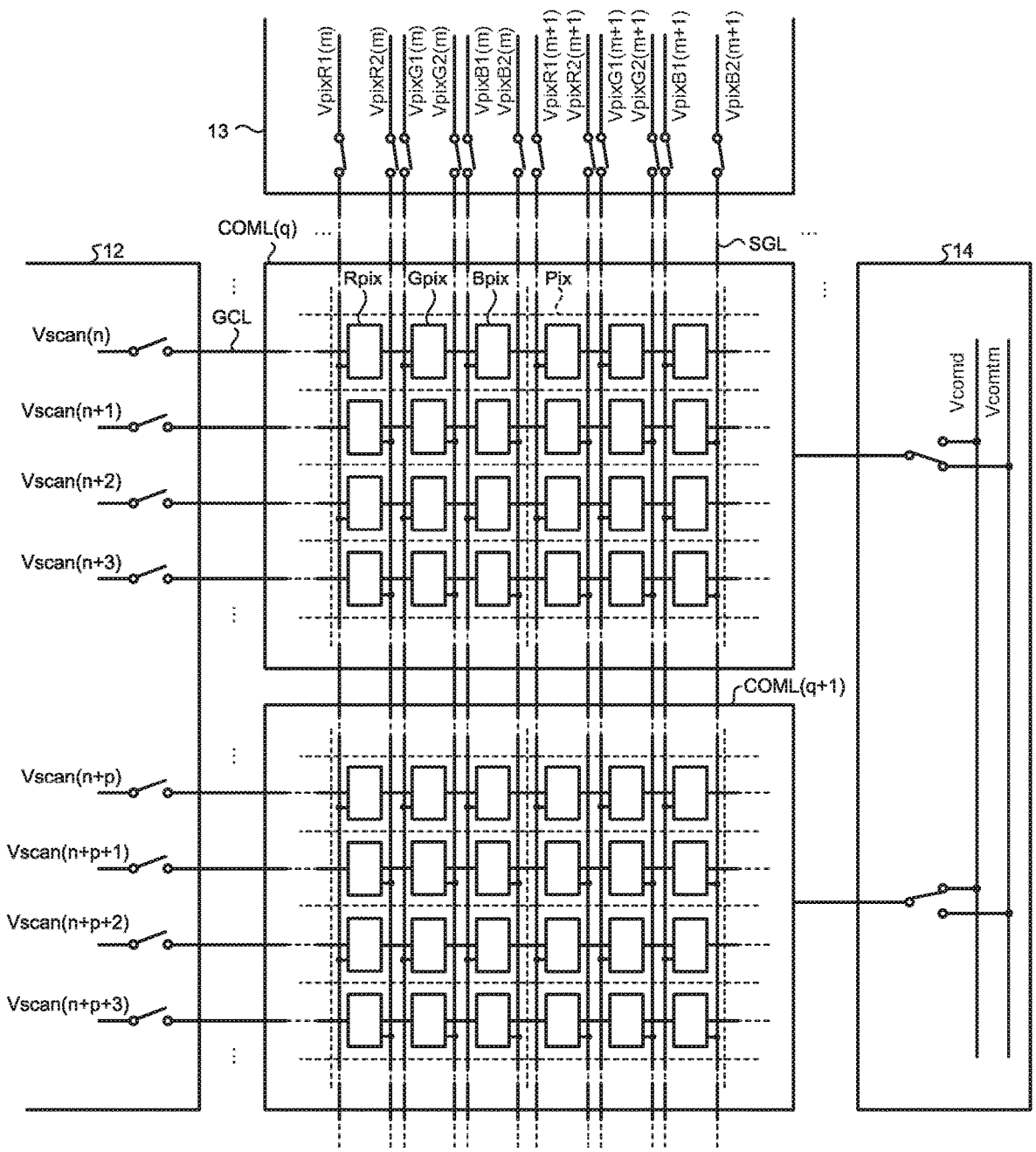
FIG. 28 is a diagram illustrating an operation example in a touch period of the display device according to the first modification of the first embodiment.
Figure 29:
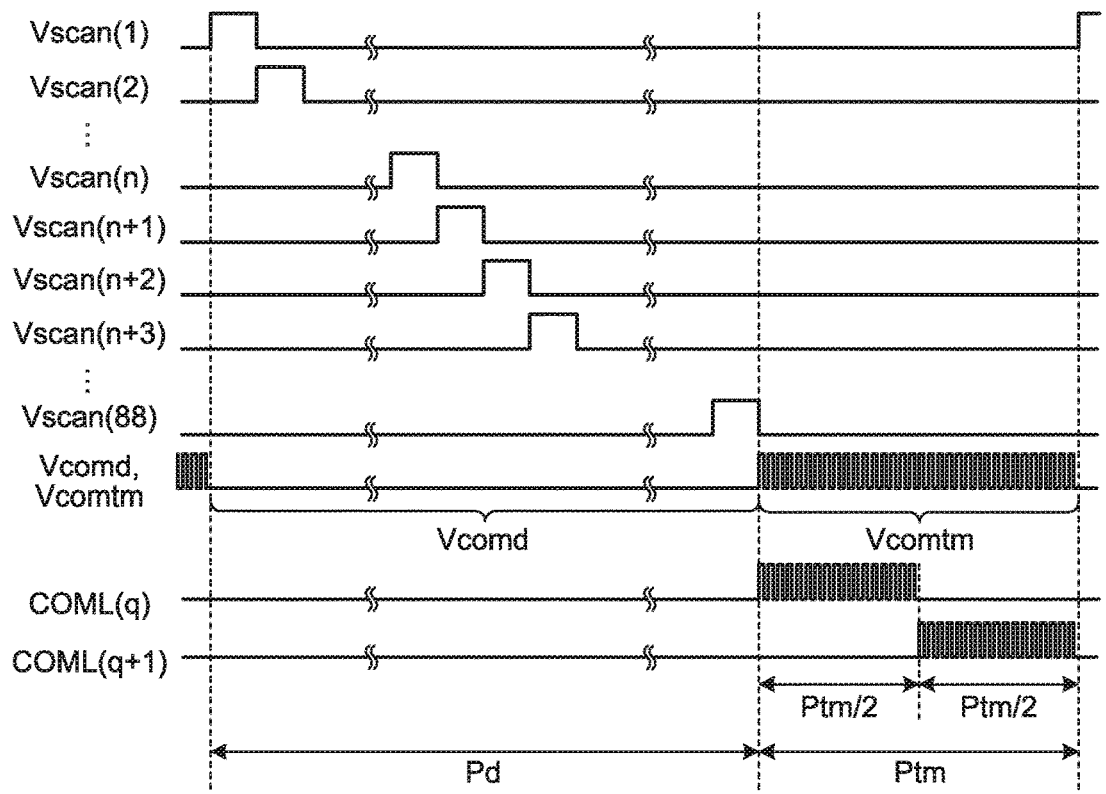
FIG. 29 is an example of a timing chart when the display device according to the first modification of the first embodiment performs image display at the maximum resolution.
Figure 30:
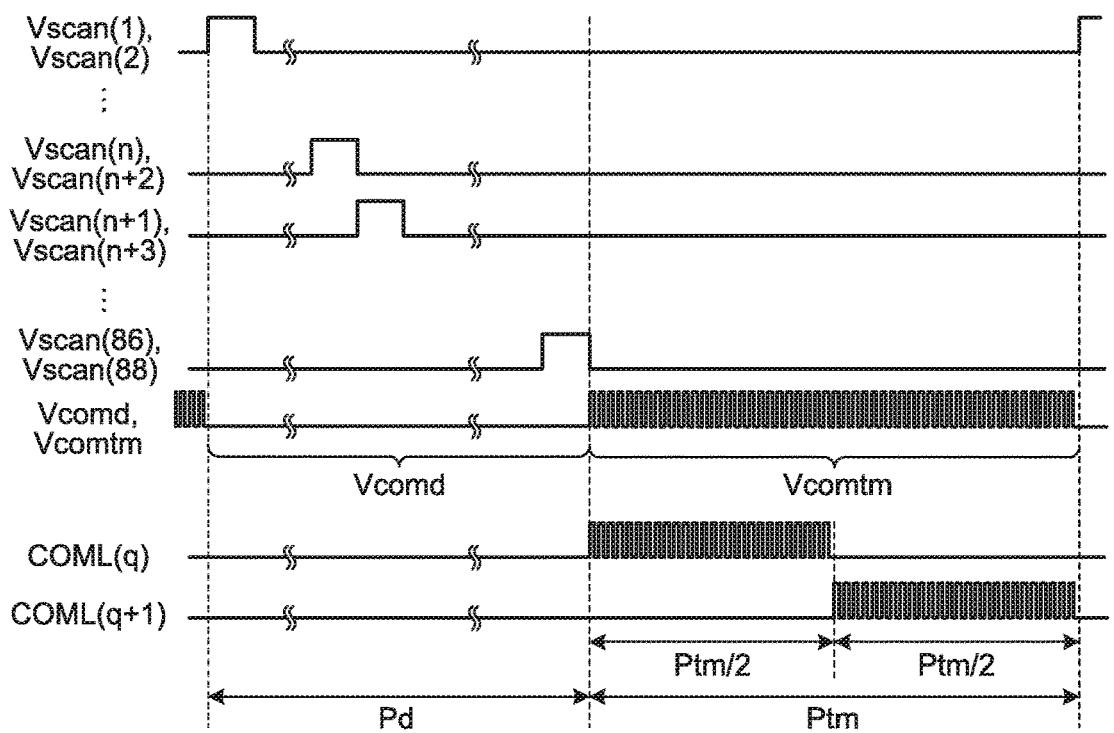
FIG. 30 is an example of a timing chart when the display device according to the first modification of the first embodiment performs image display at a low resolution.

FIG. 28 is a diagram illustrating an operation example in the touch period of the display device according to the first modification of the first embodiment. FIG. 29 is an example of a timing chart when the display device according to the first modification of the first embodiment performs the image display at the maximum resolution. FIG. 30 is an example of a timing chart when the display device according to the first modification of the first embodiment performs the image display at a low resolution.

The examples illustrated in FIGS. 29 and 30 indicate the scanning signals Vscan(1), Vscan(2), . . . , Vscan(88) output to the respective eighty eight gate lines GCL, the display drive voltage Vcomd applied to the drive electrodes COML, and the touch drive signal Vcomtm, in each of the periods from the period T4 to the period T20 illustrated in FIG. 14. Also in the examples illustrated in FIGS. 29 and 30, the display drive voltage Vcomd and the touch drive signal Vcomtm are indicated on a single time axis for a simple explanation.

As illustrated in FIG. 30, in performing the image display at a low resolution, the scanning signals Vscan are simultaneously supplied to two adjacent gate lines GCL corresponding to odd-numbered rows or two adjacent gate lines GCL corresponding to even-numbered rows out of the eighty eight gate lines GCL in the display periods Pd. More specifically, in the example illustrated in FIG. 30, the scanning signals Vscan(n) and Vscan(n+2) are supplied, and the scanning signals Vscan(n+1) and Vscan(n+3) are subsequently supplied.

That is, in performing the image display at a low resolution (FIG. 30), the scanning signals Vscan are simultaneously supplied to two adjacent gate lines GCL corresponding to odd-numbered rows or two adjacent gate lines GCL corresponding to even-numbered rows out of the eighty eight gate lines GCL in the display periods Pd. This can shorten the display period Pd (in the example illustrated in FIG. 30, reduced to half) than that when image display is performed at the maximum resolution illustrated in FIG. 29.

As a result, in performing the image display at a low resolution (FIG. 30), the mutual-capacitance touch period Ptm provided in the blanking period in the display operation can be made longer than that when the image display is performed at the maximum resolution (FIG. 29). This configuration can increase the number of pulses of the touch drive signal Vcomtm supplied to each of the drive electrodes COML (the respective drive electrodes . . . , COML(q), COML(q+1), . . . illustrated in FIGS. 24, 26, and 28), in other words, increase the number of times of touch detection performed for each drive electrode COML, thereby improving tolerance to noise and accuracy of touch detection.

The present embodiment may employ a configuration in which the scanning signals Vscan are simultaneously supplied to three or more adjacent gate lines GCL corresponding to odd-numbered rows or three or more adjacent gate lines GCL corresponding to even-numbered rows, in performing the image display at a low resolution.

The following describes a control switching operation for changing an image resolution and a ratio between the display period Pd and the touch period Ptm in one frame period, according to the first embodiment and the first modification thereof.

Figure 31:
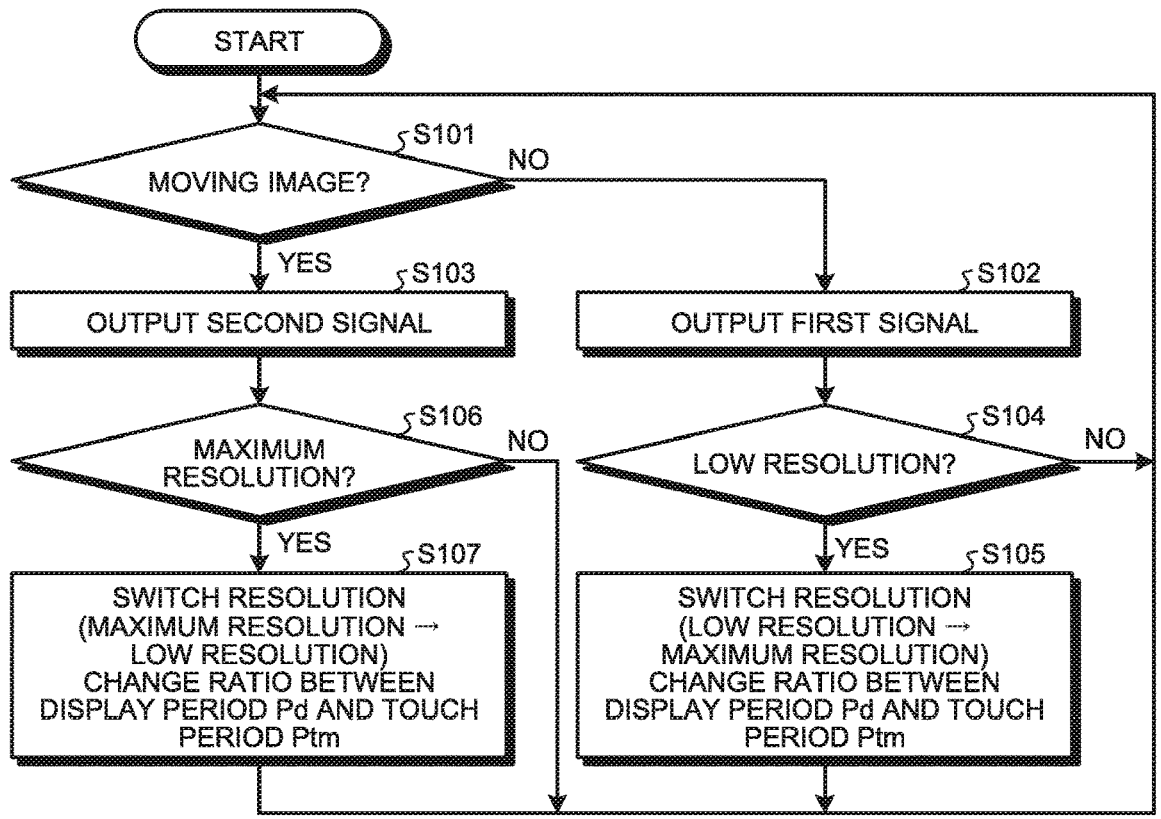
FIG. 31 is a flowchart illustrating an example of control switching operation in the display device according to the first embodiment and the first modification thereof.

FIG. 31 is a flowchart illustrating an example of control switching operation in the display device according to the first embodiment and the first modification thereof.

First, the image determination unit 1121 included in the control switching unit 112 of the display controller 11 determines whether an image to be displayed on the display unit 20 is a still image or a moving image, in accordance with the video signals Vdisp (Step S101). At this time, the image determination unit 1121 may be configured to determine whether the image is a moving image depending on whether there is any changed region, by checking the video signals Vdisp input to the display controller 11 for each frame and comparing the input video signals Vdisp with the video signals Vdisp of one previous frame period, for example, as described above. Alternatively, the image determination unit 1121 may be configured to determine whether the image is a moving image depending on whether a ratio of the changed region to the entire region exceeds a predetermined ratio.

When the image determination unit 1121 determines that the video signals Vdisp do not correspond to a moving image, that is, when it determines that the video signals Vdisp correspond to a still image (No at Step S101), the control switching unit 112 outputs the first signal to the drive controller 111 (Step S102).

When the image determination unit 1121 determines that the video signals Vdisp correspond to a moving image (Yes at Step S101), the control switching unit 112 outputs the second signal to the drive controller 111 (Step S103).

When receiving the first signal, the drive controller 111 determines whether the resolution of the currently displayed image is a lower resolution (e.g., full HD resolution) than the resolution (e.g., 4K2K resolution) of the video signals Vdisp (Step S104).

When the resolution of the currently displayed image is not a low resolution, that is, the resolution is the maximum resolution coinciding with the resolution of the video signals Vdisp (No at Step S104), the drive controller 111 maintains the current control state. The processing then returns to Step S101.

When the resolution of the currently displayed image is a low resolution (Yes at Step S104), the drive controller 111 switches the resolution of the image from a low resolution to the maximum resolution, and changes a ratio between the display period Pd and the touch period Ptm in one frame period so as to lengthen the display period Pd and shorten the touch period Ptm (Step S105). Accordingly, the drive controller 111 controls the gate driver 12, the source driver 13, and the drive electrode driver 14 so as to perform the image display at the maximum resolution, and controls the touch detection controller 40 so as to appropriately perform the touch detection operation in the touch period Ptm. The processing then returns to Step S101.

Meanwhile, when receiving the second signal, the drive controller 111 determines whether the resolution of the currently displayed image is the maximum resolution (Step S106).

When the resolution of the currently displayed image is not the maximum resolution, that is, the resolution is a low resolution (No at Step S106), the drive controller 111 maintains the current control state. The processing then returns to Step S101.

When the resolution of the currently displayed image is the maximum resolution (Yes at Step S106), the drive controller 111 switches the resolution of the image from the maximum resolution to a low resolution, and changes a ratio between the display period Pd and the touch period Ptm in one frame period so as to shorten the display period Pd and lengthen the touch period Ptm (Step S107). Accordingly, the drive controller 111 controls the gate driver 12, the source driver 13, and the drive electrode driver 14 so as to perform the image display at a low resolution, and controls the touch detection controller 40 so as to appropriately perform the touch detection operation in the touch period Ptm. The processing then returns to Step S101.

When the video signals Vdisp correspond to a moving image, executing the above-described processing illustrated in FIG. 31 allows the image display at a low resolution by down-converting the video signals Vdisp. This can shorten the display period Pd occupying one frame period, and relatively lengthen the blanking period for the display operation in one frame period. As a result, the touch period Ptm provided in the blanking period can be made longer than that when the image display is performed at the maximum resolution.

Second Modification

Figure 32:
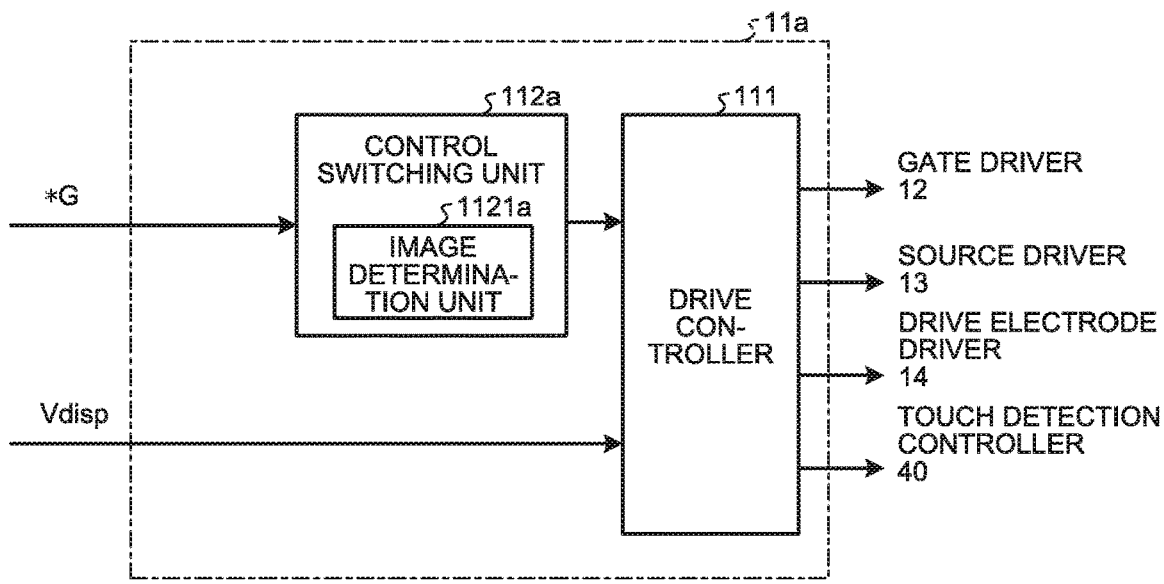
FIG. 32 is a diagram illustrating a configuration example of a display controller of a display device according to a second modification of the first embodiment.

FIG. 32 is a diagram illustrating a configuration example of a display controller of a display device according to a second modification of the first embodiment. As illustrated in FIG. 32, a display controller 11a in the second modification of the first embodiment includes the drive controller 111 and a control switching unit 112a. In the second modification of the first embodiment, a game command signal *G indicating that the video signal Vdisp corresponds to a game image is input to the control switching unit 112a of the display controller 11a from the host HST such as an external processor, in place of the video signal Vdisp.

In the second modification of the first embodiment, the control switching unit 112a further includes an image determination unit 1121a.

When the game command signal *G is not input to the control switching unit 112a from the host HST such as an external processor, the image determination unit 1121a interprets the video signals Vdisp as a still image (or an image that contains little movement like a still image). Meanwhile, when the game command signal *G is input to the control switching unit 112a from the host HST such as an external processor, the image determination unit 1121a interprets the video signals Vdisp as a moving image.

Based on the determination result made by the image determination unit 1121a, the control switching unit 112a switches the control state of the drive controller 111. More specifically, when the image determination unit 1121a interprets the video signals Vdisp as a still image, the control switching unit 112a outputs the first signal to the drive controller 111. When the image determination unit 1121a interprets the video signals Vdisp as a moving image, the control switching unit 112a outputs the second signal to the drive controller 111.

The following describes the control switching operation, according to the second modification of the first embodiment, for changing a resolution of the image and a ratio between the display period Pd and the touch period Ptm in one frame period in accordance with the video signals Vdisp.

Figure 33:
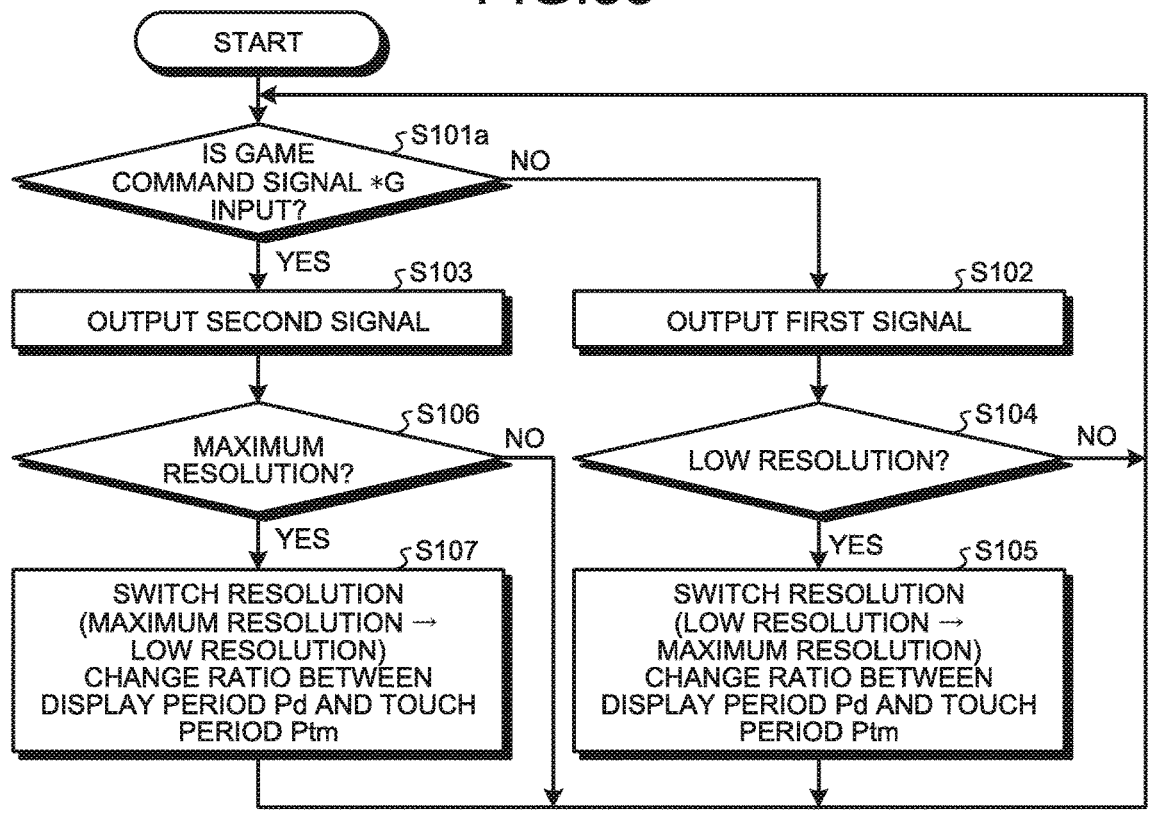
FIG. 33 is a flowchart illustrating an example of control switching operation in the display device according to the second modification of the first embodiment.

FIG. 33 is a flowchart illustrating an example of the control switching operation in the display device according to the second modification of the first embodiment.

The image determination unit 1121a included in the control switching unit 112a of the display controller 11a determines whether the game command signal *G is input to the control switching unit 112a from the host HST such as an external processor (Step S101a).

When the image determination unit 1121a determines that the game command signal *G is not input to the control switching unit 112a from the host HST such as an external processor (No at Step S101a), the control switching unit 112a interprets the video signals Vdisp as a still image, and then outputs the first signal to the drive controller 111 (Step S102).

When the image determination unit 1121a determines that the game command signal *G is input to the control switching unit 112a from the host HST such as an external processor (Yes at Step S101a), the control switching unit 112a interprets the video signals Vdisp as a moving image, and then outputs the second signal to the drive controller 111 (Step S103).

The subsequent processing is the same as that in FIG. 31, and thus the description thereof will be omitted.

Executing the processing illustrated in FIG. 33 allows the control switching unit 112a to interpret the video signals Vdisp as a moving image when the game command signal *G is input to the control switching unit 112a from the host HST such as an external processor, thereby allowing the image display at a low resolution by down-converting the video signals Vdisp. This can shorten the display period Pd in one frame period, and relatively lengthen the blanking period for the display operation in one frame period. As a result, the touch period Ptm provided in the blanking period can be made longer than that when the image display is performed at the maximum resolution.

As described above, the display device 1 according to the first embodiment includes the display unit 20, the touch detection electrodes TDL, and the controller CTRL. The display unit 20 includes the pixel electrodes 22 and the drive electrodes COML (counter electrodes) facing the pixel electrodes 22, and displays an image at the resolution in accordance with the number of the pixel electrodes 22. The touch detection electrodes TDL overlap the drive electrodes COML (counter electrodes). The controller CTRL alternately executes, in one frame period, a display operation in the display period by driving the pixel electrodes 22 and the touch detection electrodes TDL (counter electrodes), and a touch detection operation in the touch period by driving one or both of the drive electrodes COML (counter electrodes) and the touch detection electrodes TDL. The controller CTRL includes the control switching unit 112 that changes a ratio between the display period and the touch period in one frame period in accordance with the resolution of the image to be displayed in the one frame period.

In the above-described configuration, the controller CTRL performs display control at the resolution of the image to be displayed on the display unit 20 determined by the control switching unit 112, and changes the ratio between the display period Pd and the touch period Ptm in one frame period. More specifically, when the video signals Vdisp correspond to a still image, the image is displayed at the maximum resolution (e.g., 4K2K resolution) of the display unit 20 that coincides with the resolution of the video signals Vdisp. When the video signals Vdisp correspond to a moving image, the image is displayed at a lower resolution (e.g., full HD resolution) than the maximum resolution of the display unit 20 by lowering the resolution of the image by down-converting the video signals Vdisp. Accordingly, when the video signals Vdisp correspond to a moving image, the display period Pd in one frame period can be shortened. This can make the touch period Ptm longer than that when performing the display at the maximum resolution of the display unit 20, and increase the ratio of the touch period Ptm to one frame period. As a result, the configuration can achieve a high-definition display quality in performing the image display of a still image at the maximum resolution, and optimize a display quality and touch detection accuracy in performing the image display of a moving image at a low resolution.

The first embodiment can provide the display device 1 capable of optimizing display and accuracy of a touch detection as the situation demands.

Second Embodiment

Figure 34:
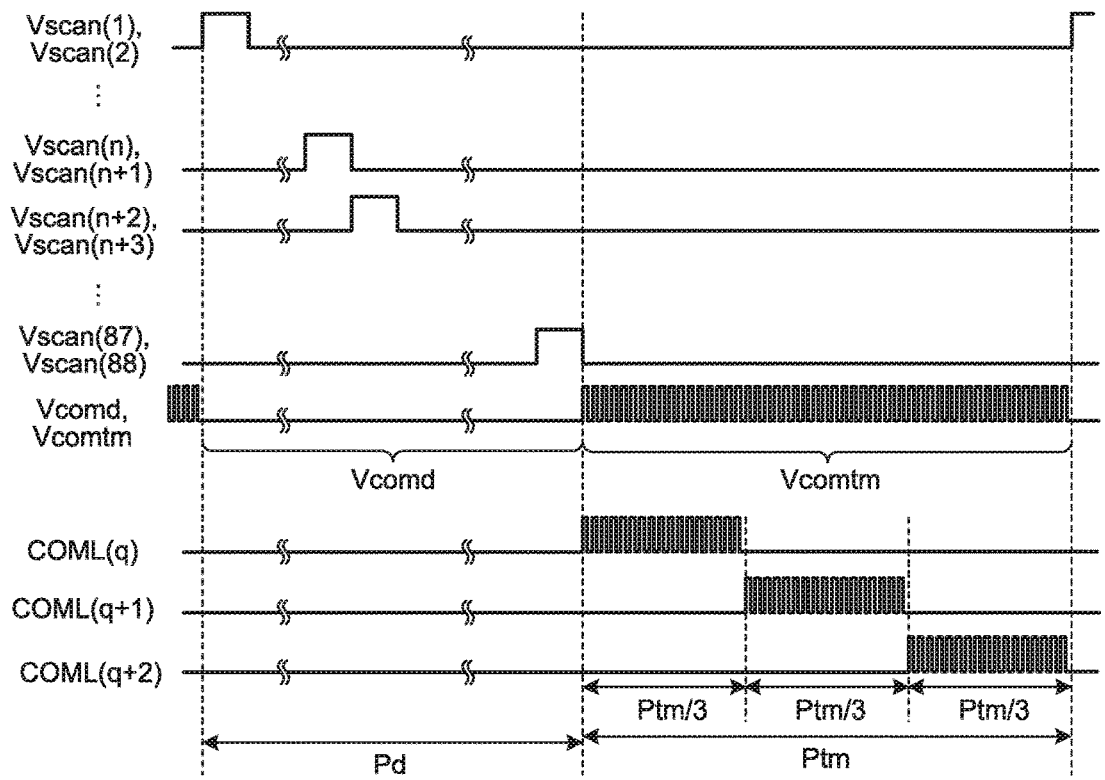
FIG. 34 is a diagram illustrating an example of a timing chart when a display device according to a second embodiment performs image display at a low resolution.

FIG. 34 is a diagram illustrating an example of a timing chart when a display device according to a second embodiment performs the image display at a low resolution. The second embodiment is the same as the first embodiment in the configuration of the display device 1, the operation example in the display period during the image display at the maximum resolution, the operation example in the display period during the image display at a low resolution, the operation example in the touch period, the timing chart when the image display is performed at the maximum resolution, and others, and thus the redundant description is omitted.

The example illustrated in FIG. 34 indicates the scanning signals Vscan(1), Vscan(2), . . . , Vscan(88) output to the respective eighty eight gate lines GCL, the display drive voltage Vcomd applied to the drive electrodes COML, and the touch drive signal Vcomtm. In the example illustrated in FIG. 34, the display drive voltage Vcomd and the touch drive signal Vcomtm are indicated on a single time axis for a simple explanation.

As illustrated in FIG. 34, the second embodiment assumes the touch detection frame rate to be three times the frame rate of the video signals Vdisp (i.e., when the frame rate of the video signals Vdisp is 60 Hz, the touch detection frame rate is 180 Hz), for example. Thus, in performing the image display at a low resolution, the touch drive signal Vcomtm is supplied three times to each of the drive electrodes . . . , COML(q), COML(q+1), COML(q+2), . . . , in one frame period of the video signals Vdisp.

That is, in performing the image display at a low resolution, the touch drive signal Vcomtm is supplied to the drive electrode COML(q) in the first one-third period (Ptm/3) of the mutual-capacitance touch period Ptm. Then, the touch drive signal Vcomtm is supplied to the drive electrode COML(q+1) in the one-third period (Ptm/3) in the middle of the mutual-capacitance touch period Ptm. Finally, the touch drive signal Vcomtm is supplied to the drive electrode COML(q+2) in the last one-third period (Ptm/3) of the mutual-capacitance touch period Ptm.

In this manner, in the second embodiment, when performing the image display at a low resolution, the frame rate for a touch detection is made higher than that when performing the image display at the maximum resolution. This can accelerate response speed in a touch detection operation when the image display is performed at a low resolution.

The touch-detection frame rate when the image display is performed at a low resolution is not limited thereto, and the touch-detection frame rate may be equal to or greater than four times the frame rate of the video signals Vdisp, for example.

As described above, when performing the image display at a low resolution, the display device 1 according to the second embodiment makes the touch-detection frame rate higher than that when performing the image display at the maximum resolution. This can accelerate response speed in a touch detection operation when the image display is performed at a low resolution.

The second embodiment can provide the display device 1 capable of optimizing display and accuracy of a touch detection as the situation demands.

Third Embodiment

Figure 35:
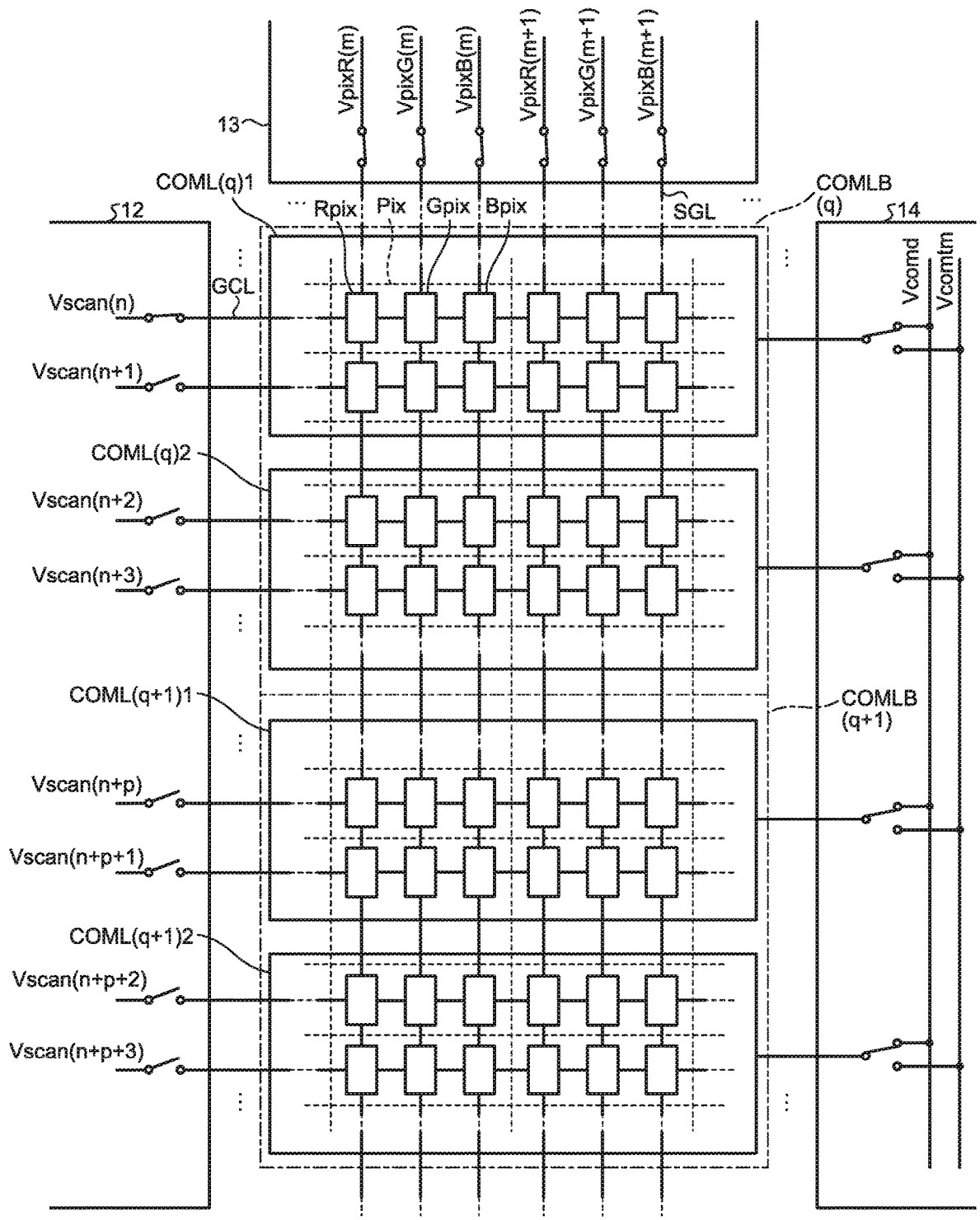
FIG. 35 is a diagram illustrating an operation example in a display period when a display device according to a third embodiment performs image display at the maximum resolution.
Figure 36:
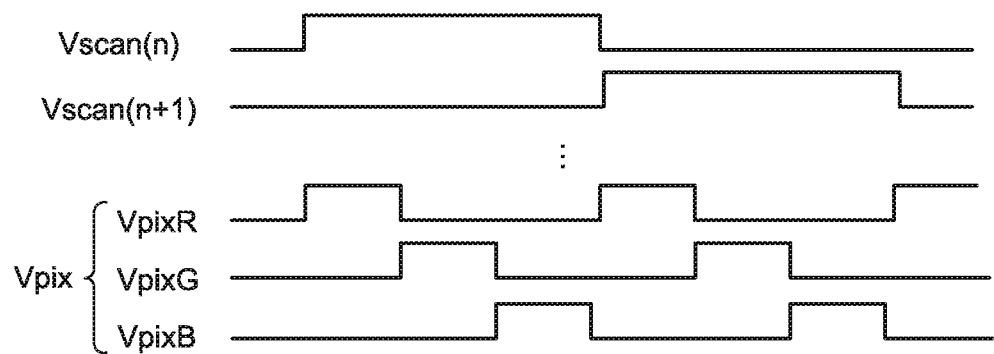
FIG. 36 is a timing chart of the scanning signals and the pixel signals in the example illustrated in FIG. 35.
Figure 37:
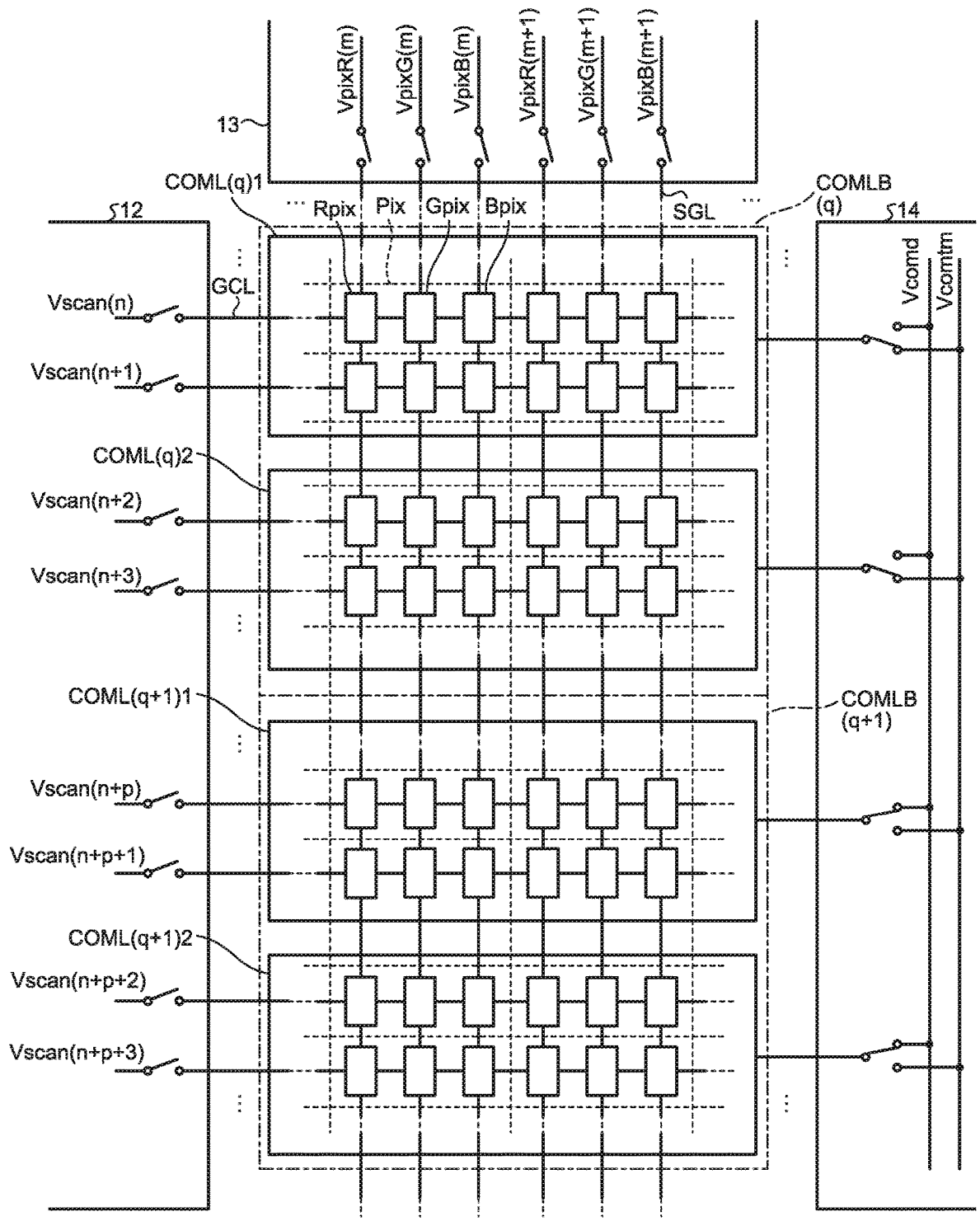
FIG. 37 is a diagram illustrating an operation example in a touch period when the display device according to the third embodiment performs image display at the maximum resolution.
Figure 38:
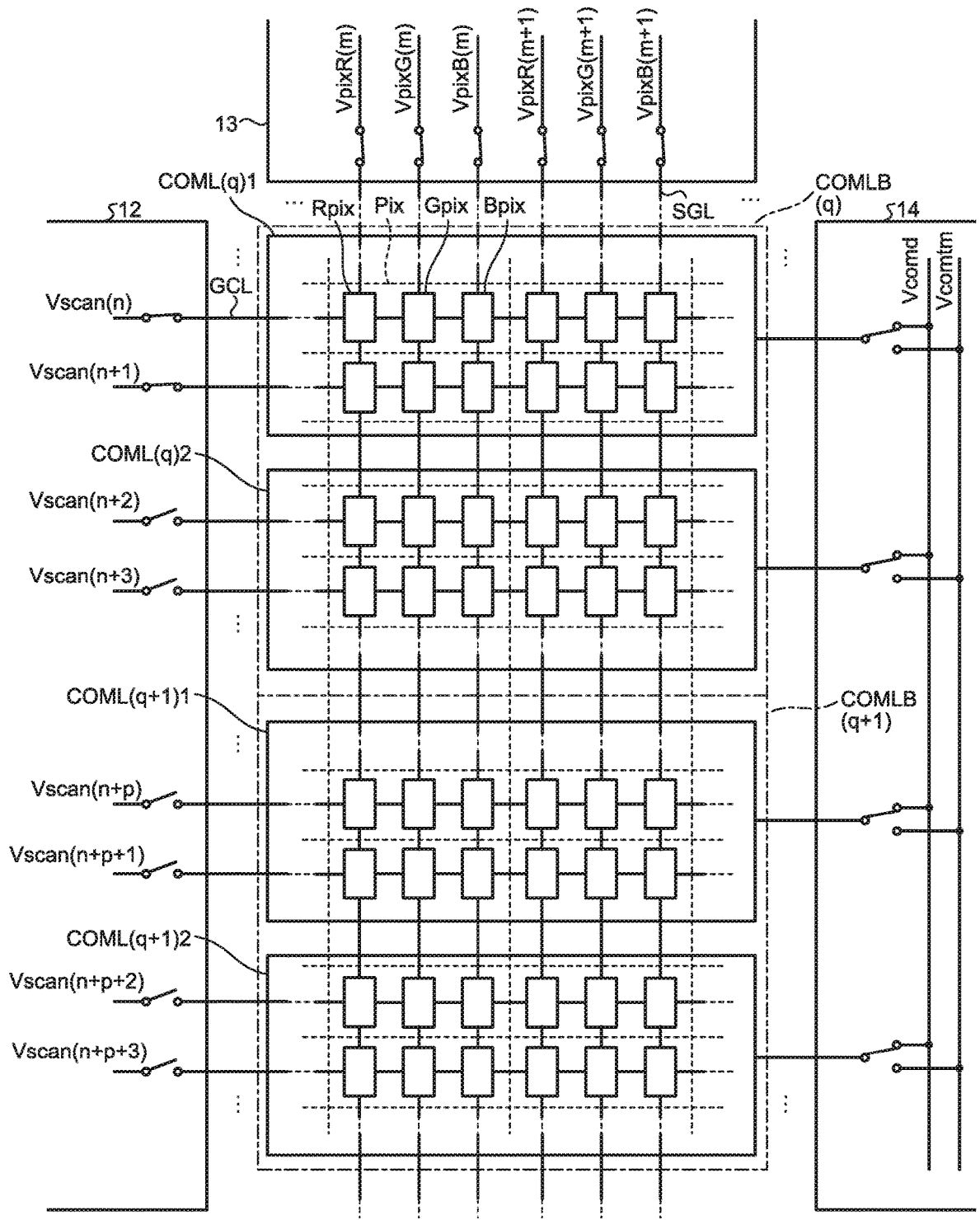
FIG. 38 is a diagram illustrating an operation example in a display period when the display device according to the third embodiment performs image display at a low resolution.
Figure 39:
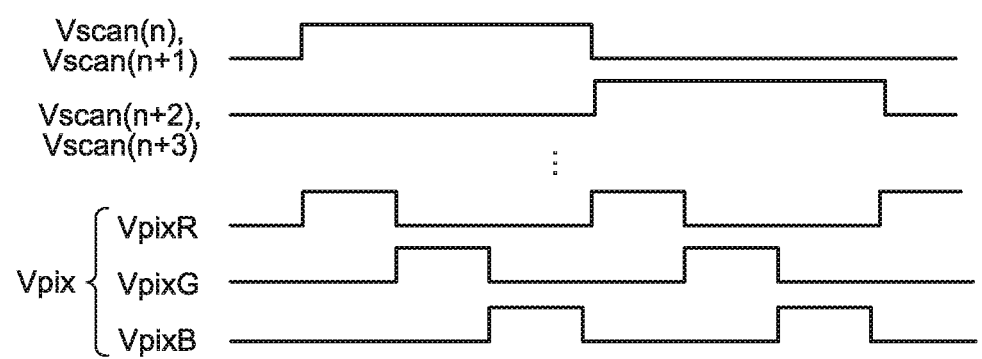
FIG. 39 is a timing chart of the scanning signals and the pixel signals in the example illustrated in FIG. 38.
Figure 40:
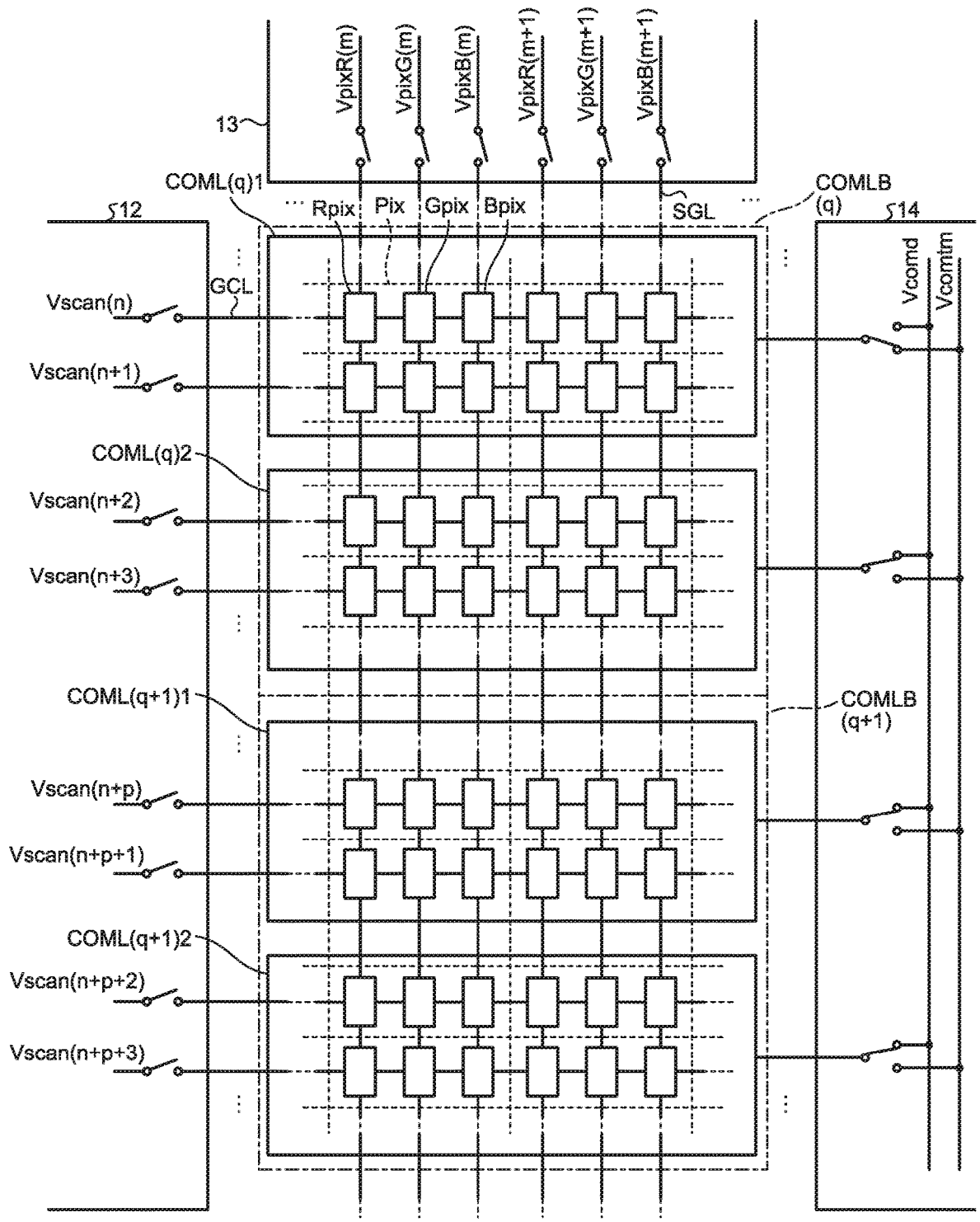
FIG. 40 is a diagram illustrating an operation example in a touch period when the display device according to the third embodiment performs image display at a low resolution.

FIG. 35 is a diagram illustrating an operation example in the display period when a display device according to a third embodiment performs the image display at the maximum resolution. FIG. 36 is a timing chart of scanning signals and pixel signals in the example illustrated in FIG. 35. FIG. 37 is a diagram illustrating an operation example in the touch period when the display device according to the third embodiment performs the image display at the maximum resolution. FIG. 38 is a diagram illustrating an operation example in the display period when the display device according to the third embodiment performs the image display at a low resolution. FIG. 39 is a timing chart of scanning signals and pixel signals in the example illustrated in FIG. 38. FIG. 40 is a diagram illustrating an operation example in the touch period when the display device according to the third embodiment performs the image display at a low resolution. The configuration of the display device 1 according to the third embodiment is the same as that of the first embodiment, the redundant description is omitted.

In the third embodiment, the number of divisions of the drive electrodes COML is further increased from the numbers in the first and second embodiments. In performing the image display at the maximum resolution, the touch drive signal Vcomtm is supplied to each drive electrode block COMLB in sequence in the touch period Ptm by assuming a plurality of adjacent drive electrodes COML to be one drive electrode block COMLB. Furthermore, in performing the image display at a low resolution, the touch drive signal Vcomtm is supplied to each drive electrode COML in sequence in the touch period Ptm. More specifically, as illustrated in FIGS. 35 to 40, the drive electrode COML(q) described in the first and the second embodiments is divided into a drive electrode COML(q)1 and a drive electrode COML(q)2, and the drive electrode COML(q+1) described in the first and the second embodiments is divided into a drive electrode COML(q+1)1 and a drive electrode COML(q+1)2, for example. That is, in the example illustrated in FIGS. 35 to 40, the number of the drive electrodes COML is twice the number in the first and the second embodiments, and the drive electrode COML(q)1 and the drive electrode COML(q)2 are assumed to be a single drive electrode block COMLB(q) and the drive electrode COML(q+1)1 and the drive electrode COML(q+1)2 are assumed to be a single drive electrode block COMLB(q+1).

In performing the image display at the maximum resolution, the drive electrode driver 14 is controlled so as to output the display drive voltage Vcomd in the display period Pd, and apply the display drive voltage Vcomd to the drive electrodes COML (in the example illustrated in FIG. 35, . . . , COML(q)1, COML(q)2, COML(q+1)1, COML(q+1)2, . . . ) (see FIG. 35).

The gate driver 12 is controlled so as to sequentially supply the scanning signal Vscan to each one horizontal line. More specifically, the scanning signals Vscan are selected in the order of Vscan(n), Vscan(n+1), . . . , and the sub pixel signals VpixR, VpixG, and VpixB are supplied to the respective sub pixels Rpix, Gpix, and Bpix in this order (see FIG. 36).

In performing the image display at the maximum resolution, the drive electrode driver 14 is controlled so as to sequentially supply the touch drive signal Vcomtm to each drive electrode block COMLB, that is, each of the adjacent drive electrodes COML, in the touch period Ptm. More specifically, the drive electrode blocks are selected in the order of . . . , COMLB(q), COMLB(q+1), . . . , and the touch drive signals Vcomtm are sequentially supplied to the drive electrode blocks . . . , COMLB(q), COMLB(q+1), . . . (see FIG. 37).

In the third embodiment, the touch drive signal Vcomtm is supplied twice to each of the drive electrode blocks . . . , COMLB(q), COMLB(q+1), . . . , in one frame period of the video signals Vdisp.

Meanwhile, in performing the image display at a low resolution, the drive electrode driver 14 is controlled so as to output the display drive voltage Vcomd in the display period Pd, and apply the display drive voltage Vcomd to each drive electrode COML (in the example illustrated in FIG. 38, . . . , COML(q)1, COML(q)2, COML(q+1)1, COML(q+1)2, . . . ) (see FIG. 38).

The gate driver 12 is controlled so as to simultaneously supply the scanning signals Vscan to two adjacent gate lines GCL. More specifically, in the example illustrated in FIG. 38, the scanning signals Vscan(n) and Vscan(n+1) are supplied, and the scanning signals Vscan(n+2) and Vscan(n+3) are subsequently supplied (see FIG. 39).

When the scanning signals Vscan(n) and Vscan(n+1) are selected, identical pixel signals Vpix are supplied to two adjacent pixel columns. Specifically, the sub pixel signals VpixR(m) and VpixR(m+1) are identical signals, the sub pixel signals VpixG(m) and VpixG(m+1) are identical signals, and the sub pixel signals VpixB(m) and VpixB(m+1) are identical signals. That is, the identical pixel signals Vpix (sub pixel signals VpixR, VpixG, VpixB) are simultaneously supplied to four pixels Pix that belong to two adjacent pixel rows to which the scanning signals Vscan are simultaneously supplied by the gate driver 12 and that belong to two pixel-columns to which the identical pixel signals Vpix are supplied by the source driver 13. In other words, the scanning signals Vscan are simultaneously supplied to the two adjacent scanning lines. With respect to the signal lines coupled to the sub pixels SPix of the same color, the identical pixel signals Vpix are simultaneously supplied to the two adjacent signal lines.

Furthermore, in performing the image display at a low resolution, the drive electrode driver 14 is controlled so as to sequentially supply the touch drive signal Vcomtm to each drive electrode COML in the touch period Ptm. More specifically, in the example illustrated in FIG. 40, the drive electrodes are selected in the order of . . . , COML(q)1, COML(q)2, COML(q+1)1, COML(q+1)2, . . . , and the touch drive signals Vcomtm are sequentially supplied to the drive electrodes . . . , COML(q)1, COML(q)2, COML(q+1)1, COML(q+1)2, . . . (see FIG. 40).

In the third embodiment, the touch drive signal Vcomtm is supplied twice to each of the drive electrodes . . . , COML(q)1, COML(q)2, COML(q+1)1, COML(q+1), . . . , in one frame period of the video signals Vdisp.

Figure 41:
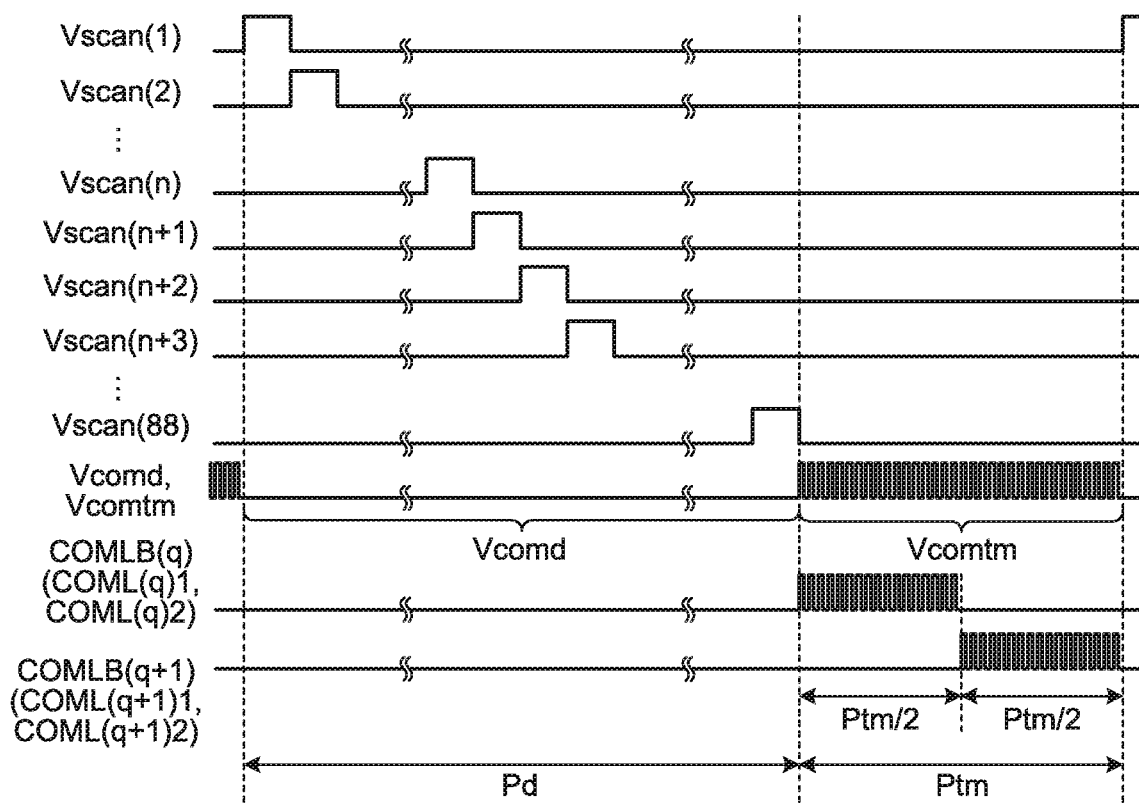
FIG. 41 is a diagram illustrating an example of a timing chart when the display device according to the third embodiment performs image display at the maximum resolution.
Figure 42:
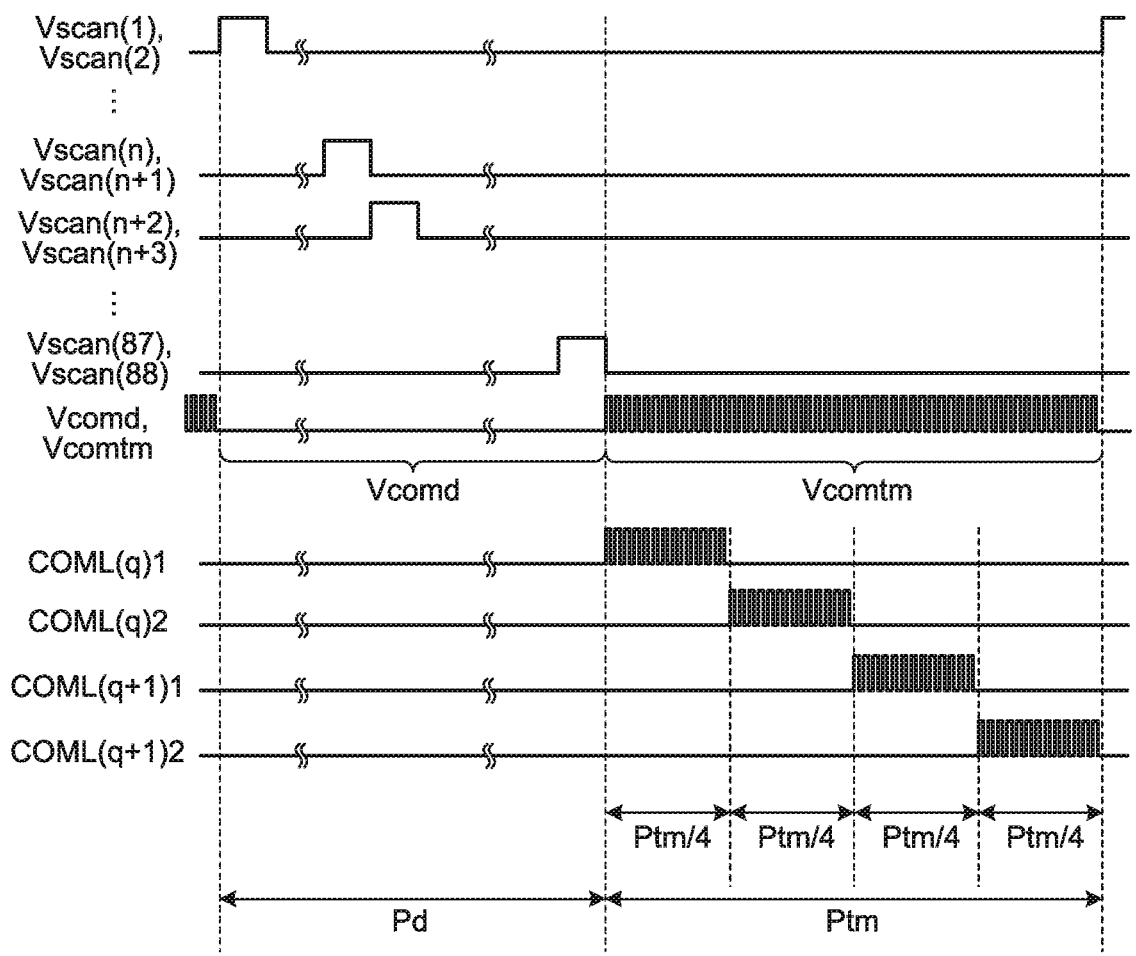
FIG. 42 is a diagram illustrating an example of a timing chart when the display device according to the third embodiment performs image display at a low resolution.

FIG. 41 is a diagram illustrating an example of a timing chart when the display device according to the third embodiment performs the image display at the maximum resolution. FIG. 42 is a diagram illustrating an example of a timing chart when the display device according to the third embodiment performs the image display at a low resolution The examples illustrated in FIGS. 41 and 42 indicate the scanning signals Vscan(1), Vscan(2), . . . , and Vscan(88) output to the respective eighty eight gate lines GCL, the display drive voltage Vcomd applied to the drive electrodes COML, and the touch drive signal Vcomtm in each of the periods from the period T4 to the period T20 illustrated in FIG. 14. In the examples illustrated in FIGS. 41 and 42, the display drive voltage Vcomd and the touch drive signal Vcomtm are indicated on a single time axis for a simple explanation. That is, the touch drive signal Vcomtm illustrated in FIGS. 41 and 42 is supplied to any one of the drive electrodes . . . , COML(q)1, COML(q)2, COML(q+1)1, COML(q+1)2, . . . illustrated in FIGS. 35 to 40.

In the third embodiment, in performing the image display at the maximum resolution, the touch drive signal Vcomtm is supplied to any one of the drive electrode blocks . . . , COMLB(q), COMLB(q+1), . . . illustrated in FIGS. 35 to 40, only in a period corresponding to one half of the mutual-capacitance touch period Ptm. In the example illustrated in FIG. 41, the touch drive signal Vcomtm is supplied to the drive electrode block COMLB(q) (i.e., the adjacent drive electrode COML(q)1 and the drive electrode COML(q)2) in the first one-half period of the mutual-capacitance touch period Ptm (Ptm/2), and the touch drive signal Vcomtm is supplied to the drive electrode block COMLB(q+1) (i.e., the adjacent drive electrode COML(q+1)1 and the drive electrode COML(q+1)2) in the latter one-half period of the mutual-capacitive touch period Ptm (Ptm/2).

According to the third embodiment, in performing the image display at a low resolution, the touch drive signal Vcomtm is supplied to any one of the drive electrodes . . . , COML(q)1, COML(q)2, COML(q+1)1, COML(q+1)2, . . . illustrated in FIGS. 35 to 40 only in a period corresponding to one quarter of the mutual-capacitance touch period Ptm. The example illustrated in FIG. 42 indicates: the touch drive signal Vcomtm is supplied to the drive electrode COML(q)1 in the first one-quarter period of the mutual-capacitance touch period Ptm (Ptm/4); the touch drive signal Vcomtm is supplied to the drive electrode COML(q)2 in the second one-quarter period of the mutual-capacitance touch period Ptm (Ptm/4); the touch drive signal Vcomtm is supplied to the drive electrode COML(q+1)1 in the third one-quarter period of the mutual-capacitance touch period Ptm (Ptm/4); and the touch drive signal Vcomtm is supplied to the drive electrode COML(q+1)2 in the fourth one-quarter period of the mutual-capacitance touch period Ptm (Ptm/4).

As illustrated in FIG. 41, in performing the image display at the maximum resolution, the scanning signals Vscan are sequentially supplied to the eighty eight gate lines GCL for each one horizontal line in the display period Pd.

Meanwhile, as illustrated in FIG. 42, in performing the image display at a low resolution, the scanning signals Vscan are simultaneously supplied to two adjacent gate lines GCL out of the eighty eight gate lines GCL in the display periods Pd. More specifically, in the example illustrated in FIG. 42, after the scanning signals Vscan(n) and Vscan(n+1) are supplied, the scanning signals Vscan(n+2) and Vscan(n+3) are supplied.

That is, in performing the image display at a low resolution, as illustrated in FIG. 42, the scanning signals Vscan are simultaneously supplied to the two adjacent gate lines GCL in the display period Pd. This can shorten the display period Pd (in the example illustrated in FIG. 42, reduced to one half) than that when the image display is performed at the maximum resolution (FIG. 41).

As a result, in performing the image display at a low resolution (FIG. 42), the mutual-capacitance touch period Ptm provided in the blanking period for the display operation can be made relatively longer than that when the image display is performed at the maximum resolution (FIG. 41).

As illustrated in FIG. 41, in performing the image display at the maximum resolution, the touch drive signal Vcomtm are supplied to any one of the drive electrode blocks . . . , COMLB(q), COMLB(q+1), . . . illustrated in FIGS. 35 to 40, by assuming the blanking period in the display operation to be the mutual-capacitance touch period Ptm. In the third embodiment, as described above, the touch drive signal Vcomtm is supplied to the drive electrode block COMLB(q) (i.e., the adjacent drive electrode COML(q)1 and the drive electrode COML(q)2) in the first one-half period (Ptm/2) of the mutual-capacitance touch period Ptm. The touch drive signal Vcomtm is supplied to the drive electrode block COMLB(q+1) (i.e., the adjacent drive electrode COML(q+1)1 and the drive electrode COML(q+1)2) in the latter one-half period (Ptm/2) of the mutual-capacitance touch period Ptm.

Meanwhile, as illustrated in FIG. 42, when the display device 1 according to the third embodiment performs the image display at a low resolution, the touch drive signal Vcomtm is supplied to any one of the drive electrodes . . . , COML(q)1, COML(q)2, COML(q+1)1, COML(q+1)2, . . . illustrated in FIGS. 35 to 40, by assuming the blanking period in the display operation to be the mutual-capacitance touch period Ptm. In the third embodiment, as described above, the touch drive signal Vcomtm is supplied to the drive electrode COML(q)1 in the first one-quarter period (Ptm/4) of the mutual-capacitance touch period Ptm. The touch drive signal Vcomtm is supplied to the drive electrode COML(q)2 in the second one-quarter period (Ptm/4) of the mutual-capacitance touch period Ptm. The touch drive signal Vcomtm is then supplied to the drive electrode COML(q+1)1 in the third one-quarter period (Ptm/4) of the mutual-capacitance touch period Ptm. Finally, the touch drive signal Vcomtm is supplied to the drive electrode COML(q+1)2 in the fourth one-quarter period (Ptm/4) of the mutual-capacitance touch period Ptm.

That is, the third embodiment can further improve the accuracy of touch detection in the arrangement direction of the drive electrodes COML when performing the image display at a low resolution (FIG. 42), in comparison with a case of performing the image display at the maximum resolution (FIG. 41).

A configuration can be employed in which the touch drive signal Vcomtm is supplied to any one of the drive electrodes . . . , COML(q)1, COML(q)2, COML(q+1)1, COML(q+1)2, . . . illustrated in FIGS. 35 to 41 when performing the image display at the maximum resolution, like when performing the image display at a low resolution. This configuration may reduce the number of pulses of the touch drive signals Vcomtm supplied to the respective drive electrodes COML, which may deteriorate tolerance to noise.

The third embodiment employs the configuration in which the number of divisions of the drive electrodes COML is increased from the numbers in the first and the second embodiments, and the touch drive signal Vcomtm is supplied to each drive electrode COML in sequence in the touch period Ptm when performing the image display at a low resolution. The configuration can improve the accuracy of touch detection in the arrangement direction of the drive electrodes COML without deteriorating the tolerance to noise.

The described above is an example of the third embodiment in which the number of divisions of the drive electrodes COML is increased from the numbers in the first and the second embodiments. In addition to this configuration, the number of divisions of the touch detection electrodes TDL can be increased from the numbers in the first and the second embodiments. According to this configuration, in performing the image display at the maximum resolution, the touch detection signal Vdet1 is detected for each touch-detection electrode block in the touch period Ptm by assuming a plurality of adjacent touch detection electrodes TDL as one touch-detection electrode block. In performing the image display at a low resolution, the touch detection signal Vdet1 is detected for each touch detection electrode TDL in the touch period Ptm. Such a configuration can improve the accuracy of touch detection in the arrangement direction of the touch detection electrodes TDL.

As described above, when the display device 1 according to the third embodiment performs the image display at the maximum resolution, the touch drive signal Vcomtm is supplied to each drive electrode block COMLB in sequence, by assuming a plurality of adjacent drive electrodes COML to be one drive electrode block COMLB, in the touch period Ptm. When performing the image display at a low resolution, the touch drive signal Vcomtm is supplied to each drive electrode COML in sequence in the touch period Ptm. The configuration can improve the accuracy of touch detection in the arrangement direction of the drive electrodes COML without deteriorating the tolerance to noise, in performing the image display at a low resolution.

The third embodiment can provide the display device 1 capable of optimizing display and the accuracy of touch detection as the situation demands.

Fourth Embodiment

Figure 43:
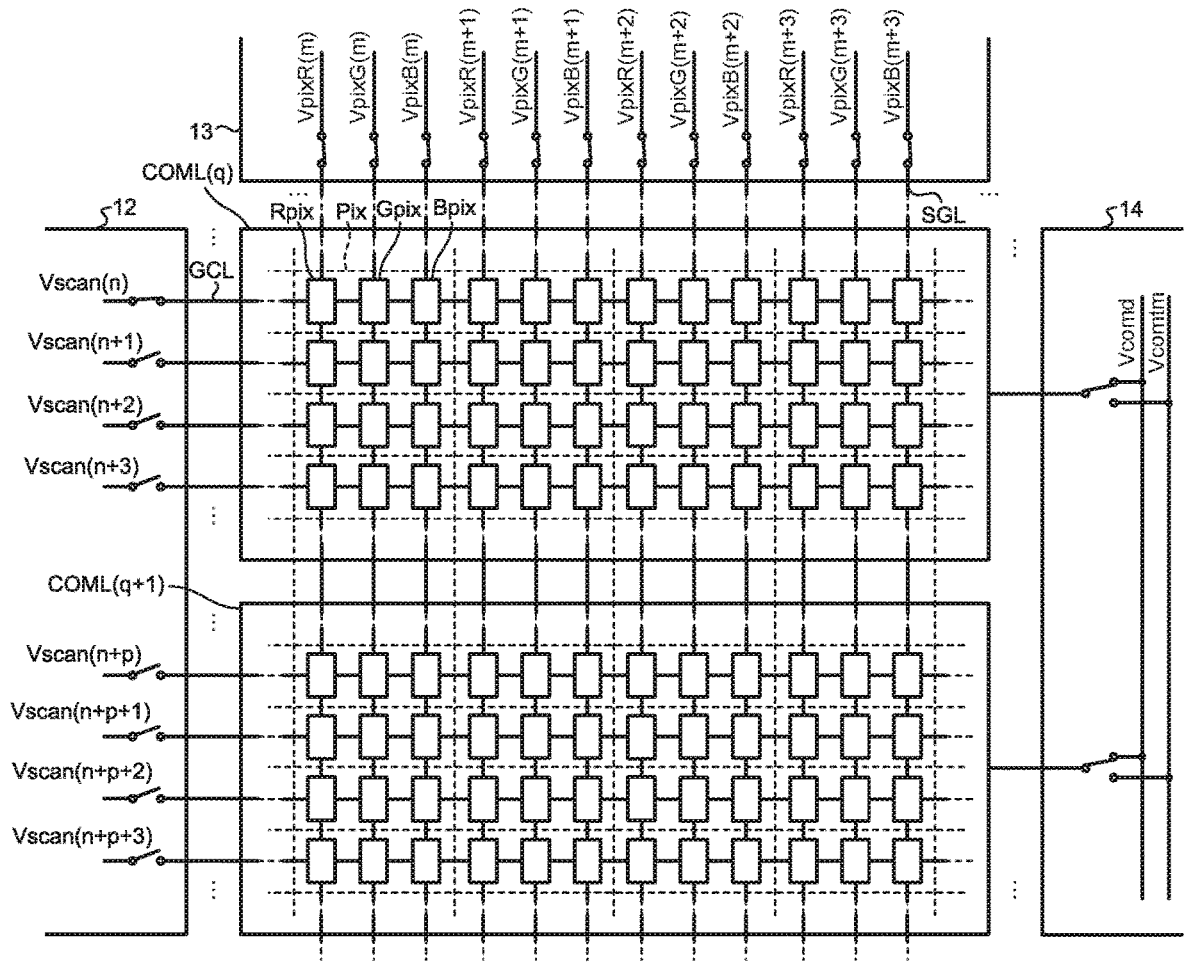
FIG. 43 is a diagram illustrating an operation example in a display period when a display device according to a fourth embodiment performs image display at the maximum resolution.
Figure 44:
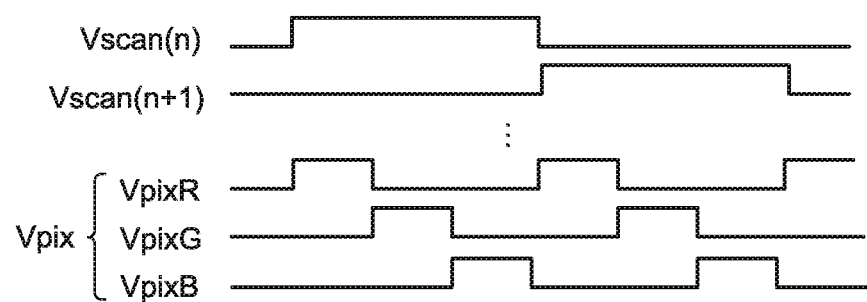
FIG. 44 is a timing chart of the scanning signals and the pixel signals in the example illustrated in FIG. 43.
Figure 45:
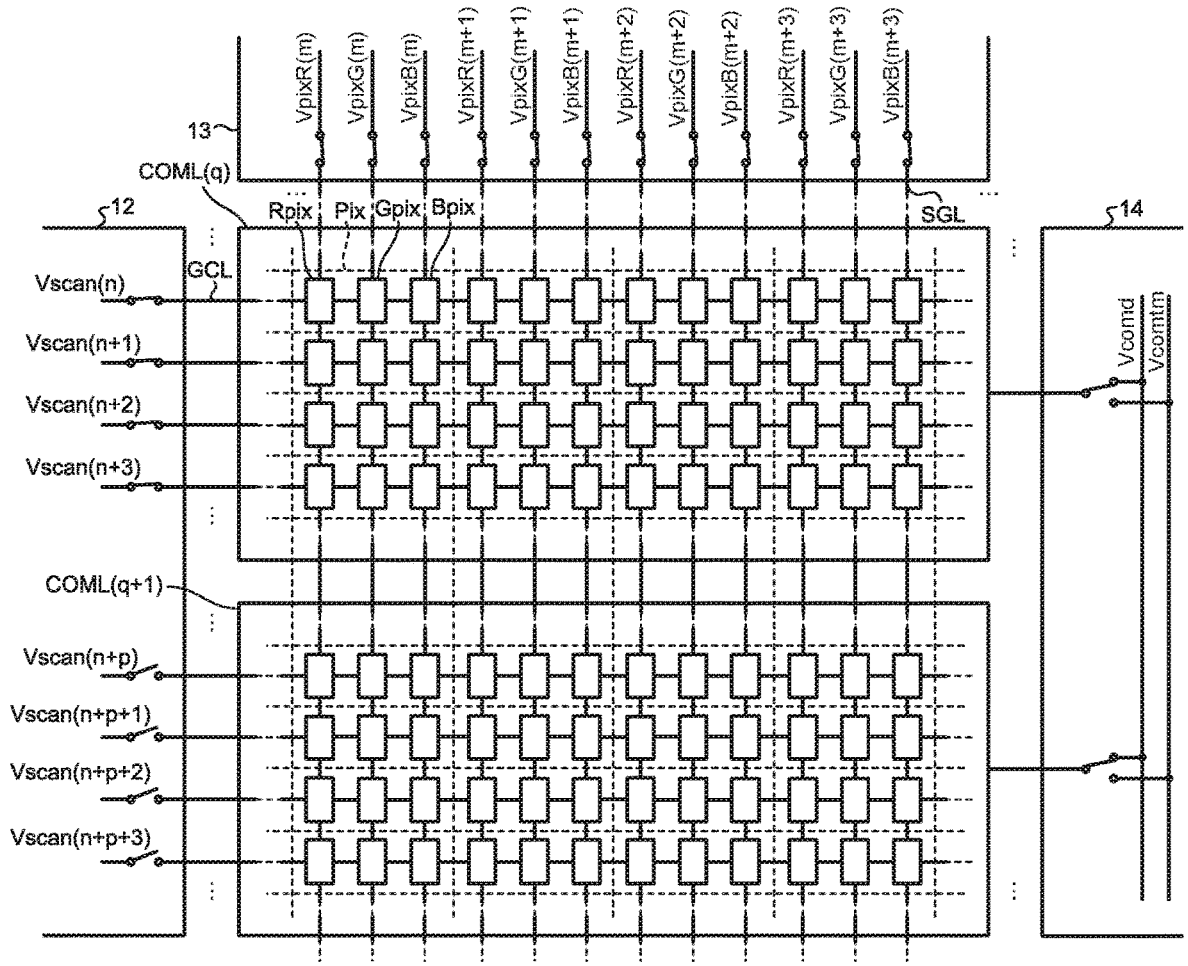
FIG. 45 is a diagram illustrating an operation example in a display period when the display device according to the fourth embodiment performs image display at a low resolution.
Figure 46:
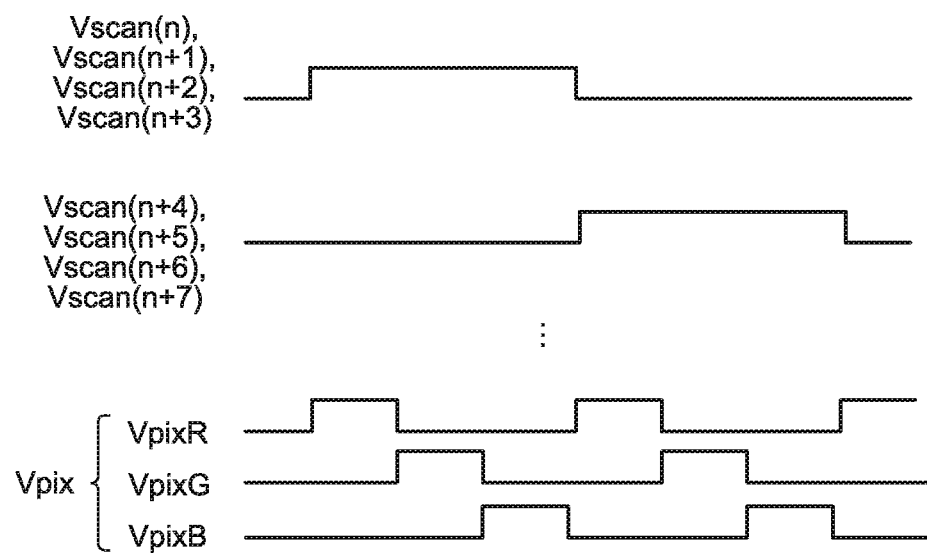
FIG. 46 is a timing chart of the scanning signals and the pixel signals in the example illustrated in FIG. 45.
Figure 47:
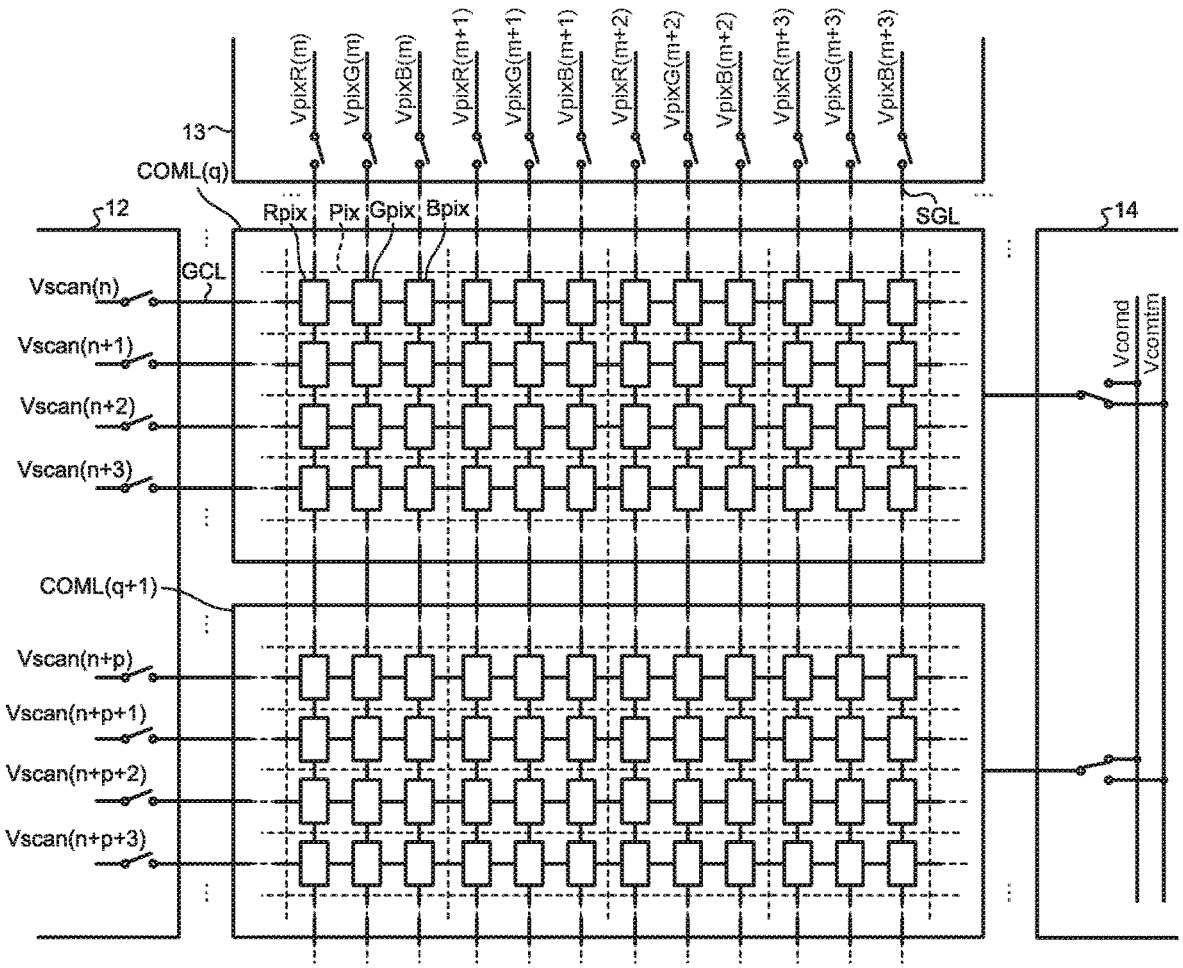
FIG. 47 is a diagram illustrating an operation example in a touch period of the display device according to the fourth embodiment.

FIG. 43 is a diagram illustrating an operation example in the display period when a display device according to a fourth embodiment performs the image display at the maximum resolution. FIG. 44 is a timing chart of scanning signals and pixel signals in the example illustrated in FIG. 43. FIG. 45 is a diagram illustrating an operation example in the display period when the display device according to the fourth embodiment performs the image display at a low resolution. FIG. 46 is a timing chart of scanning signals and pixel signals in the example illustrated in FIG. 45. FIG. 47 is a diagram illustrating an operation example in the touch period of the display device according to the fourth embodiment. The configuration of the display device 1 according to the fourth embodiment is the same as that of the first embodiment, the redundant description is omitted. Since the operation example in the display period during the image display at the maximum resolution, the operation example in the display period during the image display at a low resolution, and the operation example in the touch period are the same as those of the first embodiment, only the drawings are illustrated, and the redundant description is omitted. The timing chart when the image display is performed at the maximum resolution and the timing chart when the image display is performed at a low resolution are the same as those of the first embodiment, and thus the redundant description is omitted.

The following describes an example of the fourth embodiment in which when the image display is performed at a low resolution by down-converting the video signals Vdisp at the 4K2K resolution, the signals are converted to those at the HD resolution that is lower than the full HD resolution illustrated in the first to the third embodiments.

As illustrated in FIG. 45, when the display device 1 according to the fourth embodiment performs the image display at a low resolution, and down-converts the video signals Vdisp at the 4K2K resolution to those at the HD resolution that is lower than the full HD resolution, the gate driver 12 is controlled so as to simultaneously supply the scanning signals Vscan to four adjacent gate lines GCL in the display period Pd. More specifically, in the example illustrated in FIG. 45, the scanning signals Vscan(n), Vscan(n+1), Vscan(n+2), and Vscan(n+3) are selected.

When the scanning signals Vscan(n) to Vscan(n+3) are selected, identical pixel signals Vpix are supplied to four adjacent pixel columns. Specifically, the sub pixel signals VpixR(m) to VpixR(m+3) are identical signals. The sub pixel signals VpixG(m) to VpixG(m+3) are identical signals. The sub pixel signals VpixB(m) to VpixB(m+3) are identical signals. That is, the identical pixel signals Vpix (sub pixel signals VpixR, VpixG, VpixB) are simultaneously supplied to sixteen pixels Pix that belong to four adjacent pixel rows to which the scanning signals Vscan are simultaneously supplied by the gate driver 12 and that belong to four pixel-columns to which the identical pixel signals Vpix are supplied by the source driver 13. In other words, the scanning signals Vscan are simultaneously supplied to the four adjacent scanning lines. With respect to the signal lines coupled to the sub pixels SPix of the same color, the identical pixel signals Vpix are simultaneously supplied to the four adjacent signal lines.

The down-converting method when the video signals Vdisp at the 4K2K resolution are down-converted to those at the HD resolution may be a method of using a pixel signal supplied to any one of pixels Pix out of sixteen pixels Pix to which identical pixel signals are simultaneously supplied when the image display is performed at the maximum resolution. The down-converting method may also be a method of using an average value of the pixel signals supplied to the respective pixels Pix when the image display is performed at the maximum resolution. The down-converting method of down-converting the video signals Vdisp at 4K2K resolution to those at the HD resolution is not intended to limit the present disclosure.

As described above, when the display device 1 according to the fourth embodiment performs the image display at a low resolution, the video signals Vdisp at the 4K2K resolution are down-converted to those at the HD resolution which is lower than the full HD resolution. This can make the display period Pd occupying one frame period shorter than that in the first to the third embodiments, and relatively lengthen the blanking period for the display operation in one frame period. As a result, the configuration can lengthen the touch period Ptm provided in the blanking period for the display operation in one frame period.

Described above are the examples of the embodiments, in which one frame period for the video signals Vdisp is divided into twenty two periods from the period T1 to the period T22, each of which is time-divided into the display period Pd for performing the display operation and the touch period Ptm for performing the touch detection operation. However, the present disclosure is not limited thereto.

Figure 48:
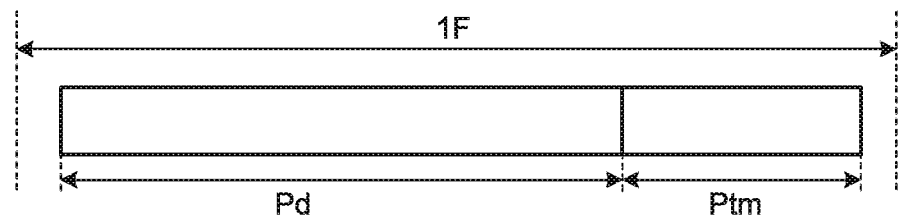
FIG. 48 is an example of a timing chart when a single display period and a single touch period are provided in one frame period for video signals.

FIG. 48 is an example of a timing chart when a single display period and a single touch period are provided in one frame period for video signals. In the example illustrated in FIG. 48, a single display period Pd and a single touch period Pt are provided in one frame period for the video signals Vdisp.

Similarly to the above-described embodiments, in the example illustrated in FIG. 48, the mutual-capacitance touch period Ptm provided in the blanking period for the display operation in performing the image display at a low resolution can be made relatively longer than that when the image display is performed at the maximum resolution. This can improve tolerance to noise caused by an increase in the number of times of touch detection, accelerate response speed in a touch detection operation by improving the touch-detection frame rate, and improve the accuracy of touch detection in the arrangement direction of the drive electrodes COML by increasing the number of divisions of the drive electrodes COML. This configuration can optimize the display and the accuracy of touch detection as the situation demands.

Figure 49:
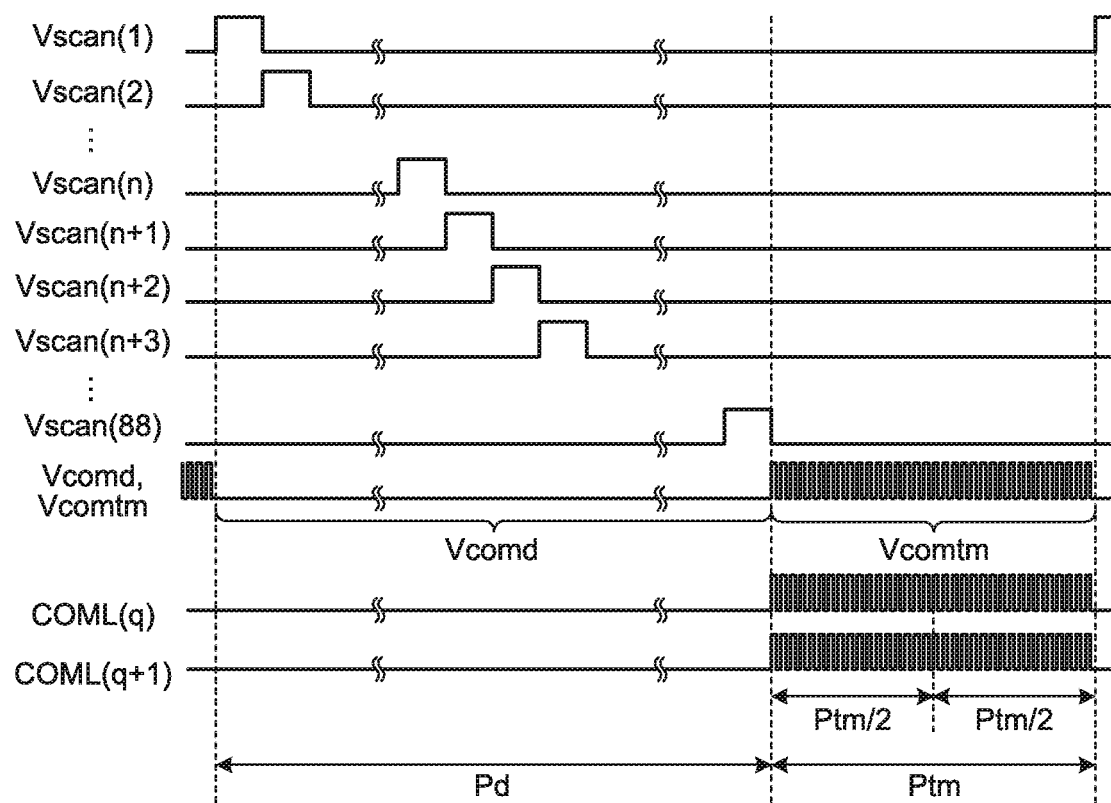
FIG. 49 is a first modification example of a timing chart when the display device according to the embodiments performs image display at the maximum resolution.
Figure 50:
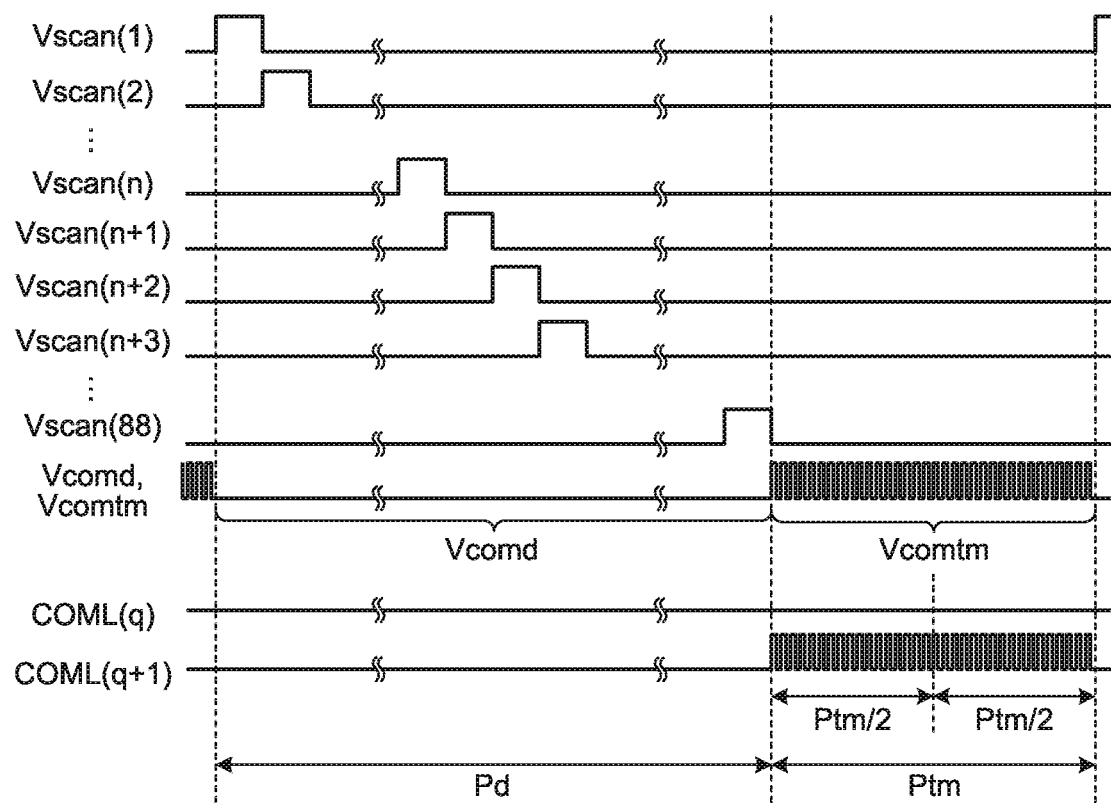
FIG. 50 is a second modification example of a timing chart when the display device according to the embodiments performs image display at the maximum resolution.

FIG. 49 is a first modification example of a timing chart when the display device according to the embodiments performs image display at the maximum resolution. FIG. 50 is a second modification example of a timing chart when the display device according to the embodiments performs image display at the maximum resolution. The timing charts in FIG. 49 and FIG. 50 are each different from the timing chart in FIG. 22 when the display device according to the first embodiment performs image display at the maximum resolution.

Described above are the examples of the embodiments, in which the touch drive signal Vcomtm is supplied to any one of the drive electrodes . . . , COML(q), COML(q+1), . . . , in only a period corresponding to one half of the mutual-capacitance touch period Ptm, when the display device performs performing image display at the maximum resolution. The present disclosure may employ a configuration illustrated in FIG. 49, in which the touch drive signals Vcomtm are simultaneously supplied to a plurality of drive electrodes COML (in this example, COML(q) and COML(q+1)) in the mutual-capacitance touch period Ptm. Alternatively, the present disclosure may employ a configuration illustrated in FIG. 50, in which the touch drive signal Vcomtm is supplied to any one of the drive electrodes COML (in this example, COML(q) and COML(q+1)) in the mutual-capacitance touch period Ptm.

Described above are the examples of the embodiments, in which the image display is performed at a resolution lower than the maximum resolution of the display unit 20, which coincides with the resolution of the video signals Vdisp, such as the full HD resolution and HD resolution, by down-converting the video signals Vdisp at the 4K2K resolution. Meanwhile, the resolution of the video signals Vdisp and the resolution of the image after the down-conversion are not limited thereto, and the image display may be performed at a resolution lower than the full HD resolution or HD resolution, for example. Similarly, the image display may be performed at a low resolution such as the full HD resolution or HD resolution, by down-converting the video signals Vdisp at a resolution higher than 4K2K resolution, for example.

In the above-described embodiments, the touch detection operation in the touch period Ptm provided in the blanking period of the display period Pd to perform the mutual-capacitance touch detection operation has been explained. Meanwhile, the touch periods Pts1 and Pts2, in which the self-capacitance touch detection operation is performed, can also be made longer similarly to the touch period Ptm, by down-converting the video signals Vdisp at the 4K2K resolution, for example, to perform the image display at a low resolution. This can improve tolerance to noise caused by an increase in the number of times of touch detection, and accelerate response speed in a touch detection operation by improving the touch-detection frame rate.

The constituent elements of the above-described embodiments and modifications can be combined as appropriate. The present disclosure can naturally provide other advantageous effects that are provided by the aspects described in the embodiments above and are clearly defined by the description in the present specification or appropriately conceivable by those skilled in the art.

What is claimed is:

1. A display device with a touch detection function comprising:
    a display unit that includes a plurality of pixel electrodes, and a plurality of counter electrodes facing the pixel electrodes, and that displays an image at a resolution in accordance with the number of the pixel electrodes;
    a plurality of touch detection electrodes overlapping the counter electrodes; and
    a controller that alternately executes, in one frame period, a display operation in a display period by driving the pixel electrodes and the counter electrodes, and a touch detection operation in a touch period by driving one or both of the counter electrodes and the touch detection electrodes, wherein
    the controller that changes a ratio between the display period and the touch period in the one frame period in accordance with a resolution of an image to be displayed in the one frame period.

2. The display device with a touch detection function according to claim 1, wherein
    the controller can switch between a first display state and a second display state, the first display state being a state in which the one frame period includes a first display period for displaying an image at a maximum resolution of the display unit and a first touch period time-divisionally provided with the first display period, and the second display state being a state in which the one frame period includes a second display period for displaying an image at a resolution lower than the maximum resolution, and a second touch period time-divisionally provided with the second display period, and
    the one frame period in the first display state and the one frame period in the second display state have a same length of time, and the second display period is set shorter than the first display period, and the second touch period is set longer than the first touch period.

3. The display device with a touch detection function according to claim 2, wherein the controller performs control to make a frame rate for touch detection in the second touch period higher than a frame rate for touch detection in the first touch period.

4. The display device with a touch detection function according to claim 2, wherein the controller sequentially supplies touch drive signals to every two or more adjacent counter electrodes of the counter electrodes in the first touch period, and sequentially supplies the touch drive signal to every one counter electrode of the counter electrodes in the second touch period.

5. The display device with a touch detection function according to claim 2, wherein
    the display unit further includes: a plurality of scanning lines; a plurality of signal lines intersecting with the scanning lines; and a switching element provided in each of regions sectioned by the scanning lines and the signal lines, and coupled to one of the scanning lines and one of the signal lines,
    each of the pixel electrodes is provided in each of the regions so that the pixel electrodes are arranged in a row-column configuration, and each of the pixel electrodes is coupled to the switching element, and
    the controller simultaneously supplies scanning signals to the scanning lines in the second display state.

6. The display device with a touch detection function according to claim 5, wherein the controller simultaneously supplies the scanning signals to two or more adjacent scanning lines in the second display state.

7. The display device with a touch detection function according to claim 5, wherein the controller, in the second display state, simultaneously supplies the scanning signals to scanning lines corresponding to odd-numbered rows of the scanning lines, and simultaneously supplies the scanning signals to scanning lines corresponding to even-numbered rows of the scanning lines.

8. The display device with a touch detection function according to claim 6, wherein the controller, in the second display state, simultaneously supplies identical pixel signals to the signal lines, the number of which is identical to the number of the scanning lines to which the scanning signals are simultaneously supplied.

9. The display device with a touch detection function according to claim 5, wherein the controller, in the second display state, simultaneously supplies the scanning signals to four adjacent scanning lines, and simultaneously supplies identical pixel signals to four adjacent signal lines.

10. The display device with a touch detection function according to claim 2, wherein the controller switches in accordance with video signals,
    to the first display state when a resolution of an image to be displayed on the display unit coincides with the maximum resolution, and
    to the second display state when the resolution of the image to be displayed on the display unit is lower than the maximum resolution.

11. The display device with a touch detection function according to claim 10, wherein the controller determines whether the image is a still image or a moving image, wherein
    the controller performs control for the first display state when the image is a still image, and
    the controller performs control for the second display state when the image is a moving image.

12. The display device with a touch detection function according to claim 11, wherein the controller determines whether the image is a still image or a moving image, in accordance with video signals supplied to the display unit.

13. The display device with a touch detection function according to claim 11, wherein the controller determines whether the image is a still image or a moving image, depending on whether the image is a game image.

14. The display device with a touch detection function according to claim 13, wherein the controller determines that the image is a moving image when the image is a game image.

15. The display device with a touch detection function according to claim 10, wherein a resolution of the video signals coincides with the maximum resolution.

16. The display device with a touch detection function according to claim 2, wherein the first touch period and the second touch period are provided in a blanking period of the display operation.

17. A display device with a touch detection function comprising:

a display unit that includes a plurality of pixel electrodes, and a plurality of counter electrodes facing the pixel electrodes, and that displays an image at a resolution in accordance with the number of the pixel electrodes; and a plurality of touch detection electrodes overlapping the counter electrodes, wherein a display operation in a display period by driving the pixel electrodes and the counter electrodes, and a touch detection operation in a touch period by driving one or both of the counter electrodes and the touch detection electrodes are executed alternately in one frame period, and a ratio between the display period and the touch period in the one frame period is changed in accordance with a resolution of an image to be displayed in the one frame period.

18. A control circuit included in a display unit, the display unit comprising: a plurality of pixel electrodes; a plurality of counter electrodes facing the pixel electrodes; and a plurality of touch detection electrodes overlapping the counter electrodes, the display unit configured to display an image at a resolution in accordance with the number of the pixel electrodes, wherein the control circuit alternately executes, in one frame period, a display operation in a display period by driving the pixel electrodes and the counter electrodes, and a touch detection operation in a touch period by driving one or both of the counter electrodes and the touch detection electrodes, and the control circuit changes a ratio between the display period and the touch period in the one frame period in accordance with a resolution of an image to be displayed in the one frame period.

* * * * *